US012074790B2

(12) United States Patent
Park et al.

(10) Patent No.: US 12,074,790 B2
(45) Date of Patent: Aug. 27, 2024

(54) INTEGRATED WIRED/WIRELESS NETWORK INTERMEDIARY DEVICE, AND DEEP PACKET MATCHING METHOD THEREFOR

(71) Applicant: KULCLOUD, Seongnam-si (KR)

(72) Inventors: Seung Yong Park, Seongnam-si (KR); Seok Hwan Kong, Yongin-si (KR); Dipjyoti Saikia, Seongnam-si (KR)

(73) Assignee: KULCLOUD, Seongnam-si (KR)

( * ) Notice: Subject to any disclaimer, the term of this patent is extended or adjusted under 35 U.S.C. 154(b) by 0 days.

(21) Appl. No.: 17/414,922

(22) PCT Filed: Oct. 28, 2019

(86) PCT No.: PCT/KR2019/014312
§ 371 (c)(1),
(2) Date: Jun. 16, 2021

(87) PCT Pub. No.: WO2020/130321
PCT Pub. Date: Jun. 25, 2020

(65) Prior Publication Data
US 2022/0070090 A1 Mar. 3, 2022

(30) Foreign Application Priority Data
Dec. 16, 2018 (KR) ........................ 10-2018-0162674

(51) Int. Cl.
*H04L 45/00* (2022.01)
*H04L 7/00* (2006.01)
(Continued)

(52) U.S. Cl.
CPC ............ *H04L 45/38* (2013.01); *H04L 7/0041* (2013.01); *H04L 12/4633* (2013.01);
(Continued)

(58) Field of Classification Search
CPC . H04L 12/4633; H04L 12/4641; H04L 45/38; H04L 45/64; H04L 45/586; H04L 69/22
See application file for complete search history.

(56) References Cited

U.S. PATENT DOCUMENTS

2012/0303835 A1* 11/2012 Kempf ................ H04L 41/0695 709/235
2015/0215841 A1 7/2015 Hsu et al.
2015/0327091 A1* 11/2015 Curtin .................. H04W 24/08 370/250

FOREIGN PATENT DOCUMENTS

KR 10-2013-0114708 A 10/2013
KR 10-2015-0117035 A 10/2015
(Continued)

OTHER PUBLICATIONS

Heinonen, Johanna, et al. "Dynamic tunnel switching for SDN-based cellular core networks." Proceedings of the 4th workshop on All things cellular: operations, applications, & challenges. (Year: 2014).*
(Continued)

*Primary Examiner* — John M MacIlwinen
(74) *Attorney, Agent, or Firm* — Maschoff Brennan

(57) ABSTRACT

The present invention relates to: a network packet intermediary device comprising a deep packet matching module for matching a GTP control plane packet and a GTP user plane packet by controlling a GTP correlation module; and a deep packet matching method thereof, and can extract packet information of a deep step from a switch level so as to match flows of the GTP control plane packet and the GTP user plane packet, and can provide a correlation so that the GTP control plane packet and the GTP user plane packet can be transmitted to the same outlet port.

14 Claims, 31 Drawing Sheets

(51) Int. Cl.

| | |
|---|---|
| ***H04L 12/46*** | (2006.01) |
| ***H04L 45/02*** | (2022.01) |
| ***H04L 45/586*** | (2022.01) |
| ***H04L 45/64*** | (2022.01) |
| ***H04L 45/745*** | (2022.01) |
| ***H04L 67/562*** | (2022.01) |
| ***H04L 69/22*** | (2022.01) |

(52) U.S. Cl.

CPC .......... *H04L 12/4641* (2013.01); *H04L 45/02* (2013.01); *H04L 45/586* (2013.01); *H04L 45/64* (2013.01); *H04L 45/745* (2013.01); *H04L 67/562* (2022.05); *H04L 69/22* (2013.01)

(56) References Cited

FOREIGN PATENT DOCUMENTS

| | | |
|---|---|---|
| KR | 10-1534161 B1 | 7/2016 |
| KR | 10-2018-0058594 A | 6/2018 |

OTHER PUBLICATIONS

Sama, Malla Reddy, et al. "Software-defined control of the virtualized mobile packet core." IEEE Communications Magazine 53.2: 107-115. (Year: 2015).*

Pagé, Jérémy, and Jean-Michel Dricot. "Software-defined networking for low-latency 5G core network." 2016 International Conference on Military Communications and Information Systems (ICMCIS). IEEE. (Year: 2016).*

Bi Yi. WO-2015021799-A1 (English Translation). (Year: 2015).*

Im et al. KR 10-2014-0150346 (English Translation) (Year: 2015).*

Jin, YongSig. KR 10-2014-0042257 (English Translation) (Year: 2016).*

Kong, SeokHwan and Chu, RenHao. KR 10-2018-0058594 (English Translation) (Year: 2018).*

D'Souza et al. KR 10-2013-0114708 (English Translation) (Year: 2015).*

* cited by examiner

[Fig. 1]
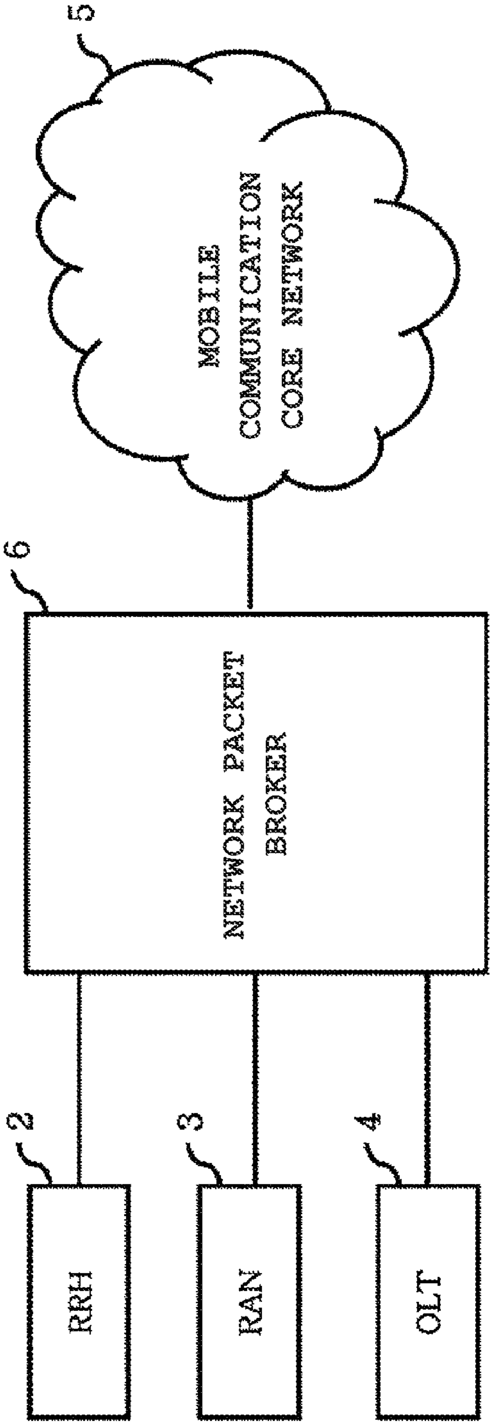

[Fig. 2]
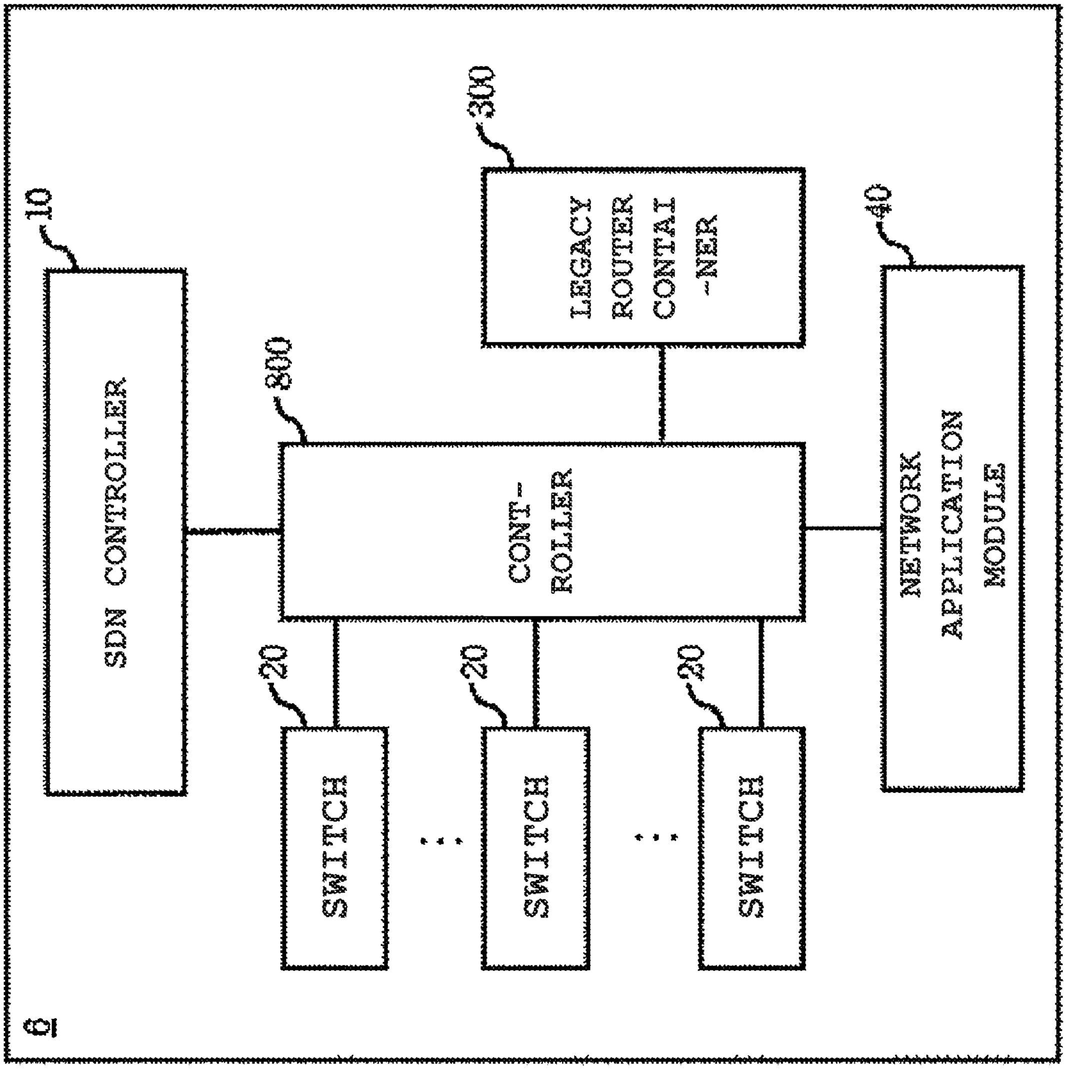

[Fig. 3]
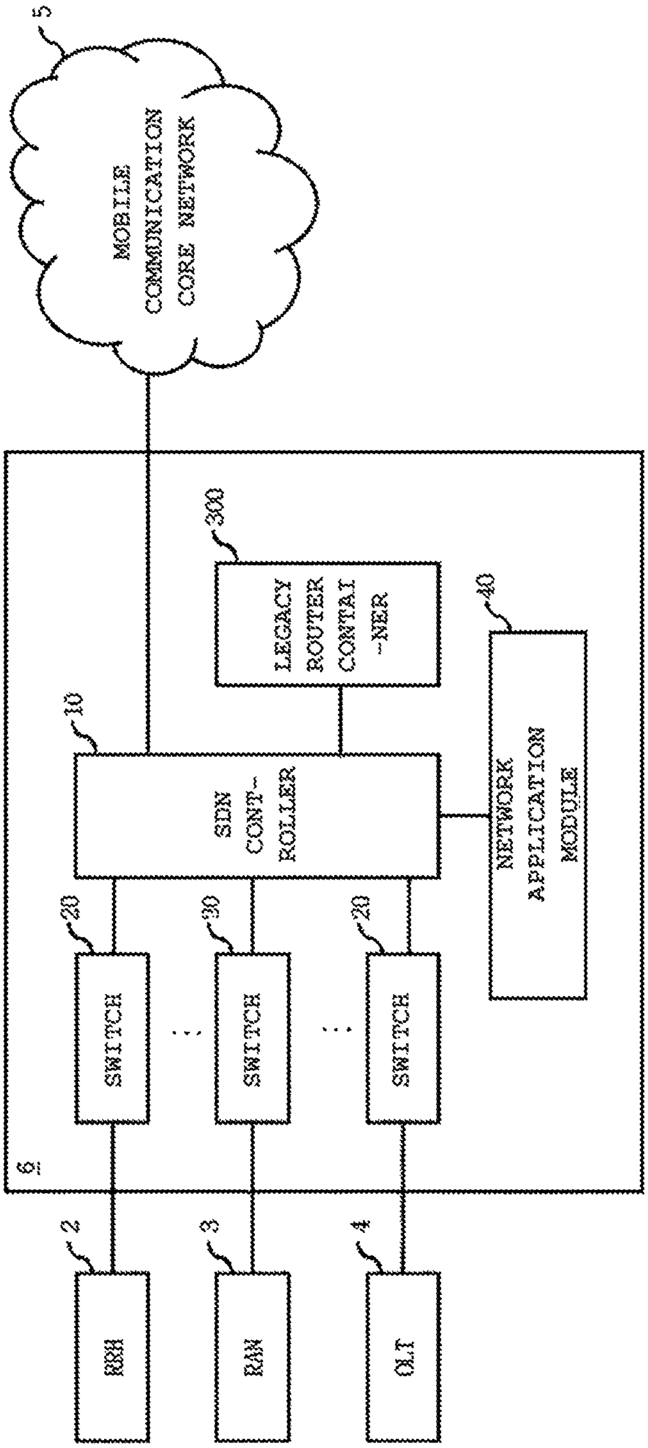

[Fig. 4]
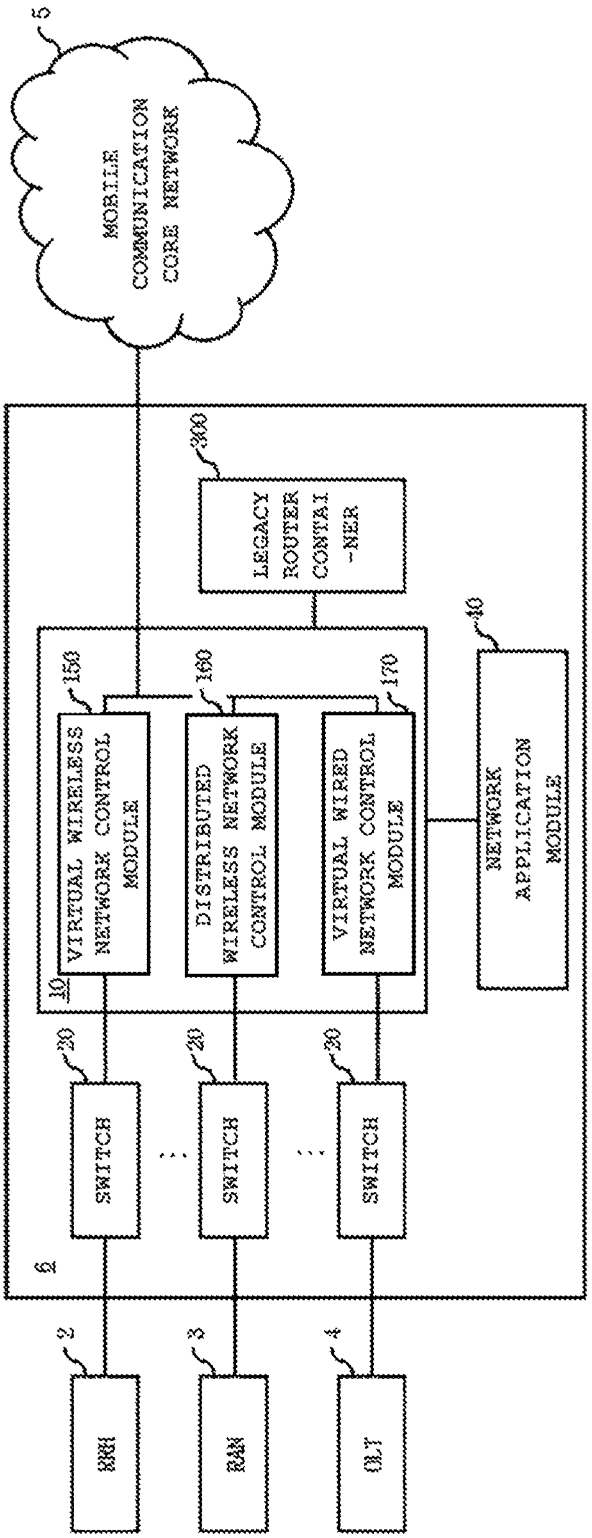

[FIG. 5]
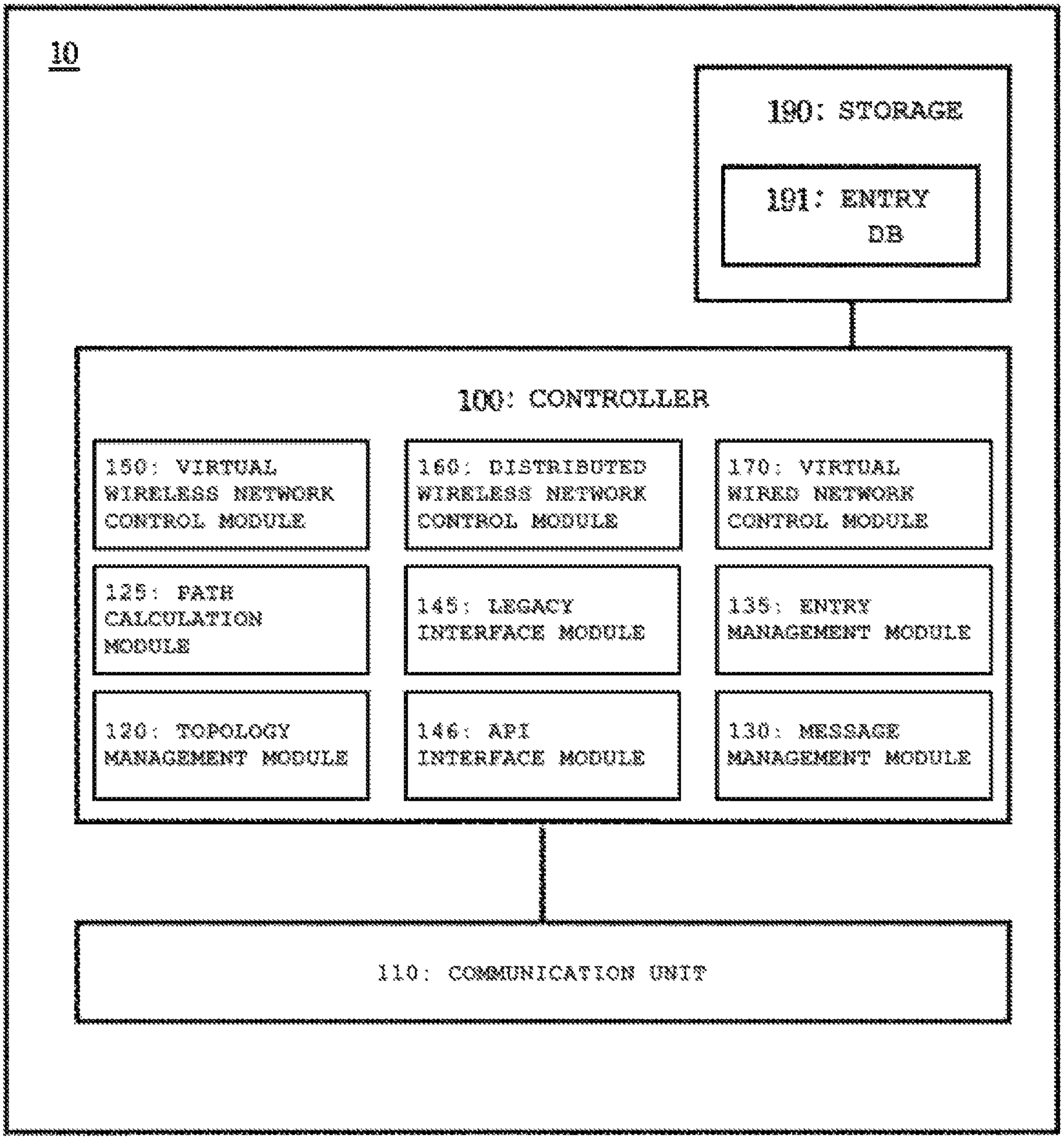

[FIG. 6]
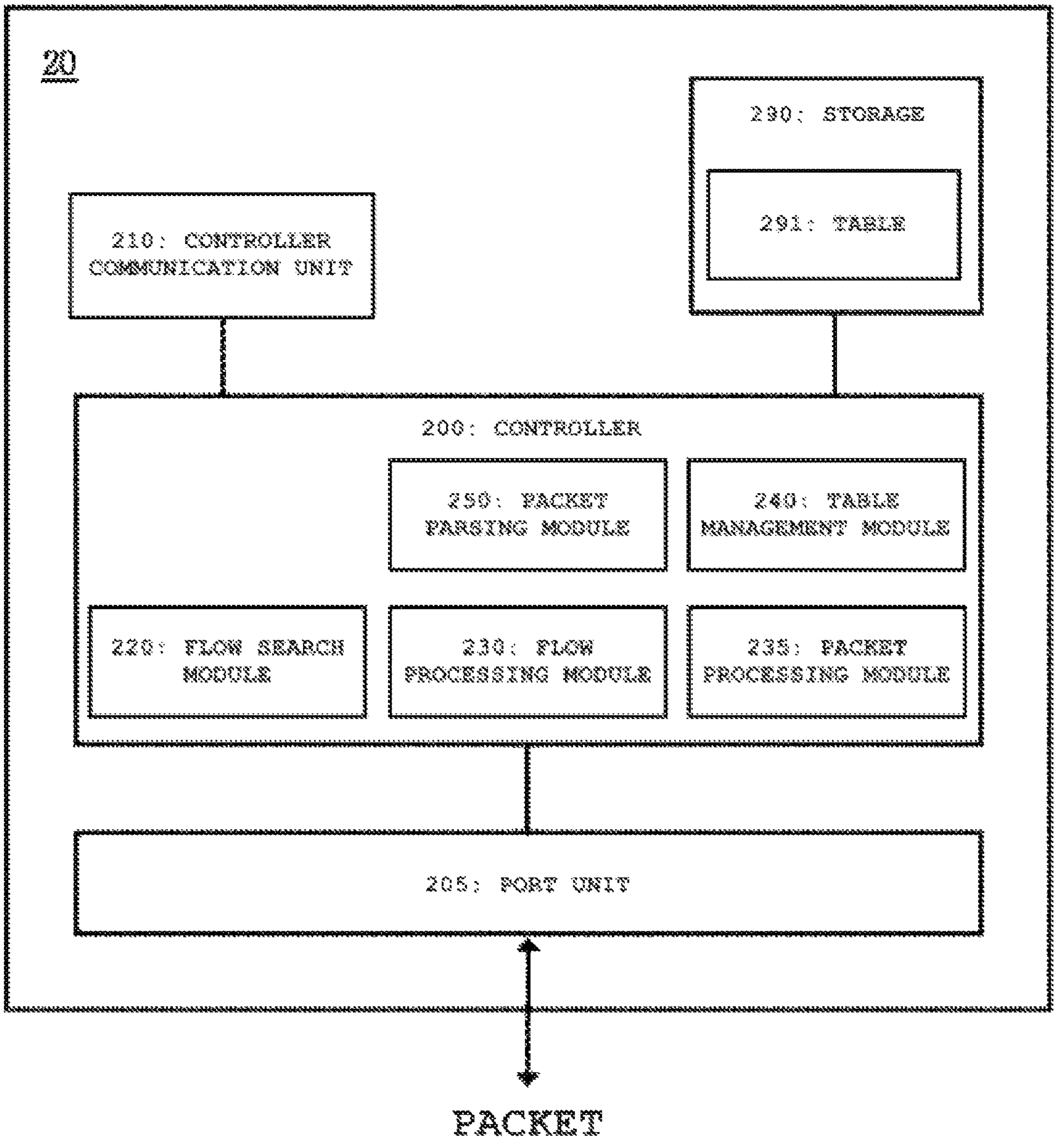

| Match Fields | Priority | Counters | Instructions | Timeouts | Cookie |
|---|---|---|---|---|---|

(b)

| | in Port | MAC src | MAC dst | eth type | VLAN ID | IP src | IP dst | IP prot | TCP s.port | TCP d.port | action |
|---|---|---|---|---|---|---|---|---|---|---|---|
| Switching: | * | * | 00:1f.. | * | * | * | * | * | * | * | port 1 |
| Routing: | * | * | * | * | * | * | 1.2.3.4 | * | * | * | port 6 |
| VLAN sw: | * | * | 00:3f.. | * | vlan2 | * | * | * | * | * | port 1,2,3 |
| Firewall: | * | * | * | * | * | * | * | * | * | 22 27 | drop |

[Fig. 8]
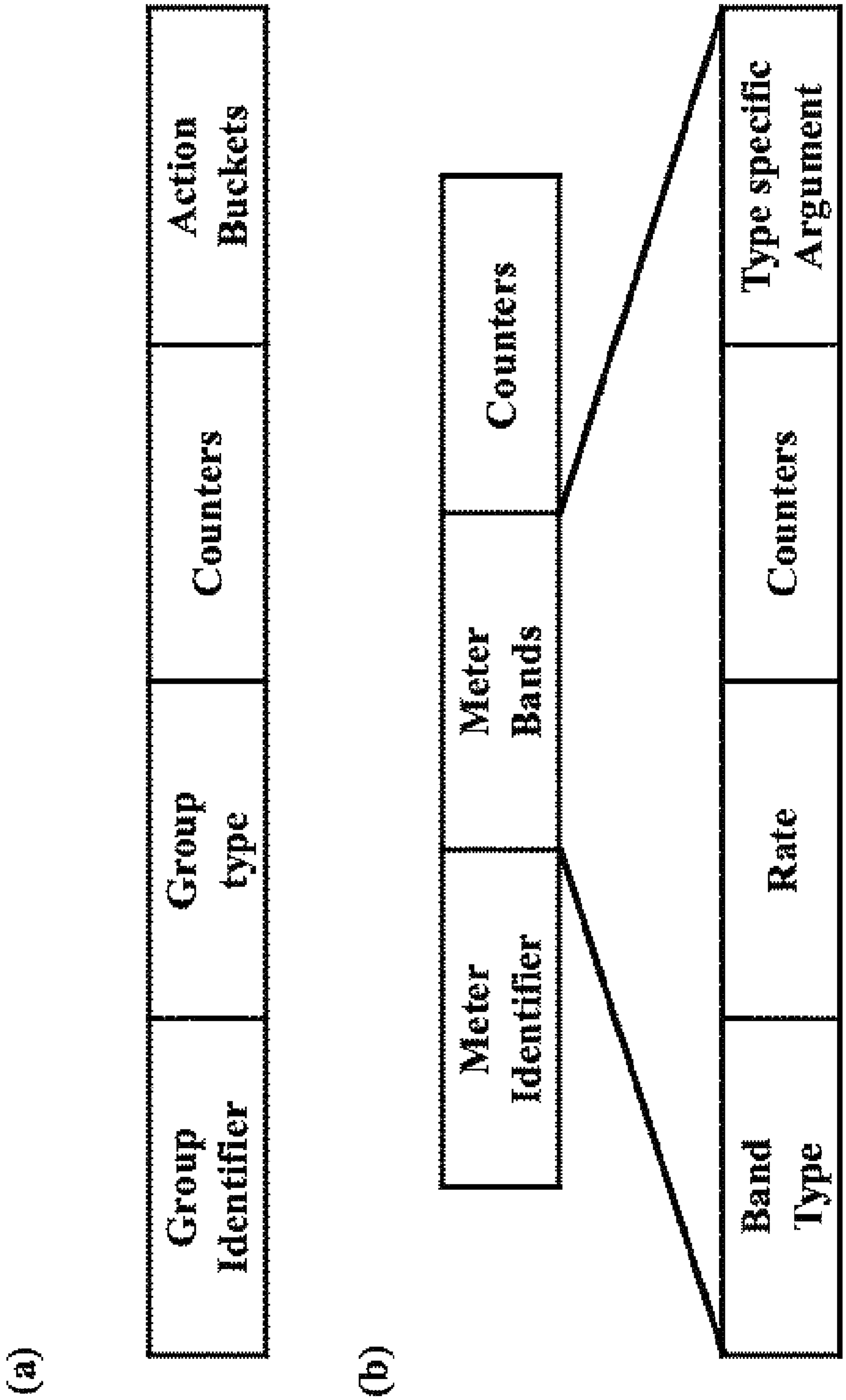

[Fig. 9]
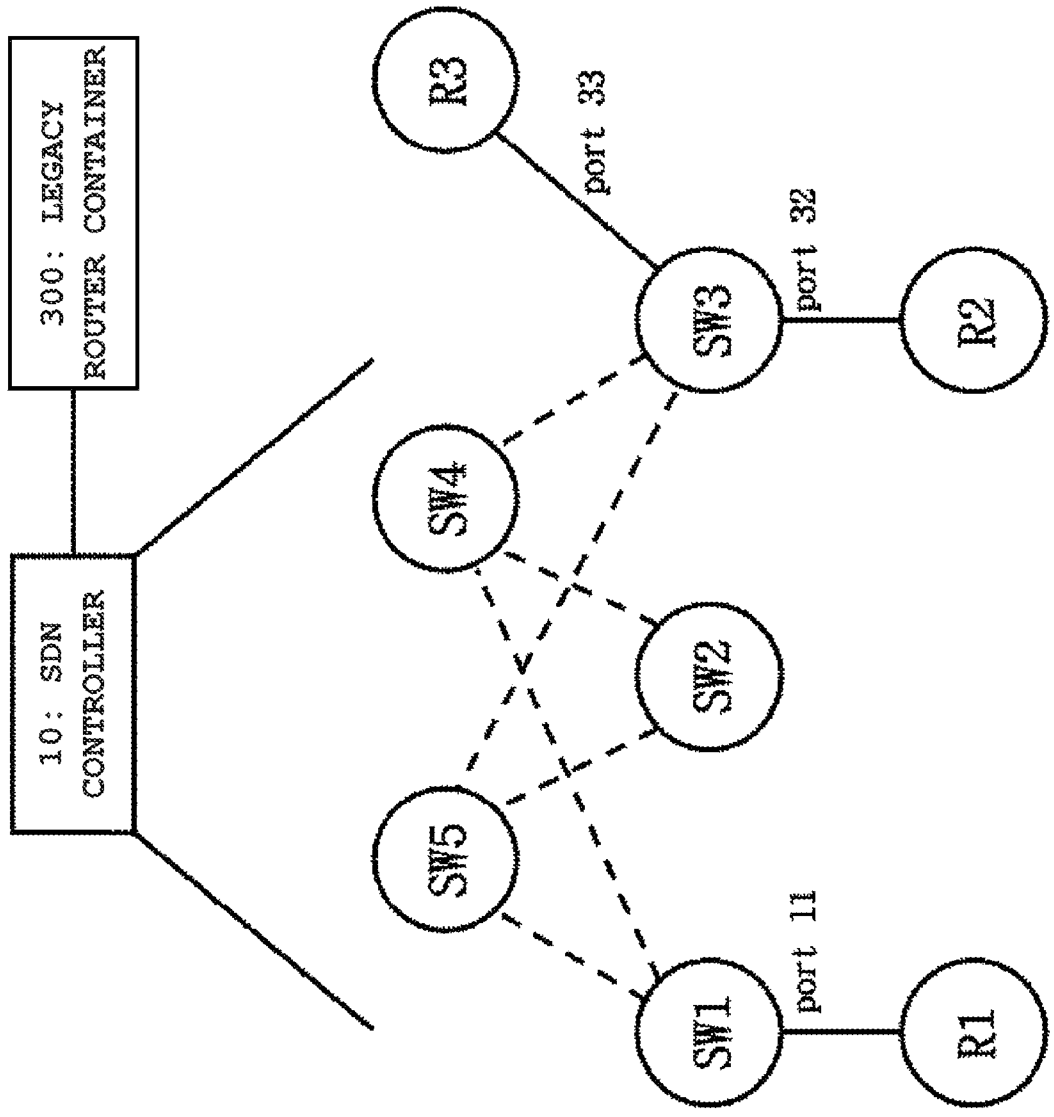

[Fig. 10]
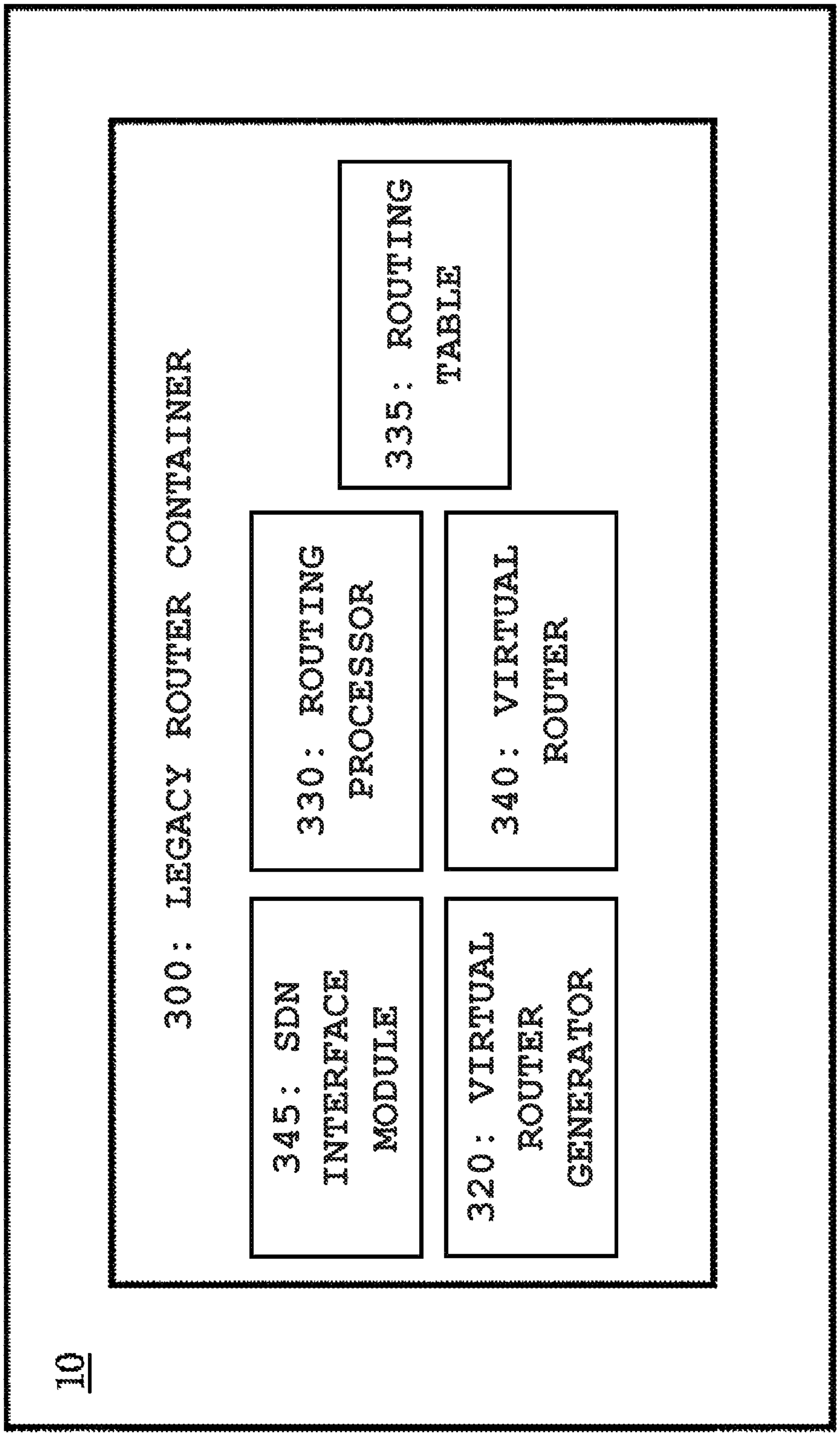

[Fig. 11]
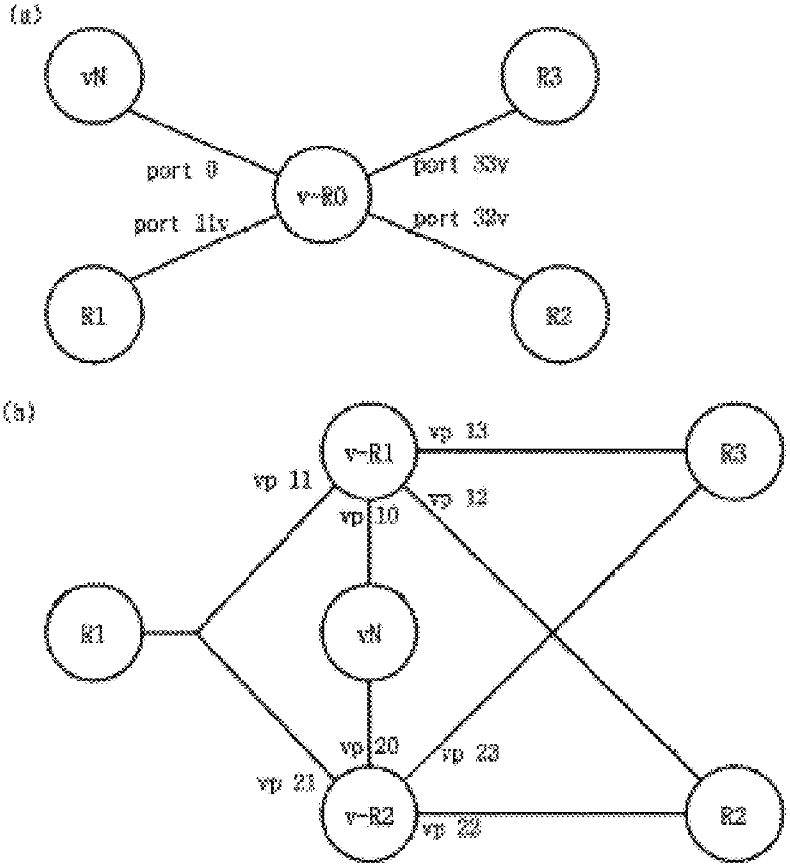

[Fig. 12]
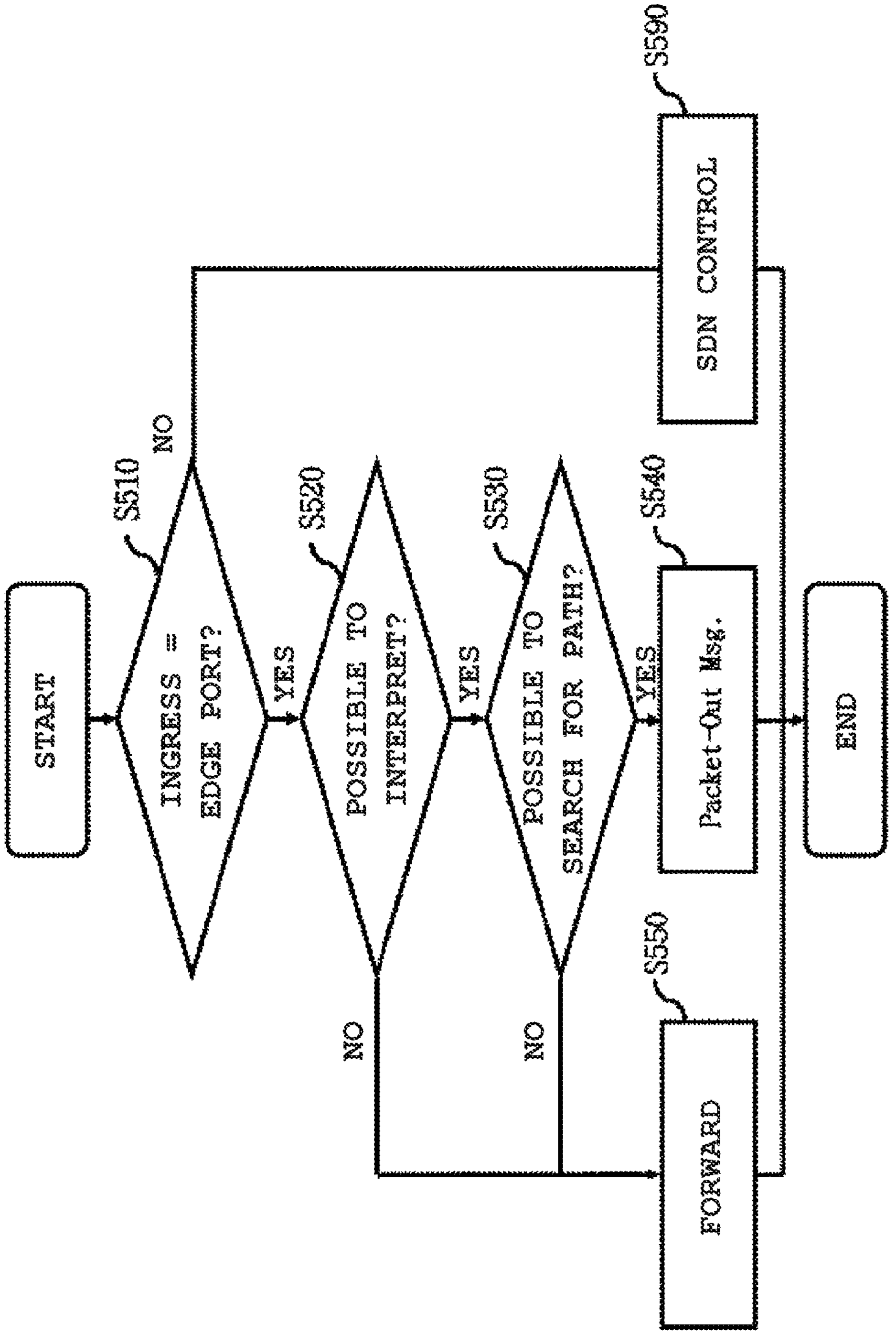

[FIG. 13]
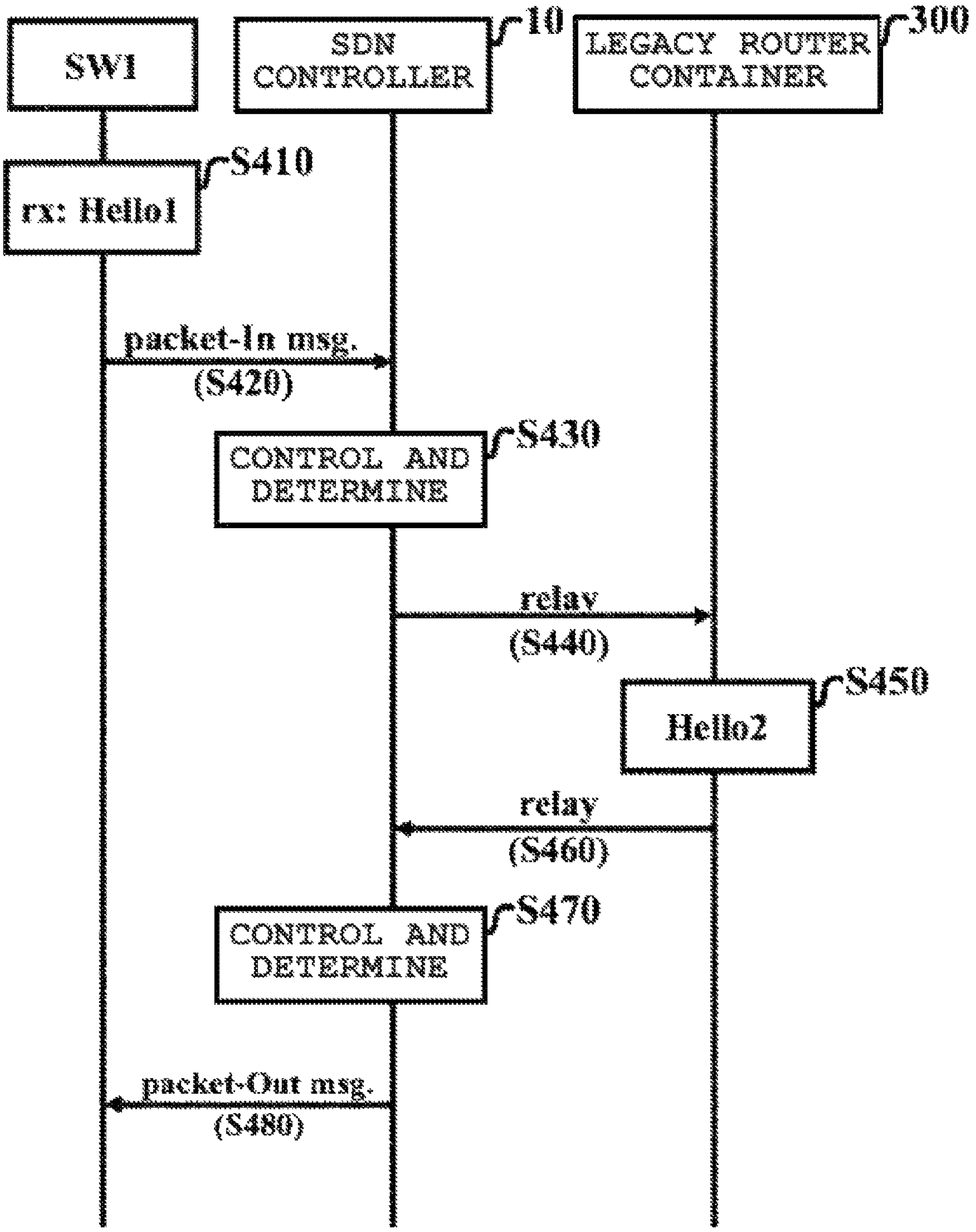

[FIG. 14]
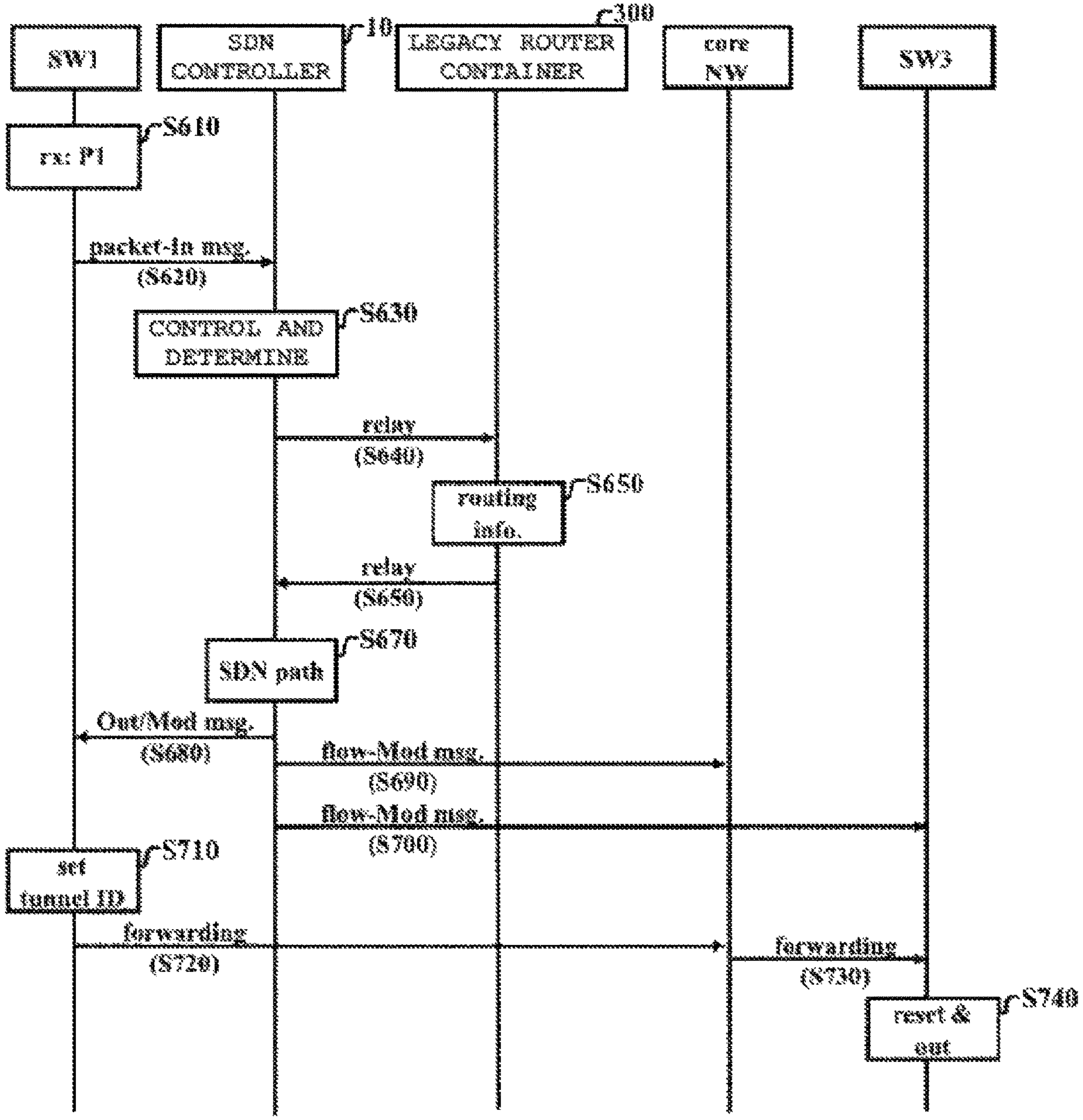

| table 0 | | |
|---|---|---|
| R2 | set-tunnel2 | goto table1 |
| R3 | set-tunnel3 | goto table1 |

| table 1 | |
|---|---|
| tunnel2 | out port14 |
| tunnel3 | out port15 |

(b)

| table 1 | |
|---|---|
| tunnel2 | out port43 |

(c)

| table 0 | | |
|---|---|---|
| tunnel2 | off T-ID | goto table1 |
| tunnel3 | off T-ID | goto table2 |

| table 1 | |
|---|---|
| * | out port32 |

| table 2 | |
|---|---|
| * | out port33 |

[Fig. 16]
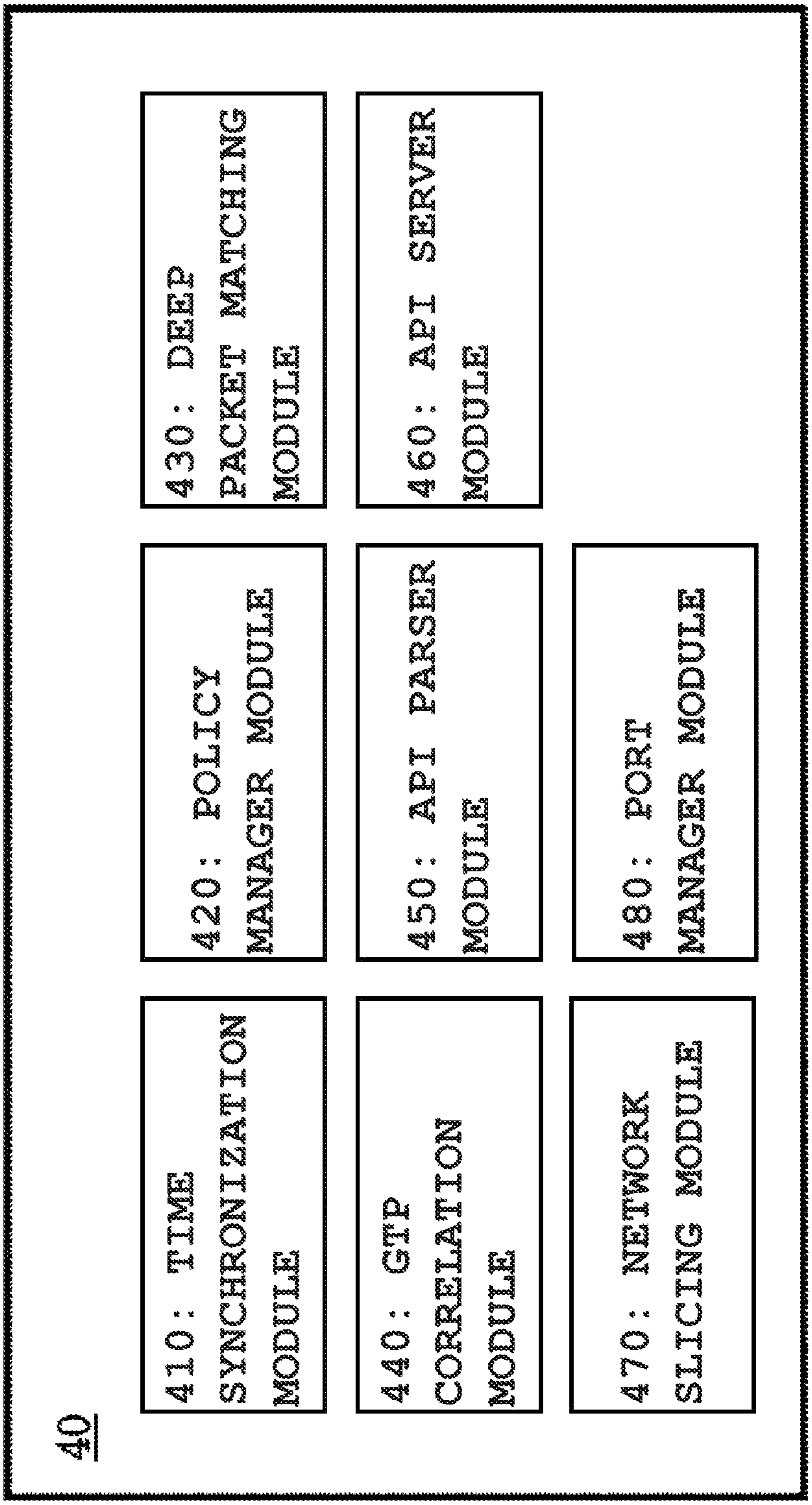

[Fig. 17]
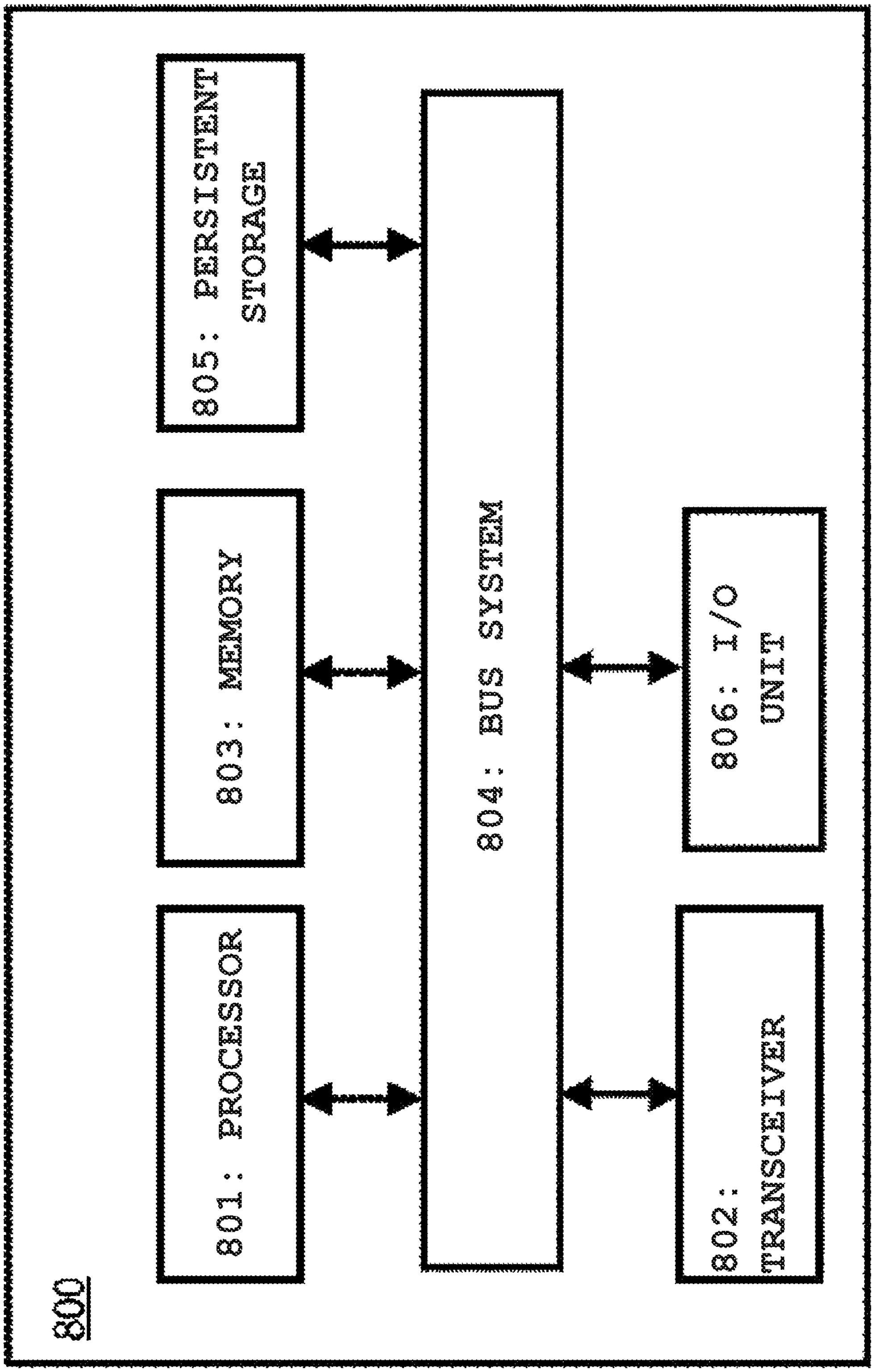

[Fig. 18]
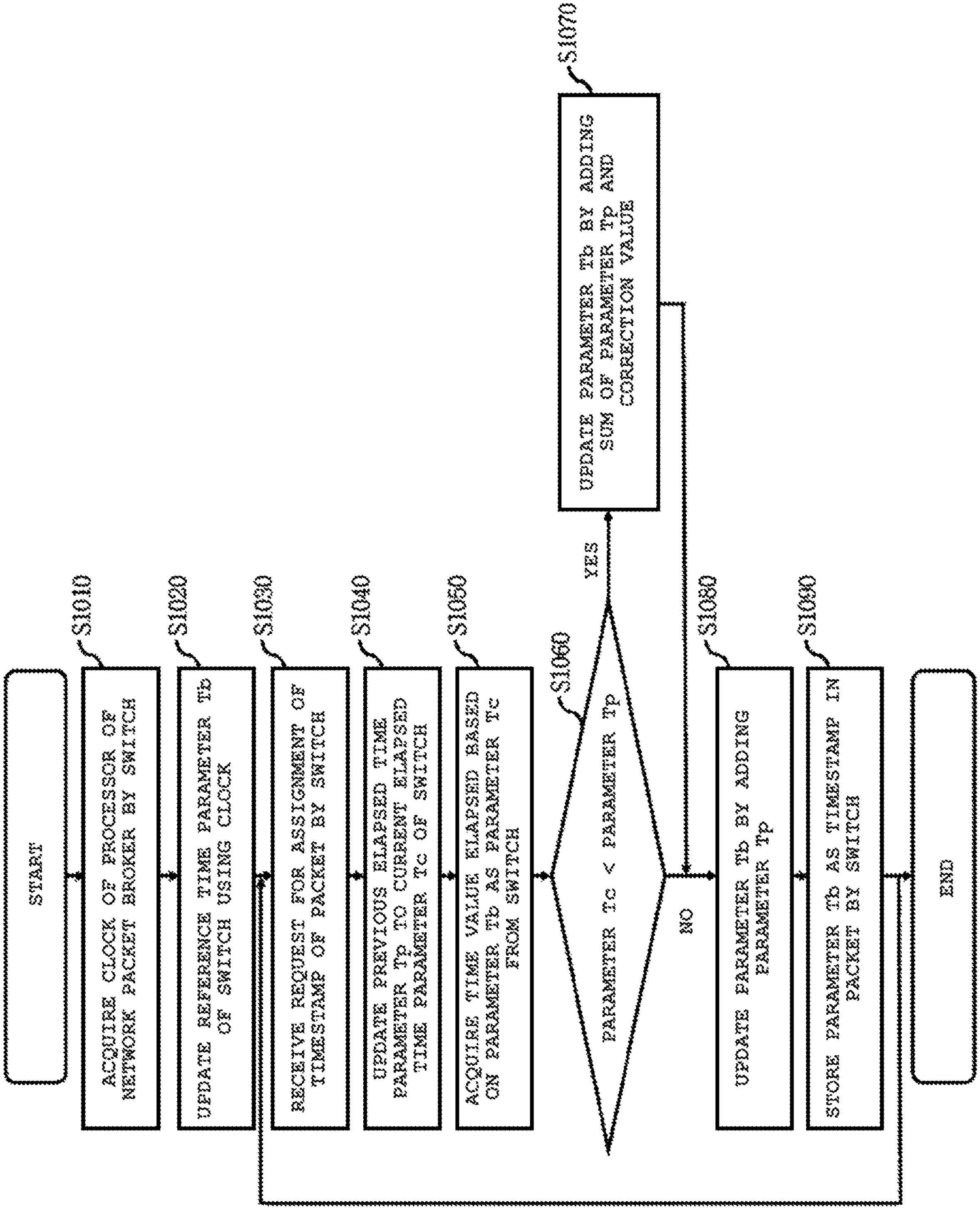

[Fig. 19]
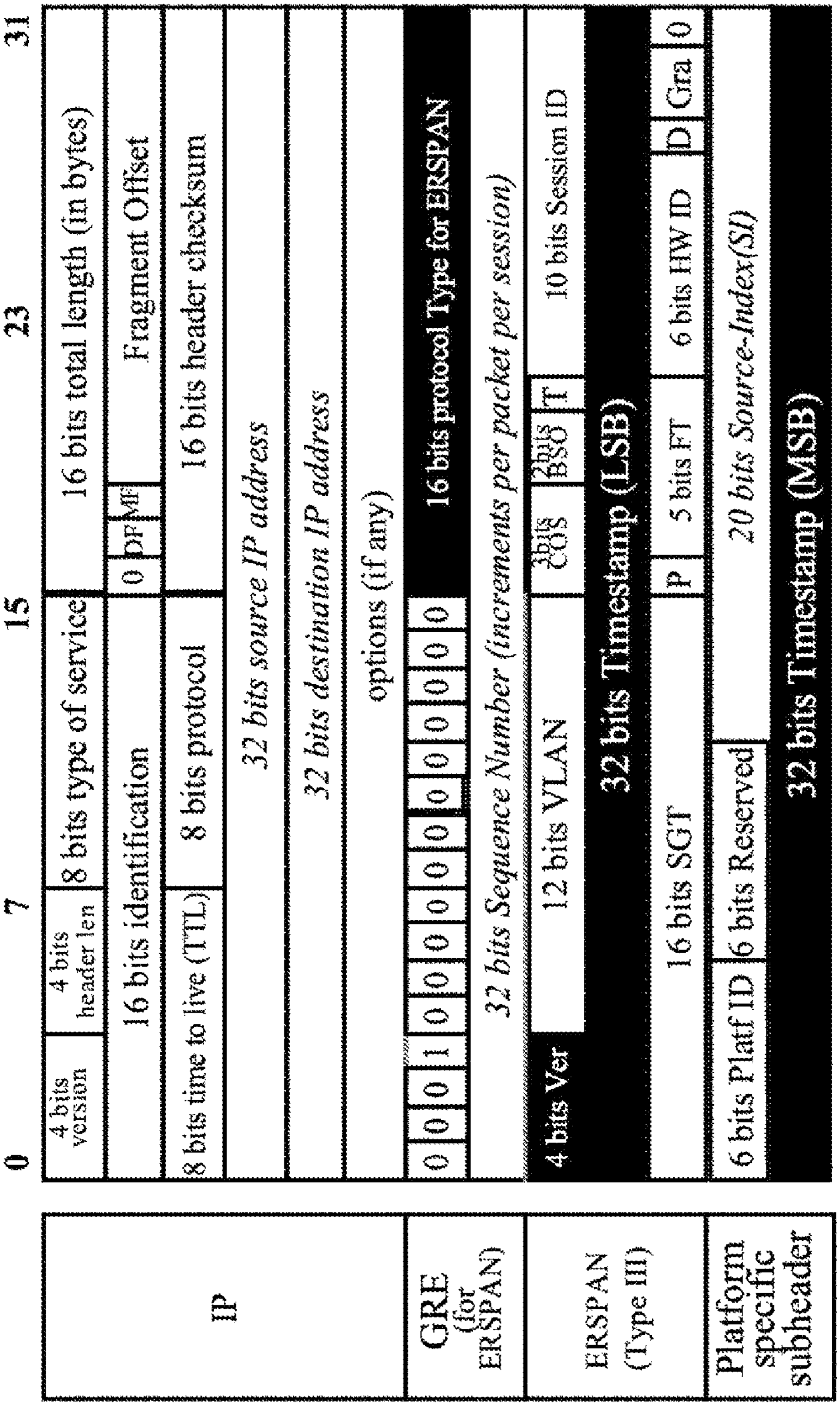

[Fig. 20]
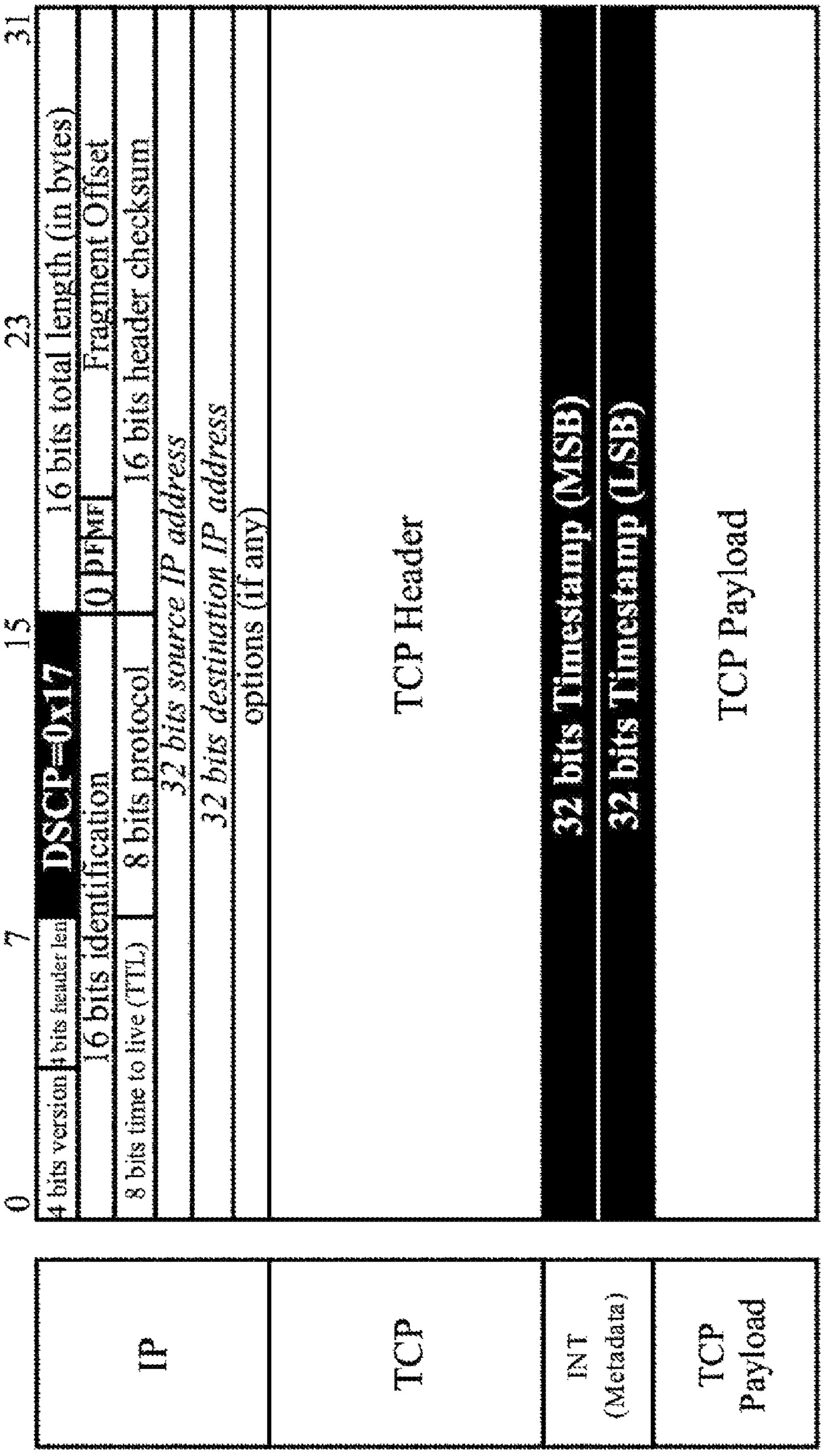

[Fig. 21]
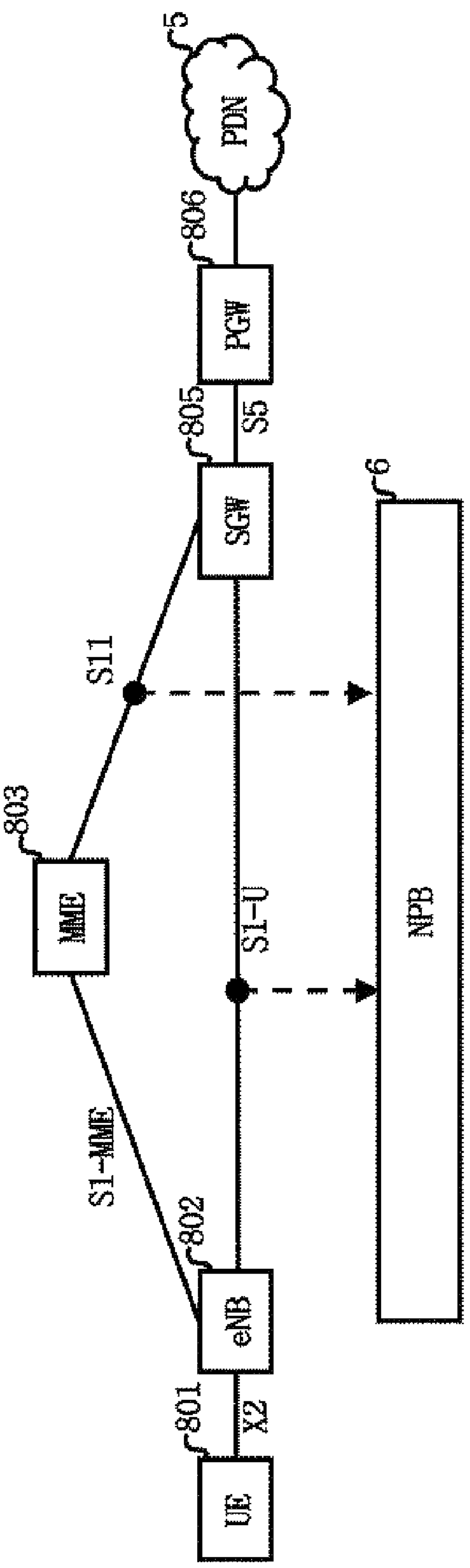

[Fig. 22]
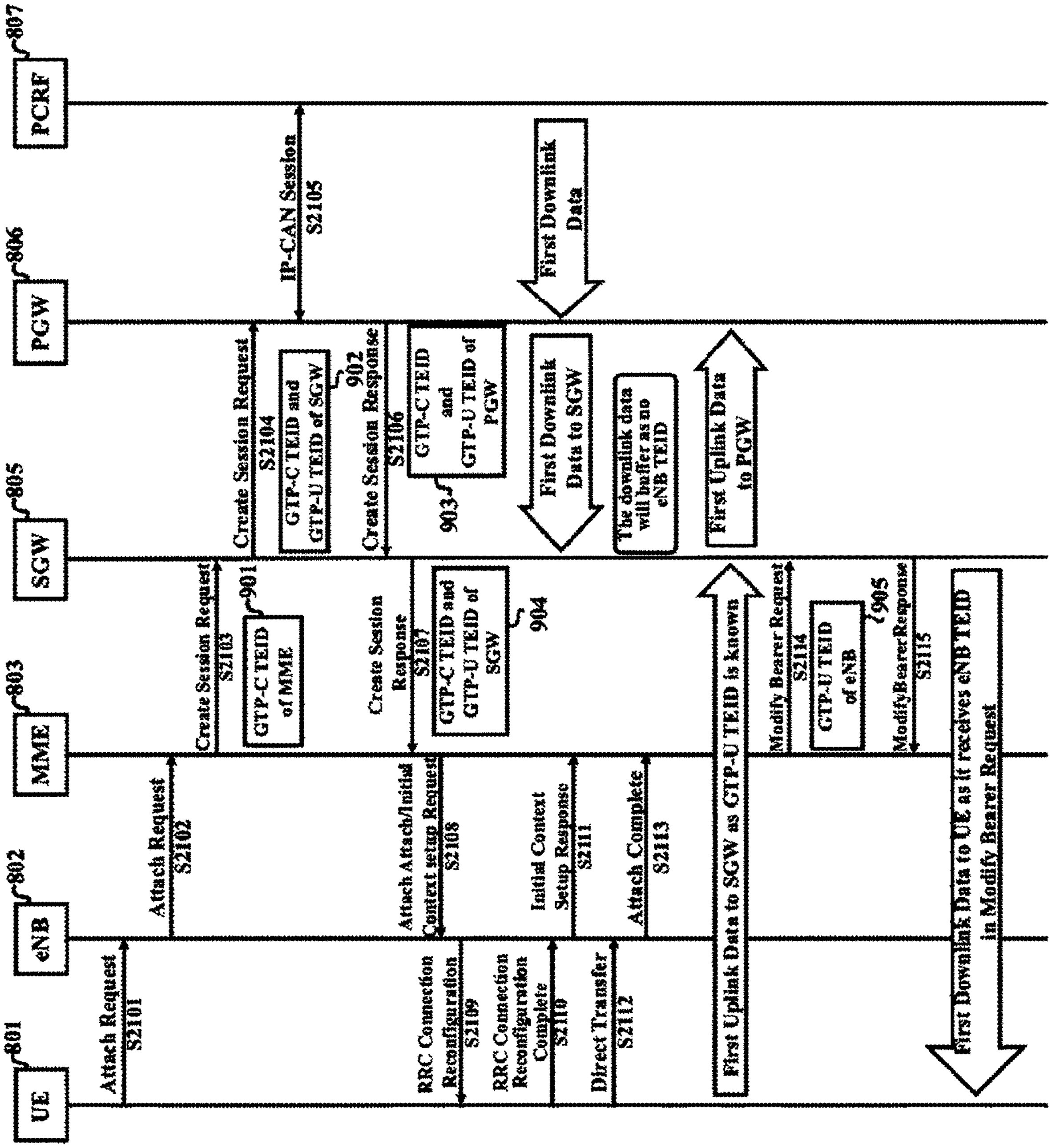

[Fig. 23]
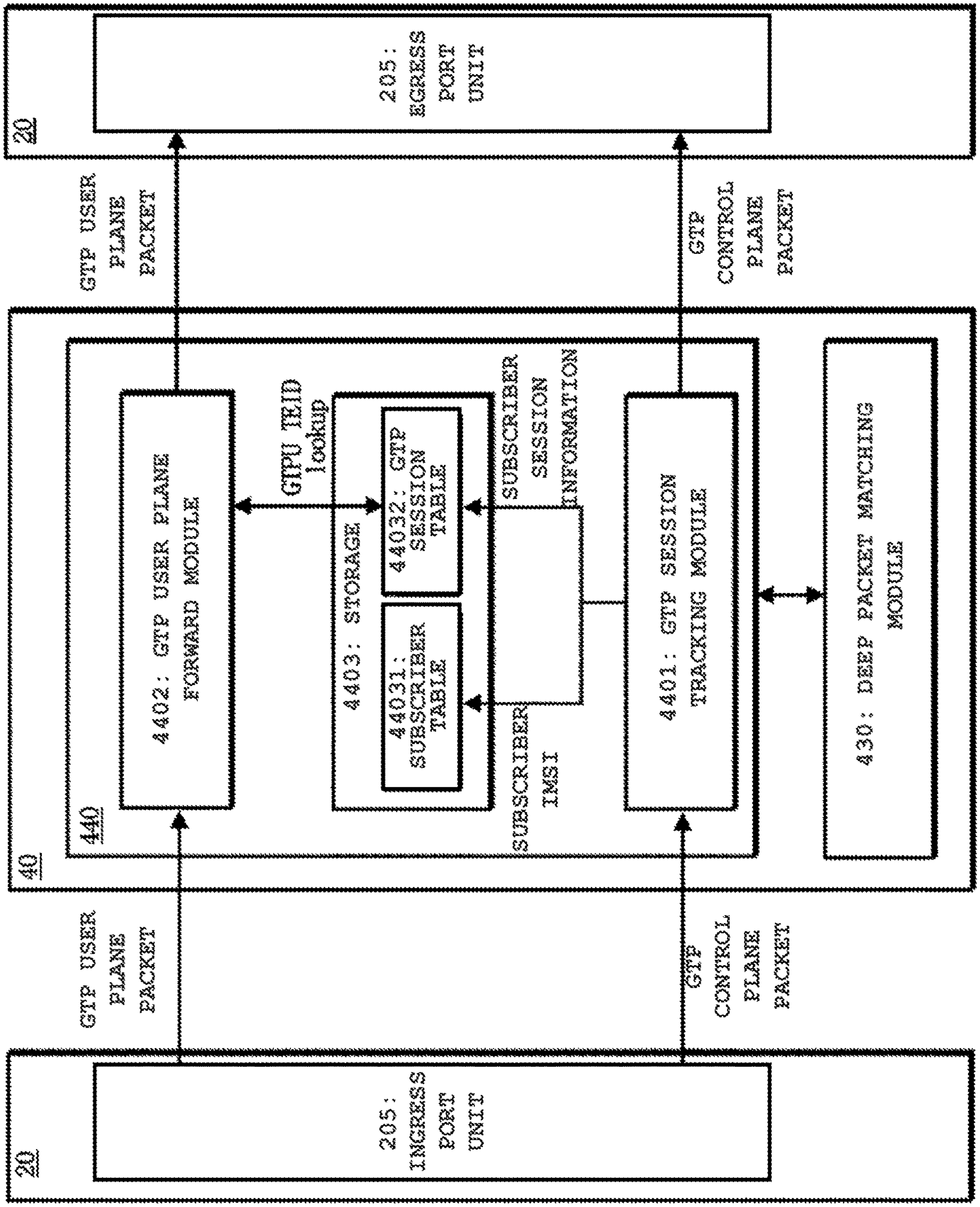

[Fig. 24]
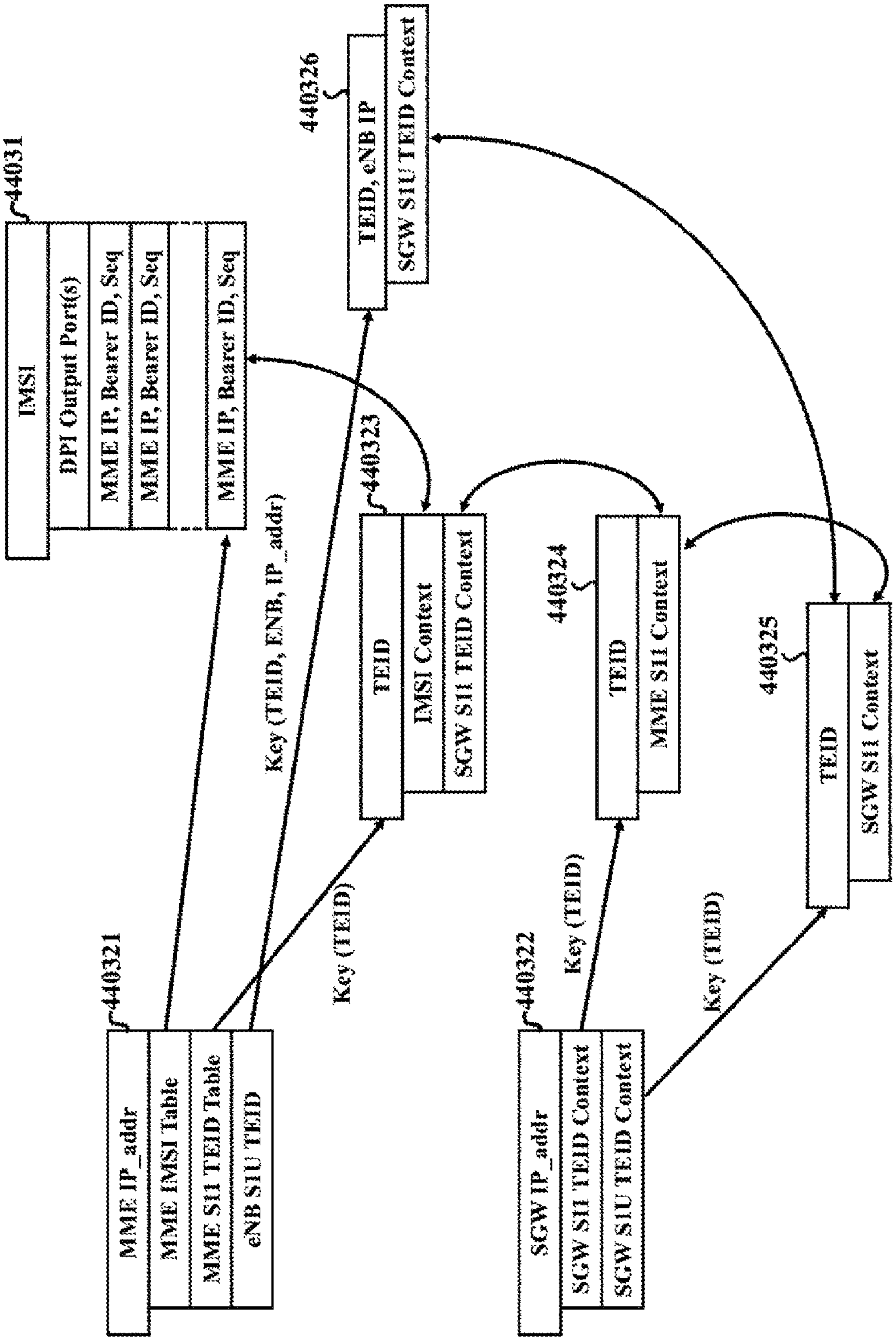

[Fig. 25]
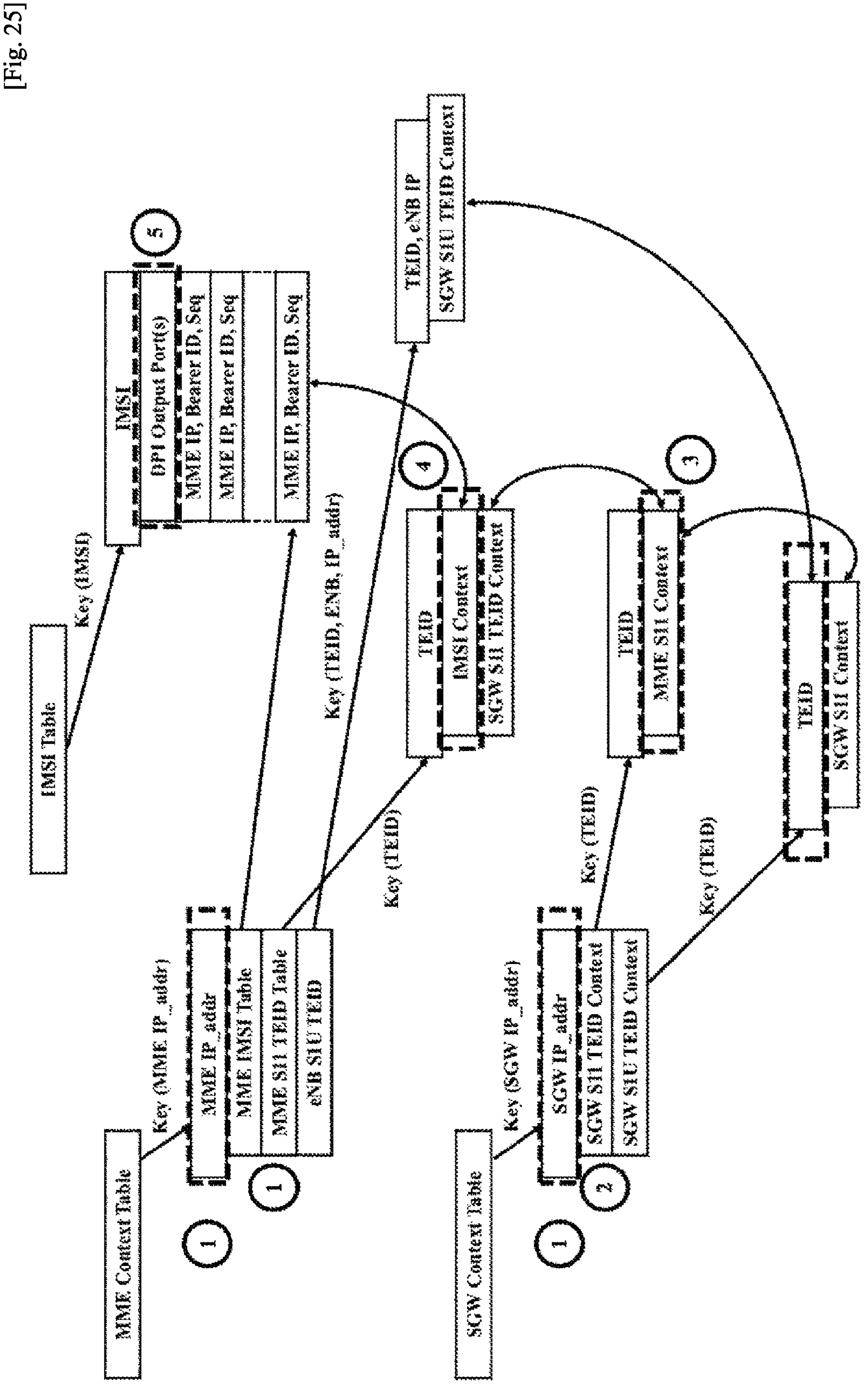

[Fig. 26]
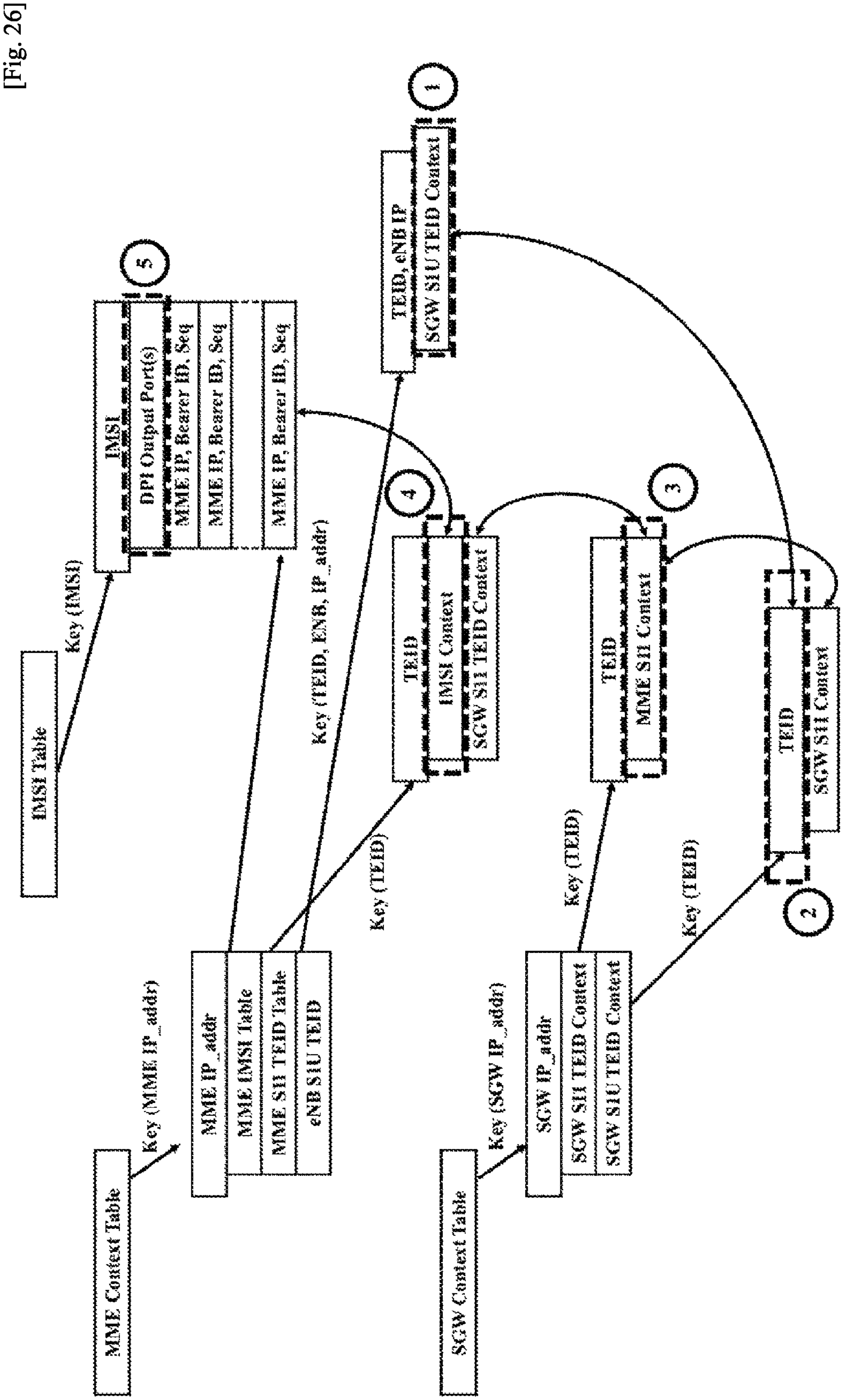

[Fig. 27]
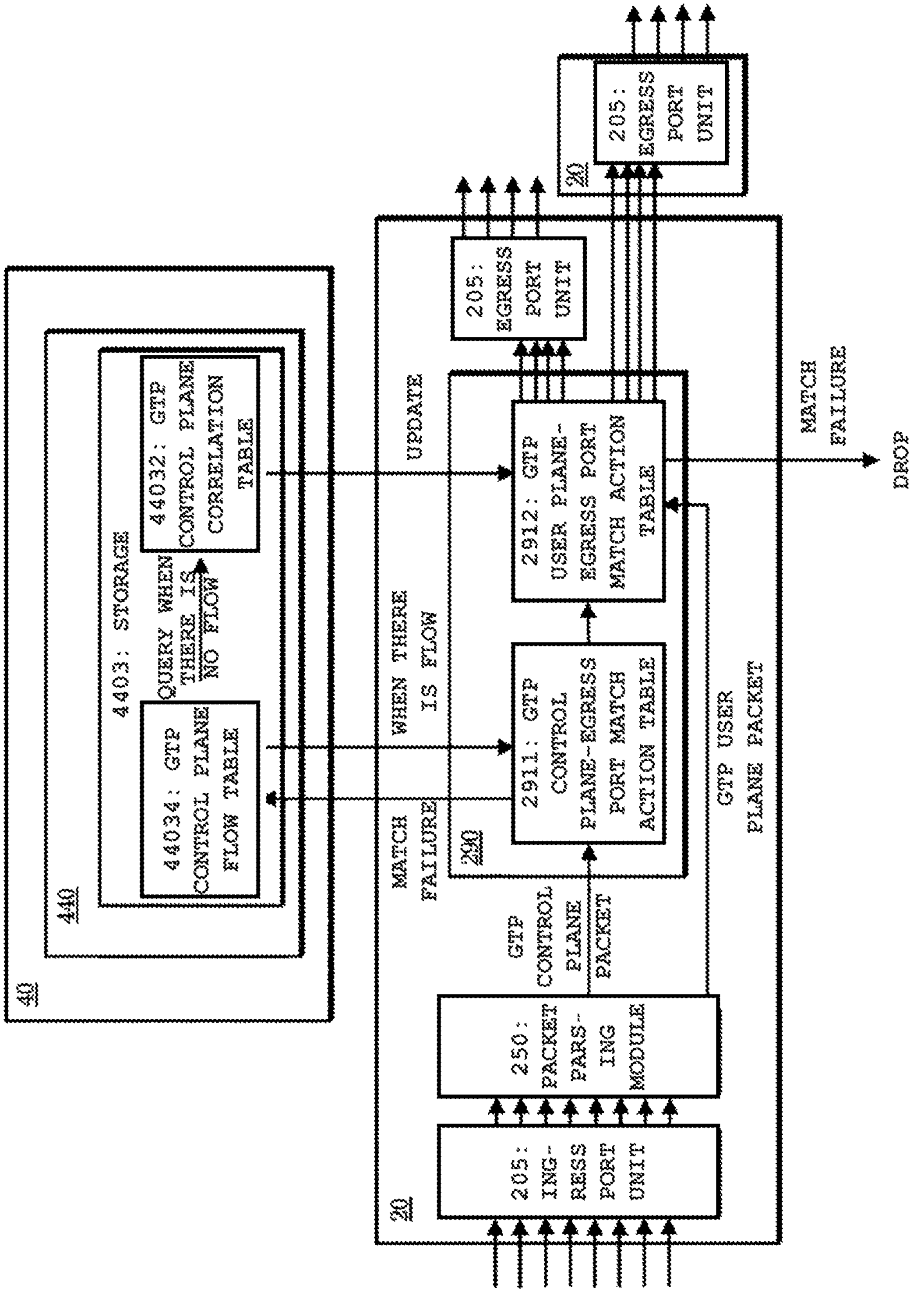

[Fig. 28]
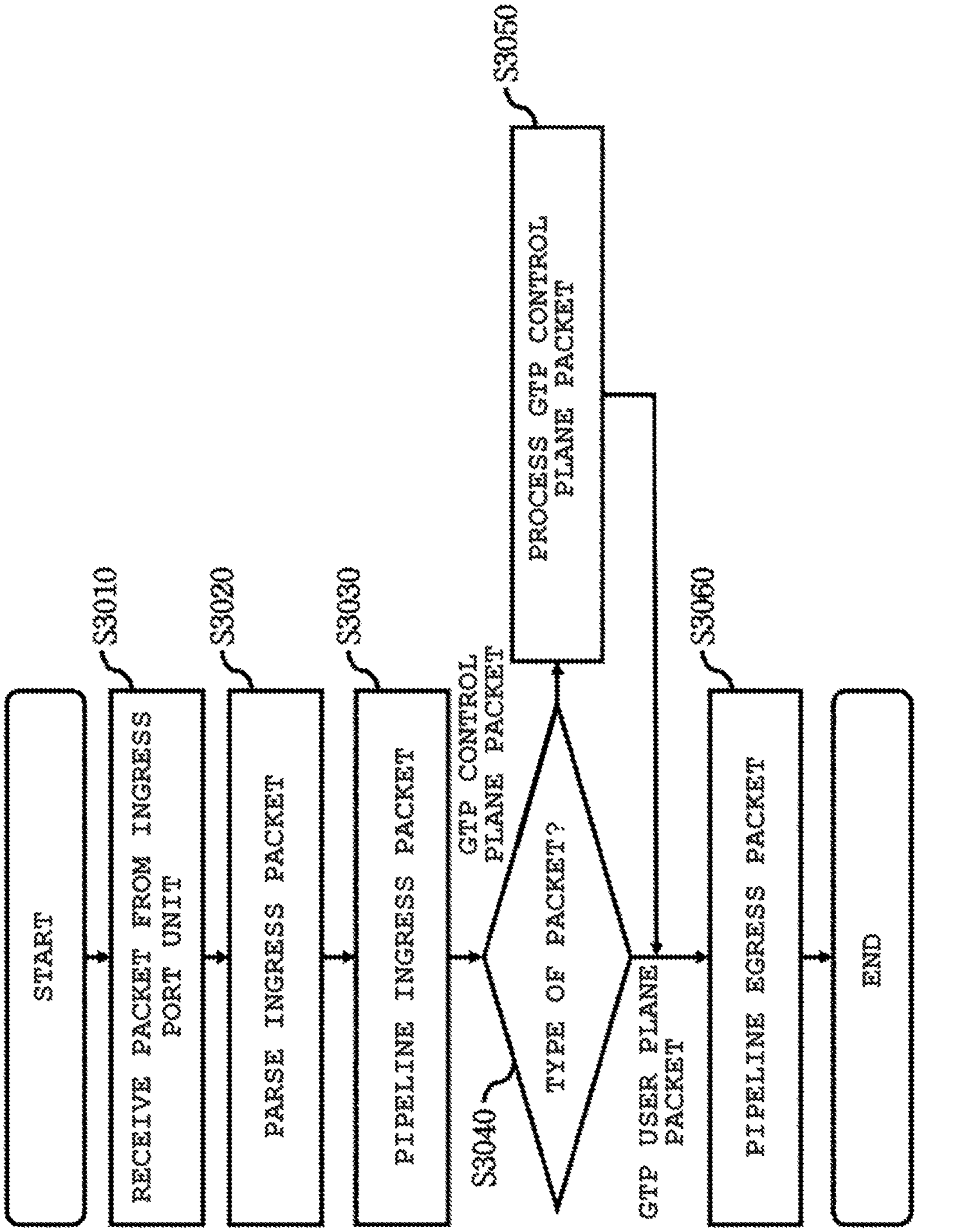

[FIG. 29]
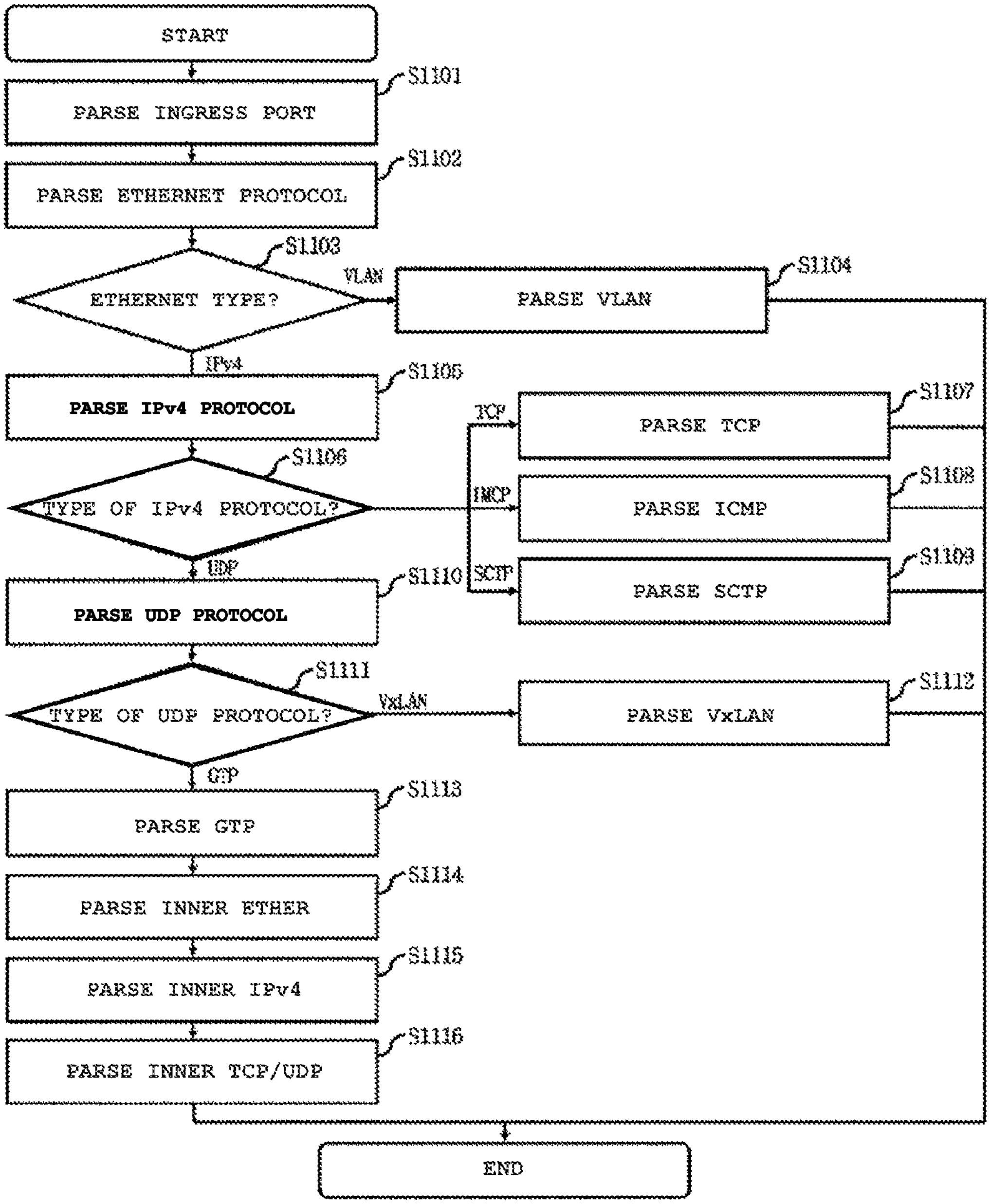

[Fig. 30]
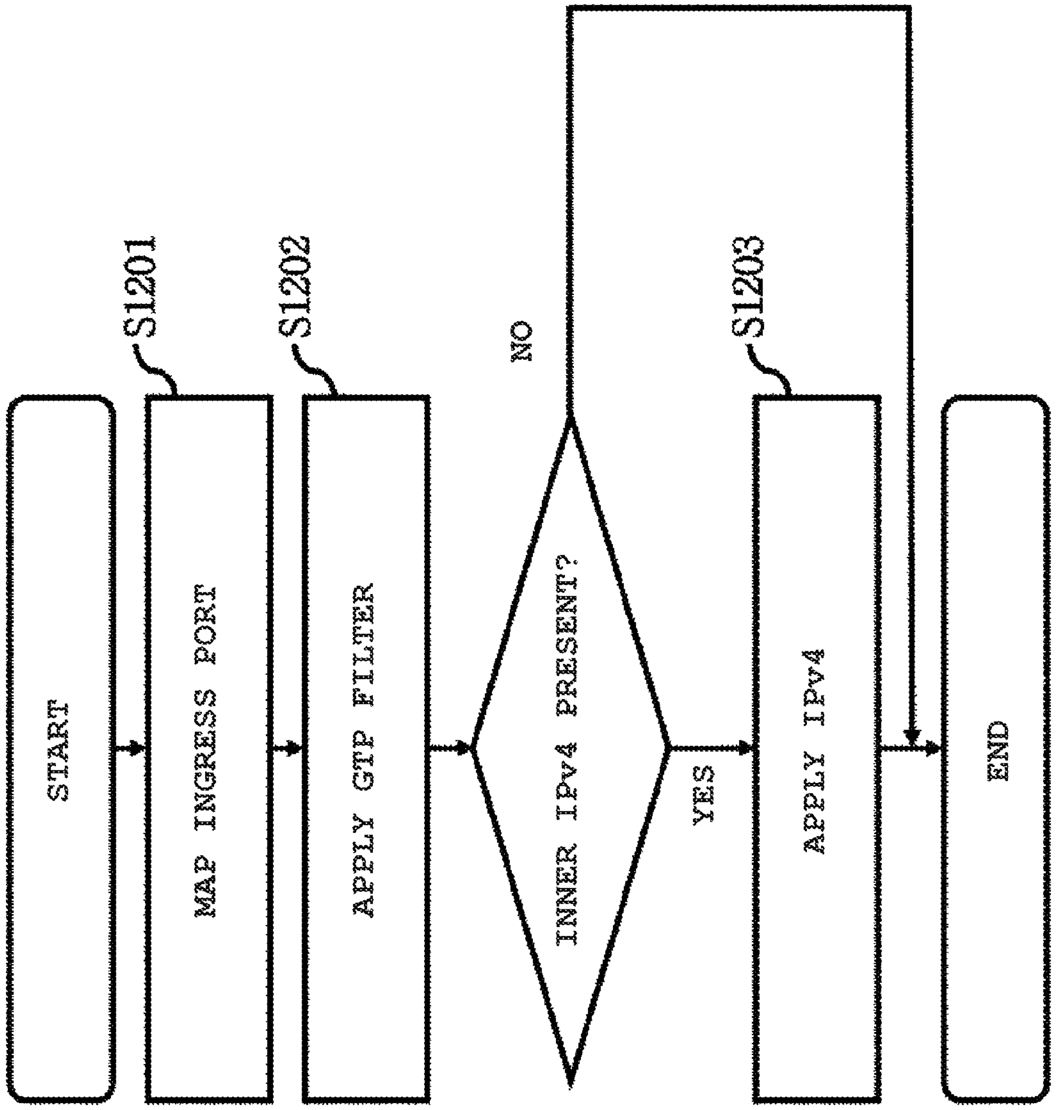

INTEGRATED WIRED/WIRELESS NETWORK INTERMEDIARY DEVICE, AND DEEP PACKET MATCHING METHOD THEREFOR

FIELD OF INVENTION

The present invention relates to a network packet broker and a method of processing a network packet using the same.

BACKGROUND OF INVENTION

With advances in mobile communication technology, 5G mobile communication technology for connection with a large number of devices such as the Internet of things while maintaining large-scale traffic with low latency and processing the same at high speed has been developed following 4G mobile communication technology for processing large-scale traffic at high speed.

In particular, research has been conducted into wired and wireless backhaul, midhaul, and fronthaul in order to smoothly provide a service of wirelessly transmitting data at high speed/low latency and a service for simultaneous connection with a large number of devices through a mobile communication access network, but in order to satisfy these requirements, large cost is required to establish an enormous 5G RAN due to the cost to establish enormous 5G fronthaul and monopoly based on the haul standards specific to a vendor of an existing radio access network (RAN) device.

Accordingly, conventionally, when a vendor of a RAN device uses the vendor specific fronthaul standard, there is a problem in that it is almost impossible for a new vendor to enter the market and the cost to establish enormous 5G RAN is incurred due to monopoly of an existing RAN vendor, and accordingly, there is a need for technology for implementing various network functions with software rather than being dependent upon a vendor.

Quality monitoring of a mobile network is always important, and time synchronization at opposite ends of a monitoring device improves the accuracy of an analysis system and thus is one of important technical factors.

However, there is a problem in that an expensive network interface card needs to be used to provide time synchronization by a quality monitoring device.

As a mobile network is developed into mobile edge computing (MEC), a packet of a subscriber needs to acquire all src/dst IPs in order to determine traffic of the subscriber at an edge.

However, in conventional system, it is impossible to match only a tunnel IP (GTP Outer IPs) in an edge cloud, and thus traffic steering depending on a type of internal traffic is impossible in the edge cloud, and entire traffic needs to be transmitted through the edge cloud, and thus unnecessary edge traffic is generated, thus increasing costs, and in the case of load balancing with only the GTP Outer, balancing performed in units of eNBs only, and accordingly, there is a problem in at balancing tilts.

With introduction of a 5G network, EPC functions are reconfigured and mapped 5G network functions (NF). In a control plane, authentication, access control, and mobility control functions of an EPC MME are reconfigured to 5GC Access and Mobility Management Function (AMF), and a session management function of an EPC MME and GW-C is reconfigured to 5GC Session Management Function (SMF).

As a user plane and a control plane are separate there is a problem that a quality monitoring device needs to associate a GTP user plane packet and a GTP control plane packet with each other and to transmit the associated packets together.

SUMMARY OF INVENTION

Technical Problem to be Solved

The present invention provides a network packet broker for embodying various network functions in software without being dependent upon a vendor by applying network dis-aggregation to wired and wireless networks.

The present invention provides a network packet broker and a packet timestamp assignment method thereof for providing an accurate hardware time synchronization function even at a switch level at which a register has a small storage space.

The present invention provides a network packet broker and a method of assigning a GTP correlation for associating a GTP user plane packet and a GTP control plane packet with each other and forwarding both the packets to an analysis device.

In addition, the present invention provides a network packet broker and a matching method of a deep packet thereof for providing matching of a deep packet by extracting GTP Inner information as well as GTP Outer information even at a switch level.

Technical Solution

According to an embodiment of the present invention, a network packet broker includes: a software defined network (SDN) controller configured to acquire information on a plurality of OpenFlow edge switches being connected to a plurality of legacy networks as a wireless access network or a wired access network and belonging to a switch group;

a legacy router container configured to consider a switch group including at least some of the plurality of switches as a virtual router and to generate routing information of a packet input to any one switch of the switch group; and a network application module configured to perform a function of controlling manipulation and flow of a packet in response to a request through the controller, wherein: the legacy router container maps a plurality of network devices connected to the plurality of OpenFlow edge switches for generating legacy routing information of a flow processing query message of the control router based on information on at least one virtual router to information of an external network connected directly to the virtual router;

the network application module includes a time synchronization module configured to synchronize a packet time using a timestamp value of a network device, the network packet broker further includes a processor; the switch further includes a processor; the processor of the network packet broker includes a clock for replying with a time value; the processor of the switch includes a register configured to store a time parameter corresponding to a time that elapses from a reference time in the processor; and when be switch receives a request for assignment of a timestamp of a packet, the time synchronization module corrects overflow of the time parameter from the register of the processor of the switch of the reference time and stores the timestamp in the packet.

The controller may further include a virtual wireless network control module configured to map a remote radio head (RRH) of the connected wireless access network to information on an external network connected directly to the virtual router.

The controller may further include a virtual wired network control module configured map an optical line terminal (OLT) of the connected wired access network to information on an external network connected directly to the virtual router.

The controller may further include a distributed wireless network control module configured to map a digital unit (DU) of the connected wireless access network to information on an external network connected directly to the virtual router.

According to an embodiment of the present invention, a timestamp assignment method of a packet of a network packet broker, the method including: acquiring a clock of the processor the network packet broker, by the switch;

updating a reference time parameter Tb of the switch using the acquired clock;

receiving a request for timestamp assignment of a packet, by the switch;

updating a previous elapsed time parameter Tp to a current elapsed time parameter Tc of the switch, by the time synchronization module;

acquiring a time value elapsed based on the parameter Tb as the parameter Tc from the switch, by the time synchronization module;

comparing the parameter Tc and the parameter Tp in size, by the time synchronization module;

when the parameter Tc is less than the parameter Tp, updating the parameter Tb by adding the sum of the parameter Tp and a correction value, by the time synchronization module;

when the parameter Tc is equal to or greater than the parameter Tp, updating the parameter Tb by adding the parameter Tp, by the time synchronization module; and storing the parameter Tb as a timestamp in a packet by she switch, by the time synchronization module.

The method may use an IEEE 1588 Precision Time Protocol (PTP) synchronization protocol.

The parameter Tp and the parameter Tc may be stored in the register of the processor of the switch.

A unit for storage of the register may be 48 bits.

In the storing as the timestamp in the packet, unit for storage of the timestamp may be 64 bits.

The correction value in the updating may be a maximum value of the unit of storage of the register.

The correction value of in the updating may be 4,294, 967,294.

According to an embodiment of the present invention, a network packet broker includes: a software defined network (SDN) controller configured to acquire information on a plurality of OpenFlow edge switches being connected to a plurality of legacy networks as a wireless access network or a wired access network and belonging to a switch group;

a legacy router container configured to consider a switch group including at least some of the plurality of switches as a virtual router and to generate routing information of a packet input to any one switch of the switch group; and a network application module configured to perform a function of controlling manipulation and flow of a packet in response to a request through the controller, wherein: the legacy router container maps a plurality of network devices connected to the plurality of OpenFlow edge switches for generating legacy routing information of a flow processing query message of the controller based on information on the at least one virtual router to information of an external network connected directly to the virtual router; and the network application module includes a GTP correlation module configured to associate a GTP-C packet and a GTP-U packet of a flow packet to be transmitted to the same egress port.

The GTP correlation module may include a storage configured to store a subscriber table for storing a subscriber IMSI and a GTP session table for storing subscriber session information;

a GTP user plane forward module configured to receive a GTP user plane packet from a port unit of the switch, to forward the GTP user plane packet to a port unit of a predetermined switch, to search for a GTPU TEID of the GTP user plane packet from the storage, to connect an egress port of the GTP user plane packet to the storage, and to store the GTP user plane packet; and a GTP control plane forward module configured to receive the GTP control plane packet from the port unit of the switch, to search for the egress port of the GTP user plane packet connected to the GTPU TEID of the GTP control plane packet from the storage, and to forward the GTP control plane packet received by the same port unit of the switch as the retrieved egress port.

The network packet broker may further include a processor, and the storage of the GTP correlation module may be positioned in the processor.

The storage of the GTP correlation module may include an IMSI table, an MME context table, and an SGW context table.

The subscriber table of the storage of the GTP correlation module may be an IMSI table.

The GTP session table of the storage of the GTP correlation module may include an MME context table and an SGW context table.

The GTP session table of the storage of the GTP correlation module may further include a correlation table for storing a correlation between the IMSI table, the MME context table, and the SGW context table.

The correlation table of the storage of the GTP correlation module may include a first correlation table, a second correlation table, a third correlation table, and a fourth correlation table.

According to an embodiment of the present invention, a matching method of a deep packet of a network packet broker includes: forwarding a GTP user plane by receiving a GTP user plane packet from a port unit of the switch, forwarding the GTP user plane packet to a port unit of a predetermined switch, searching for a GTPU TEID of the GTP user plane packet from the storage, connecting an egress port of the GTP user plane packet to the storage, and storing the GTP user plane packet; and forwarding a GTP control plane by receiving the GTP control plane packet from the port unit of the switch, searching for the egress port of the GTP user plane packet connected to the GTPU TEID of the GTP control plane packet from the storage, and forwarding the GTP control plane packet received by the same port unit of the switch as the retrieved egress port.

The method may include: generating a record using an MME IP address as a key and a bearer ID set including an MME IP, a bearer ID, and a sequence and an MME S11 TEID as a value in the MME context table, by the GTP correlation module;

generating a record using an SGW IP address as a key in the SGW context table, by the GTP correlation module;

searching for a record using the SGW IP address as a key in the SGW context table and updating an SGW S11 TEID and an SGW S1U TEID by the GTP correlation module;

generating a record using the MME S11 TEID as a key and IMSI context and SGW S11 TEID context as a value in the first correlation table, by the GTP correlation module;

generating a record using the SGW S11 TEID as a key and the MME S11 context as a value in the second correlation table, by the GTP correlation module;

generating a record using the SGW S11 TEID as key and the SGW S11 TEID context as a value in the third correlation table, the GTP correlation module;

generating a record using an eNB TEID and an eNB IP as key and the SGW S1U TEID context as value in the fourth correlation table, by the GTP correlation module;

updating the bearer ID set including the MME IP, the bearer ID, and the sequence of the record using the MME IP address as a key and an eNB S1U TEID as a value in the MME context table, by the GTP correlation module; and generating a record using, the INSI as a key and the bearer ID set including the MME IP, the bearer ID, and the sequence as a value in the IMSI table, by the GTP correlation module.

According to an embodiment of the present invention, provided is a matching method of a deep packet of a network packet broker including: a software defined network (SDN) controller configured to acquire information on a plurality of OpenFlow edge switches being connected to a plurality of legacy networks as a wireless access network or a wired access network and belonging to a switch group;

a legacy router container configured to consider a switch group including at least some of the plurality of switches as a virtual router and to generate routing information of a packet input to any one switch of the switch group; and a network application module configured to perform a function of controlling manipulation and flow of a packet in response to a request through the controller, wherein: the legacy router container maps a plurality of network devices connected to the plurality of OpenFlow edge switches for generating legacy routing information of a flow processing query message of the controller based on information on the at least one virtual router to information of an external network connected directly to the virtual router;

the network application module includes a GTP correlation module configured to associate a GTP-C packet and a GTP-U packet of a flow packet to be transmitted to the same egress port;

the network application module includes a deep packet matching module configured to extract, modify, remove, or insert a GTP header or a VxLAN header of a flow packet;

the GTP correlation module includes a GTP session tracking module, a GTP user plane forward module, and a storage; and the deep packet matching module controls the GTP correlation module to match a GTP control plane packet and a GTP user plane packet.

The method may include: receiving a packet from an ingress port unit of the switch, by the deep packet matching module;

parsing an ingress packet by extracting deep packet information from the received packet, by the packet parsing module of the switch;

pipelining an ingress packet by processing a packet using the acquired information, by the deep packet matching module;

classifying a type of the pac from information of the acquired packet, by the deep packet matching module;

when the classified type of the packet is a GTP control plane packet, processing the GTP control plane packet by querying a GTP Control lane-egress port Match Action Table about flow matched with the packet and acquiring the egress port unit or egress port group to which the packet is to be transmitted, by the GTP session tracking module; and when classified type of the packet GTP user plane packet, pipelining an egress packet by querying a GTP User plane-egress port Match Action Table about flow matched with the packet and processing the packet, by the GTP user plane forward module.

The method may include parsing the ingress port by extracting information of the ingress port in the ingress packet, by the packet parsing module;

parsing an Ethernet protocol by extracting information of the Ethernet protocol from the ingress packet, by the packet parsing module;

when the extracted Ethernet protocol information is VLAN, parsing VLAN by extracting VLAN information from the ingress packet, by the packet parsing module;

when the extracted Ethernet protocol information is IPv4, parsing IPv4 extracting IPv4 information from the ingress packet, by the packet parsing module;

when a type of the extracted IPv4 protocol is TCP, parsing the TCP by extracting TCP information from the ingress port, the packet parsing module;

when a type of the extracted IPv4 protocol is an Internet Control Message Protocol ("ICMP"), parsing the ICMP by extracting ICMP information from the ingress packet, by the packet parsing module;

when a type of the extracted IPv4 protocol is SCTP, parsing the SCTP by extracting SCTP information from the ingress packet, by the packet parsing module;

parsing a UDP extracting UDP protocol number information from the ingress packet, by the packet parsing module;

when the extracted UDP protocol number is VxLAN, parsing the VxLAB by extracting VxLAN information from the Ingress packet, by the packet parsing module;

when the extracted UDP protocol number is GTP, parsing the GTP by extracting GTP information from the Ingress packet, by the packet parsing module;

parsing the inner Ether by extracting inner Ether information from the ingress packet, by the packet parsing module;

parsing inner IPv4 by extracting inner IPv4 information from the ingress packet, by the packet parsing module; and parsing inner TCP/UDP by extracting inner TCP and inner UDP information from the ingress packet, by the packet parsing module.

The pipelining the ingress packet may include mapping the ingress port by converting an ingress physical port into a logic port used in a Match Action table, by the deep packet matching module;

applying a GTP filter by storing processing of a packet corresponding to the GTP information extracted from the ingress packet in an egress port match action table, by the deep packet matching module; and when there is the inner IPv4 information extracted from the ingress packet, applying an inner IPv4 filter by storing processing of a packet corresponding to the extracted inner IPv4 information in the egress port match action table, by the deep packet matching module.

The parsing the egress packet may include: parsing an ingress port filter number by extracting an ingress port filter number from an egress packet, by the deep packet matching module;

matching an ingress port filter by querying a policy manager module about the ingress port filter number extracted, from the egress packet, by the deep packet matching module;

when there is the matched ingress port filter number, extracting a matched ingress port action, by the policy manager module;

parsing a GTP filter number by extracting, a GTP filter number from the egress packet, by the deep packet matching module;

matching a GTP filter by querying the policy manager module about the GTP filter number extracted from the egress packet, by the deep packet matching module;

when there is the matched GTP filter number, extracting the matched GTP action, by the policy manager module;

parsing an, Inner IPv4 by extracting Inner IPv4 information from the egress packet, by the deep packet matching module;

matching Inner IPv4 by querying the policy manager module about the Inner IPv4 information extracted from the egress packet, by the deep packet matching module;

when there is the matched Inner IPv4 information, extracting the matched Inner IPv4 action, by the policy manager module; and generating an action list by storing the egress packet and all pairs of extracted action lists in the GTP User plane-egress port Match Action Table, by the deep packet matching module.

Effect of Invention

A network packet broker according to an embodiment of the present invention may commonly apply Network disaggregation based on a software defined network (SDN) to wired and wireless access networks to separate BBU and RRH for the wireless access network, to abstract a RAN protocol layer, to provide compatibility with an existing vendor lock-in protocol through service chaining for each piece of access equipment, and to split various functions based on open hardware/software.

The network packet broker according to an embodiment of the present invention may include a time synchronization module for synchronizing a packet time using a timestamp value of a network device, and when a packet timestamp assign method using the network packet broker is used, even if over flow of a register of a counter for an elapsed time of a processor of a switch occurs, a timestamp having accuracy corresponding to a level of nanoseconds in the form of a Coordinated Universal Time (UTC) at a hardware level may be assigned to a packet by correcting the overflow.

The network packet broker according to an embodiment of the present invention may include a GTP correlation module for associating a GTP-C packet and a GTS-U packet of a flow packet to be forwarded to the same egress port, and a GTP correlation assignment method using the network packet broker may assign a correlation to forward a GTP control plane packet and a GTP user plane packet to the same egress port.

The network packet broker according to an embodiment of the present invention may include a deep packet matching module for controlling the GTP correlation module to match the GTP control plane packet and the GTP user plane packet, and a GTP deep packet matching method using the network packet broker may extract packet information in a deep stage at a switch level and may match flows of the GTP control plane packet and the GTP user plane packet.

BRIEF DESCRIPTION OF DRAWINGS

FIG. 1 is a block diagram of a network packet broker system according to an embodiment of the present invention.

FIG. 2 is a block diagram of a network packet broker according to another embodiment of the present invention.

FIG. 3 is a block diagram of a network packet broker system according to another embodiment of the present invention.

FIG. 4 is a block diagram of a network packet broker system according to another embodiment of the present invention.

FIG. 5 is a block diagram of a SDN controller of a network packet broker according to an embodiment.

FIG. 6 is a block diagram of a switch of a network packet broker.

FIG. 7 shows a field table of a flow entry and an operation table showing a type of an operation depending on a flow entry.

FIG. 8 shows a field table of a group and a meter table.

FIG. 9 is a block diagram of a network system including a routing system according to an embodiment of the present invention.

FIG. 10 is a block diagram of a legacy router container according to an embodiment of the present invention.

FIG. 11 is a block diagram obtained via virtualization of the network system of FIG. 9.

FIG. 12 is a flowchart of a method of determining whether legacy routing is performed on a flow of an SDN controller.

FIG. 13 is a signal flowchart of an integrated routing method according to an embodiment of the present invention.

FIG. 14 is a signal flowchart of an integrated routing method according to another embodiment of the present invention.

FIG. 15 shows a flow table according to an embodiment of the present invention.

FIG. 16 illustrates a network application module according to an embodiment of the present invention.

FIG. 17 is a block diagram of a controller of a network packet broker according to an embodiment of the present invention.

FIG. 18 illustrates a timestamp assignment method of a packet according to an embodiment of the present invention.

FIG. 19 illustrates a timestamp assignment method depending on a structure of a packet according to an embodiment of the present invention.

FIG. 20 illustrates a timestamp assignment method depending on a structure of a packet according to an embodiment of the present invention.

FIG. 21 illustrates an example in which a network packet broker is connected to wireless cellular network architecture according to an embodiment of the present invention.

FIG. 22 is a schematic diagram of an access procedure of user equipment in a mobile communication network according to an embodiment of the present invention.

FIG. 23 is a diagram showing the configuration of a network packet broker according to an embodiment of the present invention.

FIG. 24 illustrates a storage of a GTP correlation module according to an embodiment of the present invention.

FIG. 25 illustrates a method of acquiring a packet output port of a GTP-C packet matched with a GTP-U packet according to an embodiment of the present invention.

FIG. 26 illustrates a method of acquiring a packet output port of a GTP-C packet matched with a GTP-U packet according to another embodiment of the present invention.

FIG. 27 illustrates a structure in which a deep packet matching module of a network packet broker processes a packet according to an embodiment of the present invention.

FIG. 28 illustrates a matching method of a deep packet of a network packet broker according to an embodiment of the present invention.

FIG. 29 illustrates a parsing operation of an ingress packet according to an embodiment of the present invention.

FIG. 30 illustrates an operation of pipelining an ingress packet of a deep packet matching module according to an embodiment of the present invention.

BEST MODE

Figure 31:
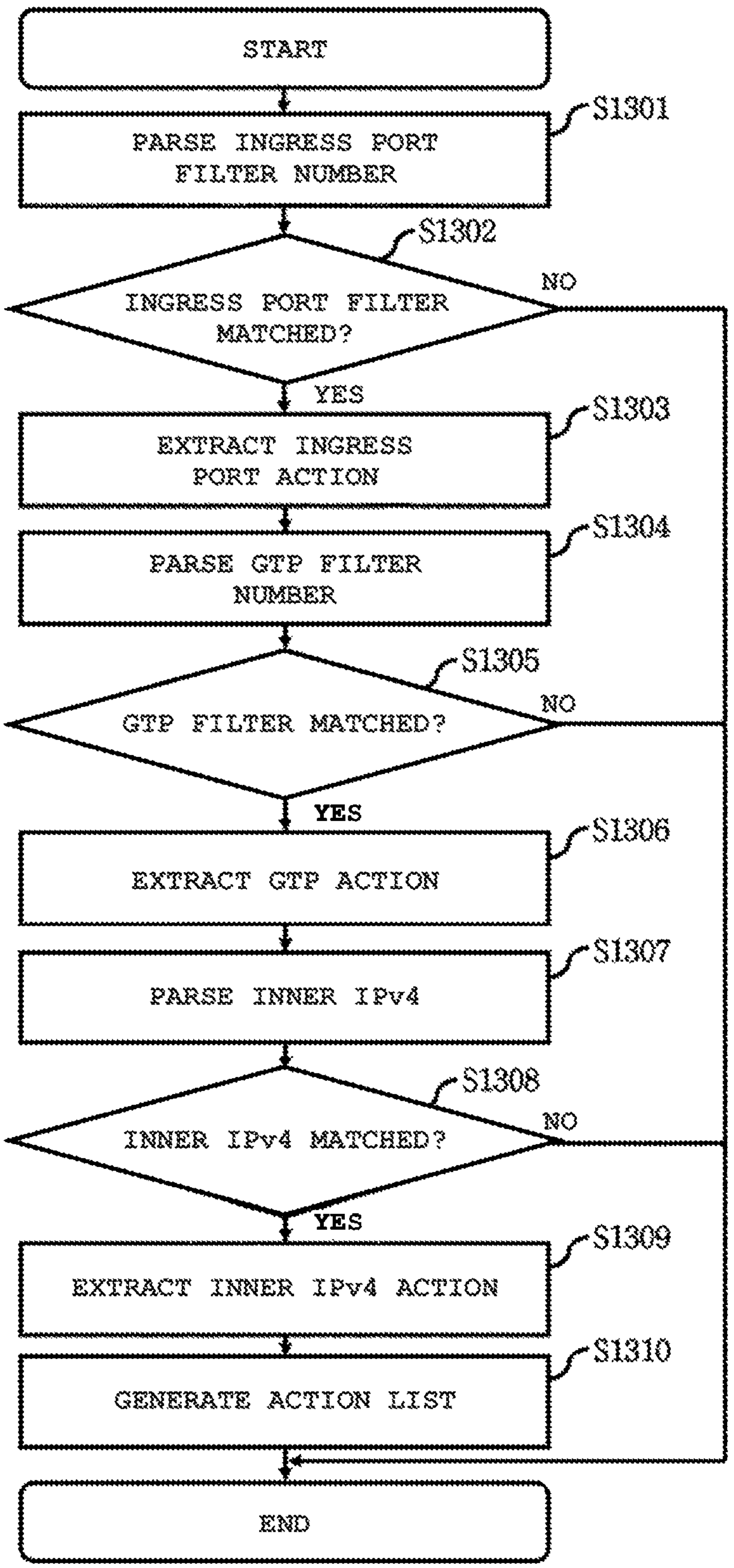
FIG. 31 illustrates a parsing operation of an egress packet according to an embodiment of the present invention.

Hereinafter, the present invention will be described in detail.

Terms such as "first" and "second" are used herein merely to describe a variety of constituent components, but the constituent components are not limited by the terms. The terms are used only for the purpose of distinguishing one constituent component from another constituent component. For example, a first component may be termed a second component and a second component may be termed a first component without departing from the teachings of the present invention. The term "and/or" includes combinations of a plurality of associated listed items or any one of a plurality of associated listed items.

It will be understood that when a component is referred to as being "on", "connected to" or "coupled to" another component, it may be directly on, connected or coupled to the other component or intervening components may be present. In contrast, when a component is referred to as being "directly on," "directly connected to" or "directly coupled to" another component or layer, there are no intervening components or layers present. In addition, when first and second components on a network are referred to as being connected or coupled, this may mean that data is transmitted and received between the first and second components in a wired or wireless manner.

In addition, the suffixes "module" and "unit" of components herein are used for convenience of description and do not have any distinguishable meanings or functions. Accordingly, "module" and "unit" can be used interchangeably.

When such components are implemented in an actual application, two or more components may be combined into one component or one component may be subdivided into two or more components as necessary. The same reference numerals are assigned to the same or similar components throughout the drawings, and a detailed description of components having the same reference numerals may be replaced by a description of the aforementioned components or may be omitted.

Referring to FIG. 1, network packet broker system according to an embodiment of the present invention may include a plurality of remote radio heads (RRHs) 2 for transmitting and receiving data of wireless terminal, radio access network (RAN) equipment 3 for transmitting and receiving data of a wireless terminal and allocating a MAC address to a frame, a plurality of optical line terminals (OLTs) 4, a mobile communication core network 5, and a network packet broker 6 connected to the mobile communication core network 5.

Referring to FIG. 2, the network packet broker according to an embodiment of the present invention may include a plurality of OpenFlow edge switches 20 that is connected to the remote radio head (RRH) over Ethernet, is connected to the RAN equipment over Ethernet, or is connected to the optical line terminal (OLT) through a passive optical network (PON), a software defined network (SDN) controller 10 for acquiring information on the plurality of OpenFlow edge switches, a network application module 40 for performing various functions on a network when calling the functions through the SDN controller, and a legacy router container 300 for considering a switch group including at least some of the plurality of switches as a virtual router and generating routing information of a packet input to any one switch of the switch group. The legacy router container 300 may map a plurality of network devices connected to the plurality of OpenFlow edge switches for generating legacy routing information of a flow processing query message of the controller based on information on the at least one virtual router, to information of an external network connected directly to the virtual router.

The SDN controller 10 may be a type of command computer for controlling an SDN system and may perform various and complex functions, for example, routing, policy declaration, and security check. The SDN controller 10 may define a flow of packets generated by the plurality of switches 20 at a low layer. The SDN controller 10 may calculate a path (data path) though which the flow is to be transmitted with reference to a network topology of flow allowed according to a network policy and may then set an entry of the flow in a switch on the path. The SDN controller 10 may communicate with the switch 20 using a specific protocol, for example, an OpenFlow protocol. A communication channel between the SDN controller 10 and the switch 20 may be encrypted based on SSL. The SDN controller 10 may be physically included in the network packet broker 6 or may be an external device connected to the network packet broker 6.

A virtualized network function may be Network Function Virtualization (NFV) defined in NFV-related white paper issued in European Telecommunication Standards Institute (ETST). Throughout the specification, a network function (NF) may be interchangeably used with Network Function Virtualization (NFV). The NFV may be used to dynamically generate L4-7 service connection required for each tenant and provide a necessary network function, or to rapidly provide firewall, IPS, and DPI functions that are required based on a policy IPS, case of DDoS attacks through a series of service chaining. In addition, the NFV may easily turn on and off a firewall or Intrusion Detection System/Intrusion Prevention System (IDS/IPS) and may automatically perform provisioning. The NFV may also reduce the need for overprovisioning.

Referring to FIG. 3, a network device 2, 3, 4, or not shown may be a physical or virtual device connected to the switch 20 and may be user equipment (LP) for transmitting and receiving data or information, or may perform a specific function. In terms of hardware, the network device 30 may be a personal computer (PC), a client terminal, a server, a workstation, a super computer, a mobile communication terminal, a smartphone, a tablet, or the like. The network device 30 may be a virtual machine (VM) generated on a physical device.

The network device may be referred to as a network function for performing various functions on a network. The network function may include anti-DDoS, Intrusion Detection System/Intrusion Prevention System (IDS/IPS), integrated security services, a virtual private network service, anti-virus, anti-spam, security services, access management services, a firewall, load balancing, QoS, and video optimization. The network function may be virtualized.

Referring to FIG. 4, the SDN controller 10 according to an embodiment of the present invention may further include a virtual wireless network control module 150 for mapping the remote radio head (RRH) 2 of the connected wireless access network to information on an external network connected directly to the virtual router. The SDN controller 10 according to an embodiment of the present invention may further include a distributed wireless network control module 160 for mapping a digital unit (DU) of the wireless access network to information on an external network connected directly to the virtual router. The SDN controller 10 according to an embodiment of the present invention may further include a virtual wired network control module 170 for mapping an optical line terminal (OLT) of the connected wired access network to information on an external network connected directly to the virtual router.

Referring to FIG. 5, the SDN controller 10 according to an embodiment of the present invention may include a switch communication unit 110 that communicates with the switches 20 shown in FIG. 2, a controller 100, and a storage 190.

Referring to FIG. 5, the controller 100 of the SDN controller may further include a topology management module 120, a path calculation module 125, an entry management module 135, a message management module 130, a legacy interface module 145, and an API interface module 146. Each module may be configured in hardware within the controller 100 or may be configured in separate software from the controller 100. The components having the same reference numeral are understood with reference to the description of FIG. 2.

Referring to FIG. 5, the controller 100 of the SDN controller 10 according to an embodiment of the present invention may include a time synchronization module 410 for synchronizing a packet time using a timestamp value of a network device, a policy manager module 420 for controlling quality of service (QoS), and a deep packet matching module 430 for extracting, modifying, removing, or inserting a GTP header or VxLAN header of a flow packet.

The storage 190 may store a program for processing and control of the controller 100. The storage 190 may perform a function for temporarily storing input or output data (a packet, a message, or the like). The storage 190 may include an entry database (DB) for storing a flow entry.

The controller 100 may generally control an operation of each unit and may control the overall operation of the SDN controller 10. The controller 100 may include the topology management module 120, the path calculation module 125, the entry management module 135, an API server module 136, an API parser module 137, and the message management module 130. Each module may be included as hardware within the controller 100 or may be configured as separate software from the controller 100.

The topology management module 120 may establish and manage network topology information based on a connection relationship of the switches 20, collected through the switch communication unit 110. The network topology information may include topology between switches and network device topology connected to each switch.

The path calculation module 125 may calculate a data path of a packet received through the switch communication unit 110 and an action column executed in a switch on the data path based on the network topology information established by the topology management module 120.

The entry management module 135 may register an entry of a flow table, a group table, and a meter table in the entry DB 191 based on the calculation result of the path calculation module 125, a policy of QoS, a user instruction, or the like. The entry management module 135 may previously register an entry of each table in the switches 20 (proactive) or may respond to a request for addition or update of the entry from the switches 20. The entry management module 135 may change or remove an entry of the entry DB 191 as necessary or according to an entry destruction message, etc. of the switches 20.

The API parser module 137 may interpret a procedure of changing the mapped information of a network device.

The message management module 130 may interpret a message received through the switch communication unit 110 or may generate an SDN controller-switch message, which is described below, to be transmitted to a switch through the switch communication unit 110. A modify state message that is one of the SDN controller-switch message may be generated based on an entry based on the entry management module 135 or an entry stored in the entry DB 191.

When a switch group includes an OpenFlow edge switch and an existing legacy switch, the topology management module 120 may acquire connection information with the legacy switch through the OpenFlow edge switch.

The legacy interface module 145 may communicate with the legacy router container 300. The legacy interface module 145 may transmit topology information of a switch group established by the topology management module 120 to the legacy router container 300. The topology information may include, for example, connection relationship information of first to fifth switches SW1 to SW5 and connection or access information of a plurality of network devices connected to first to fifth switches SW1 to SW5.

When it is impossible to generate a processing rule of a flow included in a flow query message received from the OpenFlow edge switch, the message management module 130 may transmit the corresponding flow to the legacy router container 300 through the legacy interface module 145. The corresponding flow may include a packet received from the OpenFlow edge switch and port information of a switch for receiving the packet. The case in which it is impossible to generate the processing rule of the flow may include the case in which a received packet includes a legacy protocol and is not capable of being interrelated, and the case in which the path calculation module 125 is not capable of calculating a path of the legacy packet.

The switch 20 may each be a physical switch or a virtual switch for supporting an OpenFlow protocol. The switch 20 may process the received packet and may relay flow between the network devices 30. To this end, the switch 20 may include one flow table or a multiple flow table for processing a pipeline.

The flow table may include a flow entry for defining a rule for a method of process the network device 2, 3, 4, or not shown.

The flow may refer to a series of packets sharing a value of at least one header field or a packet flow of a specific flow based on a combination of various flow entries of multiple switches in terms of one switch. The OpenFlow network may perform path control, fault recovery, load distribution, and optimization in units of flows.

The switch 20 may be classified into an edge switch (ingress switch and egress switch) at an ingress and an egress of the flow based on a combination of multiple switches and a core switch between edge switches.

Referring to FIG. 6, the switch 20 may include a port unit 205 for communicating with another switch and/or a network device, an SDN controller communication unit 210 for communicating with the SDN controller 10, a controller 200, and a storage 290.

The port unit 205 may include one pair of ports to or from a switch or a network device. One pair of ports may be embodied as one port.

The storage 290 may store a program for processing and controlling the controller 200. The storage 290 may perform function for temporarily storing input or output data (a packet, a message, or the like). The storage 290 may include a table 291 such as a flow table, a group table, and a meter table. An entry of the table 291 or a table may be added, modified, or removed by the SDN controller 10. The table entry may be autonomously destroyed.

The controller 200 may generally control an operation of each unit and may control the overall operation of the switch 20. The controller 200 may include a table management module 240 for managing the table 291, a flow search module 220, flow processing module 230, and a packet processing module 235. Each module may be configured in hardware within the controller 200 or may be configured in separate software from the controller 200.

The table management module 240 may add an entry received from the SDN controller 10 through the SDN controller communication unit 210 to an appropriate table or may periodically remove a timed-out entry.

The flow search module 220 may extract flow information from a packet received as user traffic. The flow information may include identification information of an ingress port that is a packet incoming port of an edge switch, identification information of a packet incoming port of a corresponding switch, packet header information (IP addresses of a transmitter and a destination, a MAC address, a port, VLAN information, etc.), and metadata. The metadata may be selectively added from a previous table or may be data added from another switch. The flow search module 220 may search for a flow entry from a packet received from the table 291 with reference to the extracted flow information. When retrieving the flow entry, the flow search module 220 may request a flow processing module 260 to process the received packet according to the retrieved flow entry. When failing in searching for the flow entry, the flow search module 220 may transmit the received packet or minimal data of the received packet to the SDN controller 10 through the SDN controller communication unit 210.

The flow processing module 230 may process an action of outputting a packet to a specific port or multiple ports, dropping the packet, or modifying a specific header field according to a procedure stated in the entry retrieved in the flow search module 220.

The flow processing module 230 may execute an instruction for processing a pipeline process of a flow entry or changing an action, or may execute an action set when it is impossible to proceed to a next table any longer in a multiple flow table.

The packet processing module 235 may actually output the packet processed by the flow processing module 230 to one or two or more ports of the port unit 205 determined by the flow processing module 230.

Although not shown, the network packet broker 6 may further include an orchestrater for generating, changing, and removing a virtual network device, a virtual switch, or the like. When generating the virtual network device, the orchestrater may provide information on a network device, such as identification information of a switch to which the virtual network is to be connected, identification information of a port connected to the corresponding switch, a MAC address, an IP address, tenant identification information, and network identification information, to the SDN controller 10.

The SDN controller 10 and the switch 20 may transmit and receive various pieces of information that is referred to as an OpenFlow protocol message. Such an OpenFlow message may include a type such as an SDN controller-to-switch message, an asynchronous message, and a symmetric message. Each message may include a transaction id (xid) for identifying an entry in a header.

The SDN controller-to-switch message may be a message that is generated by the SDN controller 10 and is transferred to the switch 20 and may be mainly used to manage or check the state of the switch 20. The SDN controller-to-switch message may be generated by the controller 100 of the SDN controller 10, in particular, the message management module 130.

The SDN controller-to-switch message may include a modify state message for features or querying about capabilities of a switch, configuration for query and configuration of a configuration parameter of the switch 20, or addition/removal/modification of flow/group/meter entries of an open flow table, and a packet-out message for transmitting a packet, received from a switch through a packet-in message, to a specific port on the corresponding switch. The modify state message may include a modify flow table message, a modify flow entry message, a modify group entry message, a port modification message, and a meter modification message.

The asynchronous message may be a message generated by the switch 20 and may be used to modify the state of a switch and to update a network event or the like by the SDN controller 10. The asynchronous message may be generated by the controller 200 of the switch 20, in particular, the flow search module 220.

The asynchronous message may include a packet-in-message, a flow-removed message, or an error message. The packet-in message may be used to transmit a packet to the SDN controller 10 and to control the packet by the switch 20. The packet-in message may be a message including a received packet transmitted to the SDN controller 10 from the OpenFlow edge switch 20 or an entire or partial portion of a copy of the received packet in order to request a data path when the switch 20 receives an unknown packet. When an action of an entry associated with an incoming packet is determined to be transmitted to the SDN controller, the packet-in message may also be used. The flow-removed message may be used to transmit flow entry information to be removed from a flow table to the SDN controller 10. The message may be generated in a flow expiry process when the SDN controller 10 requests the switch 20 to remove the corresponding flow entry or due to low timeout.

The symmetric message may be generated by both the SDN controller 10 and the switch 20 and may also be transmitted without a request of a counterpart. The symmetric message may include 'hello' used to initiate connection between the SDN controller and the switch, 'echo' for checking whether connection between the SDN controller and the switch is not abnormal, and an error message used by the SDN controller and the switch and notifying a counterpart of a problem. The error message may be used by the switch in order to indicate failure in response to a request that is initiated mostly by the SDN controller.

A packet parsing module 250 may interpret a header of a packet and may extract one or more pieces of information on the packet.

The flow table may be configured as a multiple flow table in order to process a pipeline of OpenFlow. Referring to FIG. 8, a flow entry of the flow table may include match fields stating a condition (comparison rule) to match a packet, priority, counters updated when a matching packet is present, an instruction that is a set of various actions generated when a matching packet is present in the flow entry, timeouts stating a time to be destroyed in a switch, and tuple such as a cookie that is an opaque type selected by the SDN controller and is used to filter flow statistics, flow modification, and flow removal by the SDN controller, and is not used to process a packet. The instruction may change pipeline processing, such as transmission of a packet to another flow table. The instruction may include a set of actions obtained by adding an action to an action set, or a list of actions that are immediately applied to a packet. The action may refer to an operation of transmitting a packet to a specific port or an operation of modifying a packet, such as reduction of a TTL field. The action may belong to a portion of a set of instructions associated with a flow entry or action buckets associated with a group entry. The action set may refer to a set obtained by accumulating actions indicated in each table. The action set may be executed when there is no matching table. FIG. 8 shows an example of processing of various packets by a flow entry.

The pipeline may refer to a series of packet processing process between the packet and the flow table. When a packet is input to the switch 20, the switch 20 may search for a flow entry matching the packet in descending order of priority in a first flow table. When matching is completed, the instruction of a corresponding entry may be executed. The instruction may include a command (apply-action) that is immediately executed when matching is completed, a command (clear-action; write-action) for removing or adding/modifying information of an action set, a command (write-metadata) for modifying metadata, and a goto command (goto-table) for moving a packet along with metadata to a determined table. When there is no flow entry matching a packet, the packet may be dropped or may be transmitted in packet-in message by the SDN controller 10 according to table configuration.

The group table may include group entries. The group table may propose additional forwarding methods indicated by the flow entries. Referring to FIG. 8A, the group entry of the group table may include the following fields. The group field may include a group identifier for identifying group entries, a group type designating a rule about whether action buckets defined in a group entry are selectively or entirely performed, counters for statistics such as counters or a flow entry, and action buckets as a set of actions associated with parameters defined for a group.

The meter table may include entries and may define per-flow meters. The per-flow meters may apply various QoS operations sing OpenFlow. The meter may be a type of switch element for measuring and controlling a rate of packets. Referring to FIG. 8B, the meter table may include fields such as a meter identifier for identifying meter, meter bands indicating a speed and a packet operation method that are specified for a band, and counters updated when the packet is operated in the meter. The meter bands may include fields such a band type indicating a method of processing a packet, a rate used to select meter bands by a meter, counters updated when packets are processed by the meter bands, and type specific arguments that are bad types having selective argument.

The controller 200 may generally control an operation of each unit and may control the overall operation of the switch 20. The controller 200 may include the table management module 240 for managing the table 291, the flow search module 220, the flow processing module 230, and the packet processing module 235. Each module may be configured in hardware within the controller 200 or may be configured in separate software from the controller 200

The table management module 240 may add an entry received from the SDN controller 10 through the SDN controller communication unit 210 to an appropriate table or may periodically remove a timed-out entry.

The flow search module 220 may extract flow information from a packet received as user traffic. The flow information may include identification information of an ingress port that is a packet incoming port of an edge switch, identification information of a packet incoming port of a corresponding switch, packet header information (IP addresses of a transmitter and a destination, a MAC address, a port, VLAN information, etc.), and metadata. The metadata may be selectively added from a previous table or may be data added from another switch. The flow search module 220 may search for a flow entry from a packet received from the table 291 with reference to the extracted flow information. When retrieving the flow entry, the flow search module 220 may request the flow processing module 260 to process the received packet according to the retrieved flow entry. When failing in searching for the flow entry, the flow search module 220 may transmit the received packet or minimal data of the received packet to the SDN controller 10 through the SDN controller communication unit 210.

The flow processing module 230 may process an action of outputting a packet to a specific port or multiple ports, dropping the packet, or modifying a specific header field according to a procedure stated in the entry retrieved in the flow search module 220.

The flow processing module 230 may execute an instruction for processing a pipeline process of a flow entry or changing an action, or may execute an action set when it is impossible proceed to a next table any longer in a multiple flow table.

The packet processing module 235 may actually output the packet processed by the flow processing module 230 to one or two or more ports of the port unit 205 determined by the flow processing module 230.

Although not shown, an SDN network system may further include an orchestrater for generating, changing, and removing a virtual network device, a virtual switch, or the like. When generating the virtual network device, the orchestrater may provide information on a network device, such as identification information of a switch to which the virtual network is to be connected, identification information of a port connected to the corresponding switch, a MAC address, an IP address, tenant identification information, and network identification information, to the SDN controller 10.

The SDN controller 10 and the switch 20 may transmit and receive various pieces of information that is referred to as an OpenFlow protocol message. Such an OpenFlow message may include a type such as an SDN controller-to-switch message, an asynchronous message, and a symmetric message. Each message may include a transaction id (xid) for identifying an entry in a header.

The SDN controller-to-switch message may be a message that is generated by the SDN controller 10 and is transferred to the switch 20 and may be mainly used to manage or check the state of the switch 20. The ISDN controller-to-switch message may be generated by the controller 100 of the SDN controller 10, in particular, the message management module 130.

The SDN controller-to-switch message may include a modify state message for features of querying about capabilities a switch, configuration for query and configuration of a configuration parameter of the switch 20, or addition/removal/modification of flow/group/meter entries of an open flow table, and a packet-out message transmitting a packet, received from a switch through a packet-in message, to a specific port on the corresponding switch. The modify state message may include a modify flow table message, a modify flow entry message, a modify group entry message, a port modification message, and a meter modification message.

The asynchronous message may be a message generated by the switch 20 and may be used to modify the state of a switch and to update a network event or the like by the SDN controller 10. The asynchronous message may generated by the controller 200 of the switch 20, particular, the flow search module 220.

The asynchronous message may include packet-in message, a flow-removed message, or an error message. The packet-in message may be used to transmit a packet to the SDN controller 10 and to control the packet by the switch 20. The packet-in message may be a message including a received packet transmitted to the SDN controller 10 from the OpenFlow edge switch 20 or an entire or partial portion of a copy of the received packet in order to request a data path when the switch 20 receives an unknown packet. When an action of an entry associated with an incoming packet is determined to be transmitted to the SDN controller, the packet-in message may also be used. The flow-removed message may be used to transmit flow entry information to be removed from a flow table to the SDN controller 10. The message may be generated in a flow expiry process when the SDN controller 10 requests the switch 20 to remove the corresponding flow entry or due to flow timeout.

The symmetric message may be generated by both the SDN controller 10 and the switch 20 and may also be transmitted without a request of a counterpart. The symmetric message may include 'hello' to initiate connection between the SDN controller and the switch, 'echo' for checking whether connection between the SDN controller and the switch is not abnormal, and an error message used by the SDN controller and the switch and notifying a counterpart of a problem. The error message may be used by the switch in order to indicate failure in response to a request that is initiated mostly by the SDN controller.

The group table may include group entries. The group table may propose additional forwarding methods indicated by the flow entries. Referring to FIG. 8A, the group entry of the group table may include the following fields. The group field may include a group identifier for identifying group entries, a group type designating a rule about whether action buckets defined in a group entry are selectively or entirely performed, counters for statistics such as counters of a flow entry, and action buckets as a set of actions associated with parameters defined for a group.

The meter table may include meter entries and may define per-flow meters. The per-flow meters may apply various QoS operations using OpenFlow. The meter may be a type of switch element for measuring and controlling a rate of packets. Referring to FIG. 8B, the meter table may include fields such as a meter identifier for identifying a meter, meter bands indicating a speed and packet operation method that are specified for a band, and counters updated when the packet is operated in the meter. The meter bands may include fields such as a band type indicating a method of processing a packet, a rate used to select meter bands by a meter, counters updated when packets are processed by the meter bands, and type specific arguments that are bad types having selective argument.

Referring to FIG. 9, the network packet broker 6 according to an embodiment of the present invention may include, for example, a switch group including first to fifth switches SW1 to SW5 20, the SDN controller 10, and the legacy router container 300. The first and third switches SW1 and SW5 that are edge switches connected to an external network among the first to fifth switches SW1 to SW5 may be OpenFlow edge switches for supporting OpenFlow protocol. The OpenFlow edge switch may be formed in physical hardware, virtualized software, or a combination of hardware and software.

According to the present embodiment, the first switch SW1 may be an edge switch connected to a first legacy router R1 through an $11^{th}$ port port 11, and the third edge switch SW3 may be edge switches connected second and third legacy routers R2 and R3 through $32^{nd}$ and $33^{rd}$ ports port 32 and port 33. The switch group may further include a plurality of network devices 2, 3, 4, or not shown connected to the first to fifth switches.

Referring to FIG. 10, the legacy router container 300 may include an SDN interface module 345, a virtual router generator 320, a virtual router 340, a routing processor 330, and a routing table 335.

The SDN interface module 345 may communicate with the controller 10. The legacy interface module 145 and the SDN interface module 345 may function as interfaces of the controller 10 and the legacy router container 300, respectively. The legacy interface module 145 and the SDN interface module 345 may communicate using a specific protocol or a specific language. The legacy interface module 145 and the SDN interface module 345 may translate and interpret a message transmitted and received between the controller 10 and the legacy router container 300.

The virtual router generator 320 may generate and manage the virtual router 340 using topology information of a switch group, received through the SDN interface module 345. Through the virtual router 340, a switch group in an external legacy network, i.e., the first to third routers R1 to R3, may be handled as a legacy router.

The virtual router generator 320 may configure a port for a virtual router corresponding to edge ports of the edge switches of the switch group, that is, the first and third edge switches SW1 and SW3 for the virtual router 340. For example, as shown in FIG. 11A, a port of a v-R0 virtual legacy router may use information of the $11^{th}$ port port 11 of the first switch SW1 and the $32^{nd}$ and $33^{rd}$ ports port 32 and port 33 of the third switch SW3 without change.

The port of the virtual router 340 may be associated with identification information of a packet. The identification information of the packet may include VLAN information of the packet and tag information of a tunnel id added to the packet in the case of access through a mobile communication network. In this case, a plurality of virtual router ports may be generated using one substantial port of an edge switch of OpenFlow. The virtual router port associated with the identification information of the packet may help the virtual router 340 act as a plurality of virtual legacy routers. When a virtual router is generated using only a physical port (actual port) of an edge switch, the number of physical ports may be limited. However, when the virtual router is associated with packet identification information, the number of physical ports is not limited. In addition, the virtual router may be operated in a similar way to flow of a legacy network of an existing packet. A virtual legacy router may be driven for each user or each user group. A user or a user group may be classified using packet identification information such as VLAN or a tunnel id. Referring to FIG. 11B, the switch group may be virtualized as a plurality of virtual legacy routers v-R1 and v-R2, and respective ports vp 11 to 13 and vp 21 to 23 of a plurality of virtual legacy routers v-R1 and v-R2 may each be associated with identification information of a packet.

Referring to FIG. 11B, the plurality of virtual legacy routers v-R1 and v-R2 and the legacy router may be connected through a plurality of sub interfaces obtained by subdividing one actual interface of the first legacy router R1 or through a plurality of actual interfaces like the second and third legacy routers R2 and R3.

The virtual router generator 320 may handle a plurality of network devices in which the first to third routers R1 to R3 are connected to the first to fifth switches SW1 to SW5 as an external network vN connected to the virtual router 340. As such, the legacy network may access network devices of a switch group of an OpenFlow edge. In the case of FIG. 7A, the virtual router generator 320 may generate a $0^{th}$ port port 0 for a $0^{th}$ virtual legacy router v-R0. In the case of 7B, the virtual router generator 320 may generate $10^{th}$ and $20^{th}$ ports vp 10 and vp 20 for first and second virtual legacy routers v-R1 and v-R2. Each of the generated ports port 0, vp 10, and vp 20 may include information indicating that a plurality of network devices of a switch group is connected. The external network vN may include all or some of the plurality of network devices.

[1] The ports for a virtual router (port 0, port 11v, port 32v, port 33v, vp 10 to 13, and vp 20 to 23) may include port information of a legacy router. For example, the port information for a virtual router may include a MAC address, an IP address, and a port name of the port of each virtual router, a range of a network address connected to the port, and legacy router information and may further include VLAN range and a tunnel id range. The port information may be acquired by inheriting edge port information of the first and third edge switches SW1 and sW3 or may be determined by the virtual router generator 320, as described above.

The data plane of a network of FIG. 9 through the virtual router 340 generated by the virtual router 340 may be virtualized as shown FIG. 11A or 11B. For example, in the case of FIG. 11A, in a virtualized network, the first fifth switches SW1 to SW5 may be virtualized as the $0^{th}$ virtual legacy router v-R0, $11v^{th}$, $32v^{th}$, and $33v^{th}$ ports PORTs 11v, 32v, and 33v of the $0^{th}$ virtual legacy router v-R0 may be connected to tale first to third legacy routers R1 to R3, and the $0^{th}$ port port 0 of the $0^{th}$ virtual legacy router v-R0 may be connected to the external network vN that at least a portion of the plurality of network devices.

When the virtual router 340 is generated, the routing processor 330 may generate the routing table 335. The routing table 335 may be a table used to be referred to for routing in a legacy router. The routing table 335 may include all or some of RIB, FIB, and ARP tables. The routing table 335 may be modified or updated by the routing processor 330.

The routing processor 330 may generate a legacy routing path of flow requested by the controller 10. The routing processor 330 may generate legacy routing information using all or some of a received packet received from an OpenFlow edge switch included in flow, information on a port to which the received packet is input, information on the virtual router 340, and the routing table 335.

The routing processor 330 may include a third party routing protocol stack in order to determine legacy routing.

FIG. 12 is a flowchart of method of determining whether legacy routing is performed on flow of an SDN controller.

The method of determining whether legacy routing is performed on flow may mean whether the controller 10 performs general SDN control on flow received from an OpenFlow edge switch or needs to request the legacy router container 300 to control the flow.

Referring to FIG. 12, controller 10 may determine whether a flow ingress port is an edge port (S510). When the flow ingress port not an edge port, the controller 10 may perform general SND control on flow, for example, calculation of a path of an openFlow packet (S590).

When the flow ingress port is an edge port, the controller 10 may determine whether it is possible to interpret a packet of the corresponding flow (S520). When it is impossible to interpret the packet, the controller 10 may forward the flow to the legacy router container 300 (S550). This is because, when the packet is a protocol message used on in a legacy network, a general controller based on SDN is not capable of interpreting the packet.

When the received packet is a legacy packet such as a packet transmitted from a first legacy network to a second legacy network, the controller 10 based on SDN may not be capable of calculating a routing of the input legacy packet. Thus, when the controller 10 is not capable of calculating a path like the legacy packet, the controller 10 may transmit the legacy packet to the legacy router container 300. However, when a target edge portion to which the legacy packet is to be output and a final processing method of the legacy packet are known, the controller 10 may process the legacy packet by modifying flow. Thus, when it is possible to interpret the packet, the controller 10 may determine whether to calculate a path of the corresponding flow or may search for a flow path, and for example, may search for an entry from an entry table (S530). When the path is not retrieved, the controller 10 may forward the corresponding flow to the legacy router container 300 (S550). When the path is retrieved, the controller 10 may generate a packet-out message for determining output of the packet and may transmit the packet-out message to an. OpenFlow edge switch that queries about the packet (S540). This will be described below in detail.

FIG. 13 is a flowchart showing a method of processing a legacy protocol message in an SDN-based network to which the present invention is applied. FIG. 13 illustrates an example in which a first edge switch SW1 receives a hello message of an open shortest path first (OSPF) protocol.

In the present example, it is assumed that the SDN controller 10 and the legacy router container 300 virtualize the OpenFlow edge switch group as shown in FIG. 11A.

Referring to FIG. 13, when the first legacy router R1 and the first edge switch SW1 are connected, the first legacy router R1 may transmit a hello message Hello1 of the OSPF protocol to the first edge switch SW1 (S410).

There is no flow entry for a received packet in the table 291 of the first edge switch SW1, and thus the first edge switch SW1 may transmit a packet-in message indicating an unknown packet to the SDN controller 10 (S420). The packet-in message may include flow including information on a Hello1 packet and an ingress port PORT 11.

The message management module 130 of the SDN controller 10 may determine whether it is possible to generate a rule for processing the corresponding flow (S430). A determination method will be described with reference to FIG. 15. In the present example, the OSPF protocol message is a packet that is not capable of being interpreted by the SDN controller 10, and thus the SDN controller 10 may forward the corresponding flow to the legacy router container 300 (S440).

The SDN interface module 345 of the legacy router container 300 may transmit the Hello1 packet received from the SDN controller 10 to the port PORT 11v of the virtual router 340, corresponding to the ingress port PORT 11 of the first edge switch SW1 included in the flow. When the virtual router 340 receives the Hello1 packet, the routing processor 330 may generate legacy routing information of the Hello1 packet based on the routing table 335 (S450). In the present embodiment, the routing processor 330 may generate a Hello2 message corresponding to the Hello1 message and may generate a routing path for determining an output port as the 11v$^{th}$ port PORT 11v to transmit a Hello2 packet to the first legacy router R1. The Hello2 message may include a destination of the first legacy router R1 and a predetermined virtual router identifier. The legacy routing information may include the Hello2 packet and an output port that is the 11v$^{th}$ port. Although the Hello1 packet is input to the virtual router 340 according to the present embodiment, the present invention is not limited thereto, and the routing processor 330 may generate legacy routing information using information of the virtual router 340.

The SDN interface module 345 may forward the generated legacy routing information to the legacy interface module 145 of the SDN controller 10 (S460). Any one of the SDN interface module 345 and the legacy interface module 145 may convert the 11v$^{th}$ port PORT 11v that is an output port into the 11$^{th}$ port port 11 of the first edge switch SW1. Alternatively, port conversion may be omitted by equalizing names of the 11v$^{th}$ port and the 11$^{th}$ port.

The path calculation module 125 of the SDN controller 10 may configure a path for outputting Hello2 packet to the 11$^{th}$ port port 11 of the first legacy router R1 using the legacy routing information received through the legacy interface module 145 (S470).

The message management module 130 may generate a packet-out message for outputting the Hello2 packet to the 11$^{th}$ port port 11 that is an ingress port using the configured path and the legacy routing information and may transmit the packet-out message to the first legacy router R1 (S480).

Although the present embodiment is embodied in response to the Hello message of an external legacy router, the present invention is not limited thereto. For example, the legacy router container 300 may generate an OSPF Hello message to be actively output to an edge port of an edge switch and may transmit the OSPF Hello message to the SDN controller 10. In this case, the SDN controller 10 may transmit a Hello packet to the OpenFlow edge switch using the packet-out message. In addition, even if a packet-out message does not correspond to a packet-in message, the present embodiment may be embodied by setting the OpenFlow edge switch to be operated according to a command of the packet-out message.

FIG. 14 illustrates the case in which a general legacy packet is transmitted from the first edge switch SW1 to the third edge switch SW3.

The first edge switch SW1 may begin to receive the legacy packet P1, a destination IP address of which does not belong to the OpenFlow edge switch group, from the first legacy router R1 (S610).

The first edge switch SW1 has no flow entry of the packet P1, and thus the packet P1 may be transmitted to the SDN controller 10 and flow processing may be requested (packet-in message) (S620).

The message management module 130 of the SDN controller 10 may determine whether it is possible to perform SDN control on corresponding flow (S630). In the present example, it is possible to interpret the packet P1, but the packet P1 is directed towards a legacy network, and accordingly, the SDN controller 10 may not be capable of generating a path of the packet P1. Thus, the SDN controller 10 may transmit the packet P1 and the 11$^{th}$ port that is an ingress port to the legacy router container 300 through the path calculation module 125 (S640).

The routing processor 330 of the legacy router container 300 may generate legacy routing information on the packet P1 received from the SDN controller 10 based on information on the virtual router 340 and the routing table 335 (S650). In the present example, the packet P1 may be assumed to be output to the 32v$^{th}$ port port 32v of the virtual router. In this case, the legacy routing information may include an output port that is the 32v$^{th}$ port port 32v, destination MAC address that is a MAC address of the second legacy router R2, and a source MAC address that is a MAC address of the 32v$^{th}$ port, with respect to the packet P1. This information may be header information of a packet output from the legacy router. For example, assuming that the first legacy router R1 considers the virtual legacy router v-R0 as a legacy router and transmits the packet P1, header information of the packet P1 is now described. The source and destination IP addresses are the same as header information when the packet P1 is generated, and thus a detailed description thereof is omitted in the current description. The source IP address of the packet P1 may be a MAC address of an output port of the router R1. The destination MAC address of the packet P1 may be a MAC address of the 11v$^{th}$ port of the virtual legacy router v-R0. In the case of an existing router, a packet P1' output to the 32v$^{th}$ port port 32v of the virtual legacy router v-R0 may have the following header information. A source MAC address of the packet P1' may be a MAC of the 32v$^{th}$ port port 32v of the virtual legacy router v-R0, and the destination MAC address may be the MAC address of an ingress port of the second legacy router. That is, during legacy routing, a portion of header information of the packet P1 may be modified.

In order respond to the legacy routing the routing processor 330 may generate the packet P1' obtained by adjusting header information of the packet P1 and may add the packet P1' to the legacy routing information. In this case, with respect to the same packets or packets having the same or similar ranges of a destination address, an incoming packet for the SDN controller 10 or the legacy router container 300 needs to be processed all the time. Thus, in an operation of changing a packet according to format after existing routing, an edge switch (in the present example, the third edge switch SW3) that outputs a packet to an external legacy network may manipulate the packet rather than the legacy router container 300. To this end, the aforementioned legacy routing information may include source and destination MAC addresses. The SDN controller 10 may transmit a flow-mod message for changing header information of the packet P1' to the third edge switch using the routing information.

The SDN interface module 345 may forward the generated legacy routing information to the legacy interface module 145 of the SDN controller 10 (S660). In the current operation, the output port may be converted into a mapped edge port.

The path calculation module 125 of the SDN controller 10 may calculate a path for output to the $32^{nd}$ port of the third edge switch SW3 from the first edge switch SW1 using the legacy routing information received through the legacy interface module 145 (S670).

The message management module 130 may transmit the packet-out message for determining an output port for the packet P1 to the first edge switch SW1 based on the calculated path (S680) and may transmit the flow-mod message to the OpenFlow edge switch of the corresponding path (S690 and S700). The message management module 130 may also transmit the flow-mod message to the first edge switch SW1 in order to define processing of the same flow.

Flow processing on the packet P1 may be performed based on an identifier for identifying legacy flow. To this end, the packet-out message transmitted to the first edge switch SW1 may contain the packet P1 to which a legacy ID (tunnel ID) is added, and the flow-mod message may contain the flow entry to which the legacy ID (tunnel ID) is added. An example of a flow table of each switch is described with reference to FIG. 15. FIG. 15A shows a flow table of the first edge switch SW1. For example, in table 0 of FIG. 15A, tunnel2 as a legacy ID may be added to flow directed towards the second legacy router R2 and the flow may be moved toward table 1. The legacy ID may be written in a meta field or another field. Table 1 may include a flow entry for outputting flow having tunnel2 to a $14^{th}$ port (port information of the first switch SW1 connected to a fourth switch SW4). FIG. 15B illustrates an example of a flow table of the fourth switch SW4. In a table of FIG. 15B, flow having tunnel2 as a legacy ID of flow information may be output to a $43^{rd}$ port port 43 connected to the third switch SW3. FIG. 15C illustrates an example of a flow table of the third switch SW3. In table 0 of FIG. 15C, the legacy ID of the flow having tunnel2 as a legacy ID may be removed and the corresponding flow may be moved to table 1. In table 1, the corresponding flow may be output to a $32^{nd}$ port. As such, when multiple tables are used, the number of cases may be reduced. This may facilitate rapid search and may reduce consumption of a resource such as memory.

The first edge switch SW1 may add a legacy ID (tunnel ID) to the packet P1 (S710) and may transmit the packet with the legacy ID (tunnel ID) added thereto to a core network (S720). The core network may refer to a network including OpenFlow edge switches SW2, SW4, and SW5, but not edge switches SW1 and SW3.

The core network may transmit the corresponding flow to the third edge switch SW3 (S730). The third edge switch SW3 may remove the legacy ID from the packet P1 and may output the packet P1 to a specified port (S740). In this case, although not shown in the flow table of FIG. 15, the flow table of the third switch SW3 may include a flow entry for changing destination and source MAC addresses of the packet P1.

The flow table may be configured as a multiple flow table in order to process a pipeline of OpenFlow. Referring to FIG. 8, a flow entry of the flow table may include match fields stating a condition (comparison rule) to match a packet, priority, counters updated when a matching packet is present, instruction that is a set of various actions generated when a matching packet is present in the flow entry, timeouts stating a time to be destroyed in a switch, and tuple such as a cookie at is an opaque type selected by the SDN controller and is used to filter flow statistics, flow modification, and flow removal by the SDN controller, and is not used to process a packet. The instruction may change pipeline processing, such as transmission of a packet to another flow table. The instruction may include a set of actions obtained by adding an action to an action set, or a list of actions that are immediately applied to a packet. The action may refer to an operation of transmitting a packet to a specific port or an operation of modifying a packet, such as reduction of a TTL field. The action may belong to a portion of a set of instructions associated with a flow entry or action buckets associated with a group entry. The action set may refer to a set obtained by accumulating actions indicated in each table. The action set may executed when there is no matching FIG. 15 shows an example of processing of various packets by a flow entry.

Referring to FIG. 16, the network application module 40 according to an embodiment of the present invention may further include the time synchronization module 410 for synchronizing a packet time using a timestamp value of a network device.

The network packet broker 6 may further include a processor 801, the switch 20 may further include the processor 801, the processor 801 of the network packet broker 6 may include a clock for replying with a time value, the processor 801 of the switch 20 may include a register for storing a time parameter corresponding to a time that elapses from a reference time in a processor, and when the switch 20 receives a request for assignment of a timestamp of a packet, the time synchronization module 410 may correct overflow of the time parameter from the register of the processor of the switch of the reference time and may store the timestamp in the packet.

Referring to FIG. 16, the network application module 40 according to an embodiment of the present invention may further include the policy manager module 420 for controlling quality service (QoS). The policy manager module 420 may store and control a processing method of flow of a packet based on information of the packet.

Referring to FIG. 16 the network application module 40 according to an embodiment of the present invention may further include the deep packet matching module 430 for extracting, modifying, removing, or inserting a GTP ender or VxLAN header of a flow packet.

Referring to FIG. 16 the network application module 40 according to an embodiment of the present invention may further include a GTP correlation module 440 for associating a GTP-C packet and a GTP-U packet of a flow packet to be transmitted to the same egress port. The GTP correlation module 440 may classify GTU-U traffic, and in detail, may identify GTP-U TETD using Src IP (eNodeB IP of up ink and SGW IP of downlink) of the GTP-U packet and may map the GTP-U to one IMSI. In addition, the GTP correlation module 440 may identify uplink GTP-U traffic using eNE IP of a packet and S1-U SGW GTP-U interface tunnel ID, may identify downlink traffic using SGW IP having the S1-U eNodeB GTP-U interface tunnel ID, and map the two to one IMSI.

Referring FIG. 16, the network application module 40 according to an embodiment of the present invention may further include a network slicing module 470 for performing an operation generating, modifying, and processing one or more virtual networks.

Referring to FIG. 16, the network application module 40 according to an embodiment of the present invention may further include an API parser module 450 for interpreting a procedure of modifying information on the mapped network device.

Referring to FIG. 16, the network application module 40 according to an embodiment of the present invention may further include an API server module 460 for performing an operation based on a procedure of modifying information on the mapped network device.

Referring to FIG. 16, the network application module 40 according to an embodiment of the present invention may further include the network slicing module 470 for performing an operation of generating, modifying, and processing one or more virtual networks.

Referring to FIG. 16, the network application module according to an embodiment of the present invention may further include a port manager module 480 controlling a port 250 of the switches 20.

The port manager module 480 may configure the port 250 of the switch in ingress, egress, and transit states and may configure a single port or a port group.

Referring to FIG. 17, a controller 800 of the network packet broker 6 according to an embodiment of the present invention may include the processor 801, a memory 803, a persistent storage 805, a transceiver 802, a bus system 804, and an I/O unit 806. According the present embodiment, the processor 801 may be a microprocessor, a microcontroller, a composite command set computing microprocessor, a reduced command set computing microprocessor, a very long command word microprocessor, a designated parallel command computing microprocessor, graphics processor, a digital signal processor, an integrated circuit, a custom integrated circuit, another arbitrary-type similar and/or appropriate processing circuit, and may be an arbitrary type physical computation circuit or hardware without being limited thereto. The processor 801 may include a built-in controller such as a general-purpose or programmable logic device or array, a custom, integrated, circuit, a single chip computer, or a smart card.

The transceiver 802 may support communication with another entity in another system or a cellular network. For example, the transceiver 802 may include a wired/wireless transceiver for facilitating communication through a network interface card or a network. The transceiver 802 may support communication through an arbitrary appropriate physical or communication link.

The memory 803 may a volatile memory and a non-volatile memory. Various computer readable storage media may be stored in a memory element of the memory 803 and may be accessed from the memory element of the memory 803. The memory element may include read only memory (ROM), random access memory (RAM), erasable programmable read only memory (EPROM), electrically EPROM (EEPROM), hard drive, a removable media drive for handling a memory card, a memory stick, and an arbitrary number of appropriate memory devices for storing data and machine readable commands, such as another arbitrary similar and/or appropriate type memory storage device and/or storage medium.

The persistent storage 805 may include one or more components or devices for supporting longer-term storage of data, such as read only memory (ROM), a hard drive, a flash memory, or an optical disc.

The I/O unit 806 may allow input and/or output of data. For example, the I/O unit 806 may provide connection for user input through a keyboard, a mouse, a keypad, a touch-screen, or another appropriate input device. The I/O unit 806 may transmit output to a display, a printer, or another appropriate output device.

FIG. 18 illustrates a timestamp assignment method of a packet according to an embodiment of the present invention.

Referring to FIG. 18, the timestamp assignment method of a packet according to an embodiment of the present invention may include:

acquiring a clock of the processor 801 of the network packet broker 6, by the switch 20 (S1010);

updating a reference time parameter Tb of the switch 20 using the acquired clock (S1020);

receiving a request for timestamp assignment of a packet, by the switch 20 (S1030);

updating a previous elapsed time parameter Tp to a current elapsed time parameter Tc of the switch 20, by the time synchronization module 410 (S1040);

acquiring a time value elapsed based on the parameter Tb as the parameter Tc from the switch 20, by the time synchronization module 410 (S1050);

comparing the parameter Tc and the parameter Tp in size, by the time synchronization module 410 (S1060);

when the parameter Tc is less than the parameter Tp, updating the parameter Tb by adding the sum of the parameter Tp and a correction value, by the time synchronization module 410 (S1070);

when the parameter Tc is equal to or greater than the parameter Tp, updating the parameter Tb by adding the parameter Tp, by the time synchronization module 410 (S1080); and storing the parameter Tb as a timestamp in a packet by the switch 20, by the time synchronization module 410 (S1090).

In the timestamp assignment method of a packet according to an embodiment of the present invention, the timestamp assignment method of a packet may use an IEEE 1588 precision time protocol (PTP) synchronization protocol.

In the timestamp assignment method of a packet according to an embodiment of the present invention, the parameter Tp and the parameter Tc may be stored in a register of the processor 801 of the switch 20.

In the timestamp assignment method of a packet according to an embodiment of the present invention, a unit for storage of the register may be less than 64 bits, and in detail, may be 48 bits or 32 bits.

In the timestamp assignment method of a packet according to an embodiment of the present invention, a unit for storage of a timestamp in the storing as a timestamp in a packet (S1090) may be 64 bits. Accordingly, it may be possible to assign a timestamp to a packet in units of nanoseconds.

In the timestamp assignment method of a packet according to an embodiment of the present invention, the correction value of the updating (S1070) may be the maximum value of a unit of storage of the register. For example, when a unit of storage is 48 bits, the correction value may be 2^48-1, that is, 281, 474, 976, 710, 655, and when a unit of storage is 32 bits, the correction value may be 2^32-1, that is, 4, 294, 967, 294. Generally, when a unit of storage of a register is less than 64 bits, the correction value may facilitate the processor of the switch to assign a timestamp in units of nanoseconds of 64 bits even if overflow of the elapsed time parameter occurs.

In the timestamp assignment method of a packet according to an embodiment of the present invention the parameter Tp and the parameter Tc may be stored in the register of the processor 801 of the switch 20.

Referring to FIG. 19, in the storing as a timestamp (S1090), in the case of an ERSPAN type packet, 32 bits from a $33^{rd}$ bit of an ERSPAN header may be stored as LSB 32-bit timestamp of the timestamp, and 32 bits from a $33^{rd}$ bit of a platform-specific subheader may be stored as MSB 32-bit timestamp of the timestamp. Such a storage method the standard used in an existing system, and thus advantageously has compatibly and does not require separate correction in packet analysis equipment.

Referring to FIG. 20, in the storing as a timestamp (S1090), in the case of an in-band network telemetry (INT) type packet, 32 bits from a first bit of an INT header may be stored as an LSB 32-bit timestamp of the timestamp, and 32 bits from a $33^{rd}$ bit may be stored as an LSB 32-bit timestamp of the timestamp. In such a storage method, packet analysis equipment may reduce overhead capacity due to a small size of a packet when the packet is processed.

Referring to FIG. 21, the network packet broker 6 according to an embodiment of the present invention may receive a packet directly or through a test application protocol (TAP) in each connection operation of a 4G LTE or 5G cellular network architecture. The wireless cellular network architecture may include a UE 801, an eNB 802, a mobility management entity (MME) 803, a serving gateway (SGW) 805, a packet data network gateway (PGW) 806, and a packet data network (PDN) 5.

In the wireless cellular network architecture, the eNE 802 may communicate with the UK 801 through an X2 or Uu interface. The eNB 802 may communicate with the MME 803 through S1AP control or S1-MME interface. The Uu interface may be used for NAS (mobility management and bearer control), radio resource control (RRC), or the like. The S1AP control interface may be used for transit of an initial UE context when an EPS bearer is configured, next mobility, paging, UE context release, or the like.

The GTP-U interface may be used to transmit user traffic on S1-U, S5, and X2 interfaces. The GTP-C control interface may be used to transmit a control message for generating, maintaining, and removing a GTP tunnel.

The SGW 805 may communicate with the PGW 806 through the GTP-U interface/GTP-C control interface, and the PGW 806 may communicate with the PDN 5 through the IP interface.

FIG. 22 illustrates signal flow for allocation of an IP address on a control plane and allocation of TEID on a user plane in a wireless cellular network according to an embodiment of the present invention.

In operation S2101, a UE 801 may select a cell through a public land mobile network (PLMN) and a cell search procedure for an initial access request. For radio link synchronization with the selected cell, the UE 801 may perform an RRC connection procedure with the eNB 802. When RRC connection configuration is completed, the UE 801 may transmit an RRC Connection Setup Complete message to the eNB 802. Then, the UE 801 may transmit an Attach Request message in the RRC Connection Setup Complete message to the eNB 802 in order to transmit the Attach Request message to the MME 803.

In operation S2102, the eNB 802 may transmit a request for PDN connection to the MME 803 as a part of an attach procedure. The eNB 802 may transmit an initial UE message including a cell ID of a cell that the UE 801 accesses and Tracking Area information to the MME 803 for S1 signaling with the MME 803. Here, the eNB 802 may transmit the Attach Request message in the Initial UE message in order to forward the Attach Request message received from the UE 801 to the MME 803. As such, as the eNB 802 transmits the Initial UE message to the MME 803, S1 signaling connection between the eNB 802 and the MME 803 may be established.

In operation S2103, the MME 803 may make a request for generation of Default Bearer by transmitting a Create Session Request along with a PGW-C IP address to a serving gateway control plane function (SGW-C) as a control plane functional unit of the serving gateway (SGW) 805. The Create Session Request may include a GTP-C TFID 901 of the 803. The SGW-C as the control plane functional unit of the SGW 805 may select, for example, one of a plurality of serving gateway user plane functions (SGW-U) based on a reference including the position of the UE and an optimal path for user data transmission. The SGW-C may allocate an IP address from a designated pool of an SGW-U address. In some embodiments, the IP address may be acquired by another method in a network of an operator, that is, based on a policy defined by an operator or provisioning. When the IP address is allocated, a SGW-C 253 may request the serving gateway user plane functions (SGW-U) to allocate the TEID by transmitting the Allocate Resource Request message. Upon receiving the request for resource allocation from the SGW-C, the SGW-U may allocate SGW-U TEID for downlink transmission to the PGW and may allocate a SGW-U TEID for uplink transmission to the eNB from a local pool for the GTP user plane and control plane. The SGW-U may acquire the information based on a policy of a network operator. The TEID allocated for uplink and downlink transmission may be returned to the SGW-C in an Allocate Resource Ack message.

In operation S2104, the SGW-C may transmit the Create Session Request including an SGW-U IP address for downlink transmission, an SGW GTP-C TEID 902, and an SGW GTP-U TEID 902 along with a newly allocated IP address of the SGW-U and a TEID for GTP connection with a PGW-U 256 to a PGW control plane function (PGW-C) as a control plane functional unit of the PGW 806. The PGW-C may allocate an IP address from a designated pool of a PGW-U address. The address may be acquired by another method in a network of an operator, that is, based on a policy defined by an operator or provisioning. When the IP address is allocated, the PGW-C may request the PGW-U to allocate the TEID by transmitting the Allocate Resource Request message including a SGW-U IP address and SGW-U TEID for downlink transmission. Upon receiving the request for resource a location from, the PGW-C, the PGW-U may allocate a TEID from the local pool. The PGW-U may also acquire this information based on policy of network operator. The allocated PGW-U TEID may be returned to a PGW-C 255 in the Allocate Resource Ack message.

In operation S2105, upon receiving a response form the PGW-U 256 along the new allocated TEID, the PGW-C 255 may initiate an Internet Protocol connectivity access network (IP CAN) Session Establishment/Modification procedure along with a Policy and Charging Rule Function (PCRF).

In operation S2106, the response may be transmitted to the SGW-C along with the PGW-U TEID and the PGW-U IP address in the Create Session Response message included the PGW-U IP address, a PGW GTP-C TEID 903, and a PGW GTP-U TEID 903.

Then, in operation S2107, the SGW-C 253 may forward the received PGW-U TEID and PGW-U IP address to an SGW-U 254 by transmitting the Modify Request message. The SGW-U 254 may acknowledge the response. After the response to the Modify Request is received, the Create Session Response message along with the SGW-U IP address, the SGW GTP-C TEID 904, and the SGW GTP-U TEID 904 may be transmitted to the MME 803.

Then, in operation S2108, the MME 803 may transmit the Attach Accept message to the UE 801 through the eNB 802. An Initial Context Setup message for piggybacking on the Attach Accept message may include the SGW-U IP address and the SGW-U TEID. The eNB 802 that receives the Initial Context Setup Request message from the MME 803 may perform an AS Security Setup procedure through safe communication with the UE 801 in a wireless section. Through the AS Security Setup procedure, the RRC message may be integrity-protected and encrypted, and user traffic of the UE 801 may also be encrypted and transmitted.

Then, in operation S2109, when the AS Security Setup procedure is completed, the eNB 802 may transmit the RRC Connection Reconfiguration message to the UE 801 for wireless section bearer configuration.

Then, in operation S2110, the UE 801 that receives RRC Connection Reconfiguration message may complete DRE bearer configuration. Accordingly, uplink EPS bearer configuration to the PGW 806 from the CE 801 may be completed, and the UE 801 may trans it the RRC Connection Reconfiguration message to the eNB 807.

Then, in operation S2111, when the AS Security Setup procedure and the DRB configuration procedure are completed, the eNB 802 may allocate the S1 eNB TEID for downlink S1-MEC bearer configuration. The S1 eND TEID may be transmitted in the Initial Context Setup Response message to the MME 803.

In operation S2112, the UE 801 may transmit the Attach Complete message in the UL Information Transfer message to the eNB 802 in order to forward the Attach Complete message to the MME 803.

Then, in operation S2113, the eNB 802 that receives the Attach Complete message may forward the Attach Complete message in the UL NAS Transport message to the MMD 803.

Then, in operation S2114, upon receiving an S1 eNB GTP-U TEID 905 from the eNB 802, the MME 803 may transmit the S1 eNB GTP-U TEID 905 in the Modify Bearer Request message to the SGW 805.

Then, in operation S2115, the SGW 805 that receives the S1 eNB GTP-U TEID 905 may complete downlink S1-MEC bearer configuration using the S1 eNB TEID and may transmit the Modify Bearer Response message to the MME 803 in response to the Modify Bearer Request message (S522). Accordingly, S1-MEC bearer configuration of downlink and uplink between the eNB 802 and the MME 803 may be completed, and thus uplink and downlink traffic transmission between the eNB 802 and the SGW 805 may be allowed.

Referring to FIG. 23, the GTP correlation module 440 may include a GTP session tracking module 4401, a GTP user plane forward module 4402, and a storage 4403.

The GTP session tracking module 4401 may assign and maintain user IMSI mapping for the GTP-U and the GTP-C TEID by snooping various GTP-C transactions between the MME 803, the SGW 805, and the PGW 806, for example, Create Session Request (S2103 and S2104), Create Session Response (S2106 and S2107), and Modify Bearer Request (S2114). The GTP correlation module 440 may transmit a GTP-C message and a message of a GTP-U, which belong to the same user IMSI, to the same port unit 205 or port group.

The GTP session tracking module 4401 may parse subscriber IMSI and subscriber session information from information of the GTP control plane packet and may update each of a subscriber table 44031 and a GTP session table 44032.

The GTP session tracking module 4401 may reassign an egress path to the same egress port unit 205 or port group using a TEID associated with IMS corresponding to the same user.

The GTP user plane forward module 4402 may query the GTP session table 44032 of the GTP correlation module 440 about a GTP-U TEID of a GTP user plane (GTP-U) packet input to the ingress port unit 205 of the switches 20 and may update egress port information of the GTP session table 44032.

When the current packet is a GTP-C packet as the result of querying about the GTP TEID and the IP address of the ingress packet, the GTP user plane forward module 4402 may transmit the GTP-C packet to the GTP session tracking module 4401.

FIG. 24 is a diagram showing a storage of a GTP correlation module according to an embodiment of the present invention The storage 4403 of the GTP correlation module 440 may be positioned in the memory 803 of the controller 800 of the network packet broker 6, in detail, the processor 801.

The storage 4403 of the GTP correlation module 440 may include an IMSI table 44031, an MME context table 440321, and an SGW context table 440322.

The subscriber table 44031 of the storage 4403 of the GTP correlation module 440 may be the IMSI table 44031.

The GTP session table 44032 of the storage 4403 of the GTP correlation module 440 may include the MME context table 440321 and the SGW context table 440322.

The GTP session table 44032 of the storage 4403 of the GTP correlation module 440 may further include correlation table 44035 for storing a correlation between the IMSI table 44031, the MME context table 440321, and the SGW context table 440322.

The correlation table of the storage 4403 of the GTP correlation module 440 may include a first correlation table 440323, a second correlation table 440324, a third correlation table 440325, and a fourth correlation table 440326.

The IMSI table 44031 may include an IMSI, a packet output port, and a bearer ID set. The IMSI table 44031 may user the IMSI as a primary key. The bearer ID set may include an MME IP, a bearer ID, and a sequence.

The GTP correlation module 440 may perform operation S3010 of generating a record using an MME IP address as a key and a bearer ID set including the MME IP, the bearer ID, and the sequence and an MME S11 TEID 901 as a value in the MME context table 440321.

The GTP correlation module 440 may perform operation S3020 of generating a record using an SGW IP address as a key in the SGW context table 440322.

The GTP correlation module 440 may perform operation S3030 of searching for a record using the SGW IP address as a key in the SGW context table 440322 and updating the SGW S11 TEIDs 902 and 904 and the SGW S1U TEID 902.

The GTP correlation module 440 may perform operation S3040 of generating a record using the MME S11 TEID as a key and the IMSI context and the SGW S11 TEID contexts 902 and 904 as a value in the first correlation table 440323.

The GTP correlation module 440 may perform operation S3050 of generating a record using the SGW S11 TEIDs 902 and 904 as a key and the MME S11 context 901 as a value in the second correlation table 440324.

The GTP correlation module 440 may perform operation S3060 of generating a record using the SGW S11 TEID as a key and the SGW S11 TEID contexts 902 and 904 as a value in the third correlation table 440325.

The GTP correlation module 440 may perform operation S3070 of generating a record using the eNB TEID 905 and the eND IP as a key and the SGW S1U TEID contexts 902 and 904 as a value in the fourth correlation table 440326.

The GTP correlation module 440 may perform operation S3080 of updating the bearer ID set including the MME IP, the bearer ID, and the sequence of the record using the MME IP address as the key and the eNB S1U TEID 905 as a value in the MME context table 440321.

The GTP correlation module 440 may perform operation S3090 of generating a record using the IMSI as a key and the bearer ID set including the MME IP, the bearer ID, and the sequence as a value in the IMSI table 44031.

The MMD context table 440321 may include an MME IP address, a bearer ID set, an MME S11 TEID, and an eNB S1U TEID. The MME context table 440321 may use an MMP IP address as a primary key. The MME context table 440321 may be connected to the first correlation table 440323 using a bearer ID set as a foreign key. The MME context table 440321 may be connected to the IMSI table 44031 using the MME S11EID as a foreign key. The MME context table 440321 may be connected to the fourth correlation table 440326 using the eNB S1L TEID as a foreign key.

The SGW context table 440322 may include an SGW IP address, an SGW S11 TEID, and an SGW S1U TEID. The SGW context table 440322 may use the SGW IP address as a primary key. The SGW context table 440322 may be connected to the second correlation table 440324 using the SGW S11 TEID as a foreign key. The SGW context table 440322 may be connected to the third correlation table 440325 using the SGW S1U TEID as a foreign key.

The first correlation table 440323 may include an MME S11 TEID, IMSI context, and SGW S11 TEID context. The first correlation table 440323 may use the MME S11 TEID as a primary key. The first correlation table 440323 and the IMSI table 44031 may be cross-referenced with the IMSI context of the first correlation table 440323 and the bearer ID set of the IMSI table 44031.

The second correlation table 440324 may include an SGW S11 TEID and MME S11 context. The second correlation table 440324 may use the SGW S11 TEID as a primary key. The first correlation table 440323 and the second correlation table 440324 may be cross-referenced with the SGW S11 TEID of the first correlation table 440323 and the MME S11 context of the second correlation table 440324.

The third correlation table 440325 may include an SGW S1U TEID and SGW S11 TEID context. The third correlation table 440325 may use the SGW S1U TEID as a primary key. The second correlation table 440324 and the third correlation table 440325 may be cross-referenced with the MME S11 context of the second correlation table 440324 and the SGW S11 TEID context of the third correlation table 440325.

The fourth correlation table 440326 may include an eNB TEID set and SGW S1U TEID context. The fourth correlation table 440326 may use an eNB TEID set as a primary key. The eNB TEID set may include an eNB ST1U TEID and an eNB IP. The third correlation table 440325 and the fourth correlation table 440326 may be cross-referenced with the SGW S1U TEID of the third correlation table 440325 and the SGW S1U TEID context of the fourth correlation table 440326.

FIG. 24 is a diagram showing a storage of a GTP correlation module according to an embodiment of the present invention.

The storage 4403 of the GTP correlation module 440 may be positioned in the memory 803 of the controller 800 of the network packet broker 6, in detail, the processor 801.

The storage 4403 of the GTP correlation module 440 may include the IMSI table 44031, the MME context table 440321, and the SGW context table 440322.

The subscriber table 44031 of the storage 4403 of the GTP correlation module 440 may be the IMSI table 44031.

The GTP session table 44032 of the storage 4403 of the GTP correlation module 440 may include the MME context table 440321 and the SGW context table 440322.

The GTP session table 44032 of the storage 4403 of the GTP correlation module 440 may further include the correlation table 44035 for storing a correlation between the IMSI table 44031, the MME context table 440321, and the SGW context table 440322.

The correlation table of the storage 4403 of the GTP correlation module 440 may include the first correlation table 440323, the second correlation table 440324, the third correlation table 440325, and the fourth correlation table 440326.

The IMSI table 44031 may include an IMSI, a packet output port, and a bearer ID set. The IMSI table 44031 may use the IMSI as a primary key. The bearer ID set may include an MME IP, a bearer ID, and a sequence.

The GTP correlation module 440 may perform operation S3010 of generating a record using an MME IP address as a key and a bearer ID set including the MME IP, the bearer ID, and the sequence and an MME S11 TEID 901 as a value in the MME context table 440321.

The GTP correlation module 440 may perform operation S3020 of generating a record using an SGW IP address as a key in the SGW context table 440322.

The GTP correlation module 440 may perform operation S3030 of searching for a record using the SGW IP address as a key in the SGW context table 440322 and updating the SGW S11 TEIDs 902 and 904 and the SGW S1U TEID 902.

The GTP correlation module 440 may perform operation S3040 of generating a record using the MME S11 TEID a key and the IMSI context and the SGW S11 TEID contexts 902 and 904 as a value in the first correlation table 440323.

The GTP correlation module 440 may perform operation S3050 of generating a record using the SGW S11 TEIDs 902 and 904 as a key and the MME S11 context 901 as a value in the second correlation table 440324.

The GTP correlation module 440 may perform operation S3060 of generating a record using the SGW S11 TEID as a key and the SGW S11 TEID contexts 902 and 904 as a value in the third correlation table 440325.

The GTP correlation module 440 may perform operation S3070 of generating a record using the eNB TEID 905 and the eNB IP as a key and the SGW S1U TEID contexts 902 and 904 as a value in the fourth correlation table 440326.

The GTP correlation module 440 may perform operation S3080 of updating the bearer ID set including the MME IP, the bearer ID, and the sequence of the record using the MME IP address as the key and the eNB S1U TEID 905 as a value in the MME context table 440321.

The GTP correlation module 440 may perform operation S3090 of generating a record using the IMSI as a key and the bearer ID set including the MME IP, the bearer ID, and the sequence as a value in the IMSI table 44031.

The MME context table 440321 may include an MMD IP address, a bearer ID set, an MMD S11 TEID, and an eNB S1U TEID. The MMD context table 440321 may use an MMP IP address as a primary key. The MME context table 440321 may be connected to the first correlation table 440323 using a bearer ID set as a foreign key. The MME context table 440321 may be connected to the IMSI table 44031 using the MME S11 TEID as a foreign key. The MME context table 440321 may be connected to the fourth correlation table 440326 using the eND S1U TEID as a foreign key.

The SGW context table 440322 may include an SGW IP address, an SGW S11 TEID, and an SGW S1U TEID. The SGW context table 440322 may use the SGW IP address as a primary key. The SGW context table 440322 may be connected to the second correlation table 440324 using the SGW S11 TEID as a foreign key. The SGW context table 440322 may be connected to the third correlation table 440325 using the SGW S1U TEID as a foreign key.

The first correlation table 440323 may include an MME S11 TEID, IMSI context, and SGW S11 TEID context. The first correlation table 440323 may use the MME S11 TEID as a primary key. The first correlation table 440323 an the IMSI table 44031 may be cross-referenced with the IMSI context of the first correlation table 440323 and the bearer ID set of the IMSI table 44031.

The second correlation table 440324 may include an SGW S11 TEID and MMD S11 context. The second correlation table 440324 may use the SGW S11 TEID as a primary key. The first correlation table 440323 and the second correlation table 440324 may be cross-referenced with the SGW S11 TEID of the first correlation table 440323 and the MME S11 context of the second correlation table 440324.

The third correlation table 440325 may include an SGW S1U TEID and SGW S11 TEID context. The third correlation table 440325 may use the SGW S1U TEID as a primary key. The second correlation table 440324 and the third correlation table 440325 may be cross-referenced with the MME S11 context of the second correlation table 440324 and the SGW S11 TEID context of the third correlation table 440325.

The fourth correlation table 440326 may include an eNB TEID set and SGW S1U TEID context. The fourth correlation table 440326 may use an eNB TEID set as a primary key. The eNB TEID set may include an eNB S1U TEID and an eNB IP. The third correlation table 440325 and the fourth correlation table 440326 may be cross-referenced with the SGW S1U TEID of the third correlation table 440325 and the SGW S1U TEID context of the fourth correlation table 440326.

With reference to FIG. 26, a procedure of acquiring a packet output port of the GTP-C packet matched with the GTP-U packet when an Src IP is an IP of the SGW 805, a DST IP is an IP of the eNB 802, and the TEID is the SGW GTP-U TEID, in the GTP-U packet will be described below.

In the fourth correlation table 440326, the record using the IP of the eNB 802 as a may be retrieved, and then the SGW S1U TEID may be acquired from the retrieved record.

Then, in the third correlation table 440325, the record using the SGW S1U TEID as a key may be retrieved, and then, the SGW S11 TEID context may be acquired from the retrieved record.

Then, in the second correlation table 440324, the record using the acquired SGW S11 TEID context may be retrieved, and then, the MME S11 TEID context may be acquired from the retrieved record.

Then, in the first correlation table 440323, the record using the acquired MME S11 TEID context as a key may be retrieved, and then, the IMSI context may be acquired from the retrieved record.

Then, in the IMSI table 44031, the record using the acquired IMSI context as a key may searched for, and then, the packet output port may be acquired from the retrieved record.

The GTP correlation module 440 may include the GTP session tracking module 4401, the GTP user plane forward module 4402, and the storage 4403.

The deep packet matching module 430 may control gale GTP correlation module 440 to match the GTP control plane packet with the GTP user plane packet.

Referring to FIG. 27, the storage 4403 of the GTP correlation module 440 may include a GTP control plane flow table 44034 and a GTP control plane correlation table 44035.

The GTP control plane flow table 44034 may store a pair of a GTP-C TEID and an egress port.

The storage 4403 of the GTP correlation module 440 may be positioned in the processor 801 or the memory 803, in detail, a register of the processor 801 in order to rapidly process queries and responses.

The GTP control plane packet may be processed according to an action of processing a packet stored in a GTP Control plane-egress port Match Action Table 2911, and there is no record in which a packet is matched with the Match Action Table 2911 at an early stage, and accordingly, the deep packet matching module 430 may query the GTP control lane flow table 44034 about flow and may update the Match Action Table 2911. The GTP control plane packet processed by the Match Action Table 2911 may be processed together in a GTP User plane-egress port Match Action Table 2912.

A GTP control plane correlation table 44032 may be the GTP session table 44032. Egress port information corresponding to the corresponding GTP TEID in the GTP control plane correlation table 44032 may be updated in the GTP User plane-egress port Match Action Table 2912 and may be matched with a deep packet.

When there is no flow matched with a packet in the GTP User plane-egress port Match Action Table 2912 or an action for the flow is denied, the corresponding packet may be dropped and may not be processed.

Referring to FIG. 28, a matching method of a deep packet of a network packet broker according to an embodiment of the present invention may include the following operations:

receiving a packet from the ingress port unit 205 of the switch 205 by the deep packet matching module 430 (S3010);

parsing an ingress packet by extracting deep packet information from the received packet by the packet parsing module 250 of the switch 205 (S3020);

pipelining an ingress packet by processing a packet using the acquired information by the deep packet matching module 430 (S3030);

classifying a type of the packet from information of the acquired packet by the deep packet matching module 430 (S3040);

when the classified type of the packet is a GTOP control plane packet, processing the GTP control plane packet by querying the GTP Control plane-egress port Match Action Table 2911 about flow matched with the packet and acquiring the egress port unit 205 or egress port group to which the packet is to be transmitted, by the GTP session tracking module 4401 (S3050); and when the classified type of the packet is a GTP user plane packet, pipelining an egress packet by querying the GTP User plane-egress port Match Action Table 2912 about flow matched with the packet and processing the packet by the GTP user plane forward module 4402 (S3060).

The pipelining the egress packet (S3060) may include parsing the egress packet by extracting information of the egress packet and storing information of flow of the packet in the GTP User plane-egress port Match Action Table 2912 (S3061), and processing an action for the packet by querying the GTP User plane-egress port Match Action Table 2912 about the information of the flow of the egress packet (S3602).

The packet parsing module 250 according to an embodiment of the present invention may parse an Ethernet header, a VLAN header, an IPv4 header, a tcp header, an udp header, an icmp header, a sctp header, a gtp header inner ether header, an inner IPv4 header, an inner tcp header, and an inner udp header.

Referring to FIG. 29, parsing the ingress packet (S3020) of the matching method of a deep packet according to an embodiment of the present invention may include the following operations:

parsing the ingress port by extracting information of the ingress port in the ingress packet, by the packet parsing module 250 (S1101);

parsing an Ethernet protocol by extracting information of the Ethernet protocol from the ingress packet, by the packet parsing module 250 (S1102);

when the extracted Ethernet protocol information is VLAN, parsing VLAN by extracting VLAN information from the ingress packet, by the packet parsing module 250 (S1104);

when the extracted Ethernet protocol information is IPv4, parsing IPv4 by extracting IPv4 information from the ingress packet, by the packet parsing module 250 (S1105);

when a type of the extracted IPv4 protocol is TCP, parsing the TCP by extracting TCP information from the ingress port, by the packet parsing module 250 (S1107);

when a type of the extracted IPv4 protocol is an ICMP, parsing the ICMP by extracting ICMP information from the ingress packet, by the packet parsing module 250 (S1108);

when a type of the extracted IPv4 protocol is an SCTP, parsing the SCTP by extracting SCTP information from the ingress packet, by the packet parsing module 250 (S1109);

parsing UDP by extracting UDP protocol number information from the ingress packet, by the packet parsing module 250 (S1110);

when the extracted UDP protocol number is VxLAN, parsing the VxLAN by extracting VxLAN information from the ingress packet, by the packet parsing module 250 (S1112);

when the extracted UDP protocol number is GTP, parsing the GTP by extracting GTP information from the ingress packet, by the packet parsing module 250 (S1113);

parsing the inner Ether by extracting inner Ether information from the ingress packet, by the packet parsing module 250 (S1114);

parsing inner IPv4 by extracting inner IPv4 information from the ingress packet, by the packet parsing module 250 (S1115); and parsing inner TCP/UDP by extracting inner TCP and inner UDP information from the ingress packet, by the packet parsing module 250 (S1116).

The parsing the ingress port (S1101) may further include forwarding Ingress port information to ingress metadata of the packet (S11011) and forwarding device timestamp information to the ingress metadata (S11012).

The parsing the IPv4 (S1105) may further include forwarding src_ip, dst_ip, and a protocol to a look-up table of the ingress metadata (S11051).

The entire inner information extracted in the parsing the GTP (S1113), the parsing the inner Ether (S1114), the parsing the Inner IPv4 (S1115), and the parsing the Inner TCP/UDP (S1116) may be original target address information of a packet, and in this regard, it may be possible to perform traffic steering depending on the form of inner traffic in an edge cloud using the extracted original target address, and during load balancing, traffic load may be steered to be balanced based on the original target address, but not a transit address.

Referring to FIG. 30, the pipelining the ingress packet (S3030) of the matching method of a deep packet according to an embodiment of the present invention may include the following operations:

mapping an ingress port by converting the ingress physical port 250 into a logic port used in a Match Action table by the deep packet matching module 430 (S1201);

applying a GTP filter by storing processing of a packet corresponding the GTP information extracted from the ingress packet in an egress port match action table 2922, by the deep packet matching module 430 (S1202); and when there is the inner IPv4 information extracted from the ingress packet (S1203), applying an Inner IPv4 filter by storing processing of a packet corresponding to the extracted inner IPv4 information in the egress port match action table 2922, by the deep packet matching module 430 (S1203).

The applying the inner IPv4 filter (S1203) may include: when an action of the Match Action Table 2911 of a GTP user plane egress port based on the ingress packet is replication, performing replication by copying a packet and transmitting the packet to the egress port unit 205 or the egress port group, by the deep packet matching module 430 (S12031); and when an action of the Match Action Table 2911 of a GTP user plane egress port based on the ingress packet is load balancing, performing load balancing by forwarding a specified egress port group, by the deep packet matching module 430 (S12032).

In the applying the GTP filter (S1202), an action for the corresponding packet may be stored as deny, permit, replication, strip_VxLAN_and_permit, or strip_VxDAN_and_replication.

In the applying the Inner IPv4 filter (S1203), an action for the corresponding packet may be stored as deny, permit or replication.

According to an embodiment of the present invention, the policy manager module 420 may generate, modify, or process a packet filter for controlling flow of a matched packet by matching information stored in a header of the packet.

According to an embodiment of the present invention, the packet filter may be a source src IP matching filter, a destination dst IP matching filter, a TEID matching filter, or may be a GTP filter or an IPv4 filter.

According to an embodiment of the present invention, the GTP filter may match GTP Outer packet information, and in detail, may match eth_type, src_mac, dst_mac, src_ip, dst_ip, ip_proto, gtp_teid, gtp_metadata, 14_src_port, 14_dst_port, or port_group_label of a packet.

According to an embodiment of the present invention, the IPv4 filter may match the GTP Inner packet information, in detail, may match src_mac, dst_mac, dst_mac, src_ip, dst_ip, ip_proto, 14_src_port, 14_dst_port, or port_group_label of a packet.

Referring to FIG. 31, the parsing the egress packet (S3061) of the matching method of a deep packet according to an embodiment of the present invention may have the following operations:

- parsing an ingress port filter number by extracting an ingress port filter number from an egress packet, by the deep packet matching module 430 (S1301);
- matching ingress port filter by querying the policy manager module 420 about the ingress port filter number extracted from the egress packet, by the deep packet matching module 430 (S1302);
- when there is the matched ingress port filter number, extracting a matched ingress port action, by the policy manager module 420 (S1303);
- parsing a GTP filter number by extracting a GTP filter number from the egress packet, by the deep packet matching module 430 (S1304);
- matching a GTP filter by querying the policy manager module 420 about the GTP filter number extracted from the egress packet, by the deep packet, matching module 430 (S1305);
- when there is the matched GTP filter number, extracting the matched GTP action, by the policy manager module 420 (S1306);
- parsing Inner IPv4 by extracting IPv4 information from the egress packet, by the deep packet matching module 430 (S1307);
- matching Inner IPv4 by querying the policy manager module 420 about the Inner IPv4 information extracted from the egress packet, by the deep packet matching module 430 (S1308);
- when there the matched inner IPv4 information, extracting the matched Inner IPv4 action, by the policy manager module 420 (S1309); and
- generating an action list by storing the egress packet and all pairs of extracted action lists in the GTP User plane-egress port Match Action Table 2912, by the deep packet matching module 430 (S1310).

The present invention may be embodied in hardware or software. The present invention may be embodied as computer readable code stored on a computer readable recording medium. The computer readable recording medium is any data storage device that can store data which can thereafter be read by a computer. Examples of the computer readable recording medium include read-only memory (ROM), random-access memory (RAM), CD-ROMs, magnetic tapes, floppy discs, optical data storage devices, and the like, and implementation as carrier waves such as transmission over the Internet. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

The embodiments of the present invention may include a carrier wave having electrically readable control signals operated by a programmable computer system for executing one of the methods described herein. The embodiments of the present invention may be implemented as a computer program product having program code, and the program code may be operated to perform one of methods when a computer program is execute on a computer. The program code may be stored in, for example, a machine readable carrier. An embodiment of the present invention may be a computer program having program code for performing one of methods described herein when a computer program is executed on a computer. The present invention may include a computer or a programmable logic device for performing one of the aforementioned methods. In order to perform all or some of the aforementioned methods, the programmable logic device (e.g., a field programmable gate array, or a logic circuit based on a complementary metal oxide semiconductor) may be used.

While present invention has been particularly shown and described with reference to exemplary embodiments thereof, it is clearly understood that the same is by way of illustration and example only and is not to be taken as limiting the present invention. It will be understood by those skilled in the art that various changes in form and details may be made therein without departing from the subject matter and scope of the present invention.

The invention claimed is:

1. A network packet broker comprising:

one or more controllers configured to acquire information on a plurality of OpenFlow edge switches being connected to a plurality of legacy networks as a wireless access network or a wired access network and belonging to a switch group, the one or more controllers directing one or more operations including:

generating routing information of a packet input to any one switch of the switch group, wherein the switch group includes one or more switches considered as a virtual router; and controlling manipulation and flow of a packet in response to a request through the one or more controllers, by:

mapping a plurality of network devices connected to the plurality of OpenFlow edge switches for generating legacy routing information of a flow processing query message of the one or more controllers based on information on the virtual router to information of an external network connected directly to the virtual router; and associating a GTP-C packet and a GTP-U packet of a flow packet to be transmitted to the same egress port, and extracting, modifying, removing, or inserting a GTP header or a VxLAN header of a flow packet.

2. The network packet broker according to claim 1, the one or more operations further including:

storing a subscriber IMSI and a GTP session table for storing subscriber session information in storage;

receiving a GTP user plane packet from a port unit of the switch, to forward the GTP user plane packet to a port unit of a predetermined switch, to search for a GTPU TEID of the GTP user plane packet from the storage, to connect an egress port of the GTP user plane packet to the storage, and to store the GTP user plane packet; and receiving a GTP control plane packet from the port unit of the switch, to search for the egress port of the GTP user plane packet connected to the GTPU TEID of the GTP control plane packet from the storage, and to forward the GTP control plane packet received by the same port unit of the switch as the egress port.

3. The network packet broker according to claim 2, wherein:

the network packet broker further includes a processor; and the storage in which the subscriber IMSI and the GTP session table are stored is positioned in the processor.

4. The network packet broker according to claim 2, wherein:

the storage includes an IMSI table, an MME context table, and an SGW context table;

the subscriber table is an IMSI table;

the GTP session table of the storage includes an MME context table and an SGW context table; and the GTP session table of the storage further includes a correlation table for storing a correlation between the IMSI table, the MME context table, and the SGW context table.

5. The network packet broker according to claim 4, wherein the correlation table of the storage includes a first correlation table, a second correlation table, a third correlation table, and a fourth correlation table.

6. A matching method of a deep packet of a network packet broker comprising:

a software defined network (SDN) controller configured to acquire information on a plurality of OpenFlow edge switches being connected to a plurality of legacy networks as a wireless access network or a wired access network and belonging to a switch group;

a legacy router container configured to consider a switch group including at least some of the plurality of switches as a virtual router and to generate routing information of a packet input to any one switch of the switch group; and a network application module configured to perform a function of controlling manipulation and flow of a packet in response to a request through the controller, wherein:

the legacy router container maps a plurality of network devices connected to the plurality of OpenFlow edge switches for generating legacy routing information of a flow processing query message of the controller based on information on the at least one virtual router to information of an external network connected directly to the virtual router;

the network application module includes a GTP correlation module configured to associate a GTP-C packet and a GTP-U packet of a flow packet to be transmitted to the same egress port, and a deep packet matching module configured to extract, modify, remove, or insert a GTP header or a VxLAN header of a flow packet;

the GTP correlation module includes a GTP session tracking module, a GTP user plane forward module, and a storage; and the deep packet matching module controls the GTP correlation module to match a GTP control plane packet and a GTP user plane packet.

7. The method of claim 6, comprising:

receiving a packet from an ingress port unit of the switch, by the deep packet matching module;

parsing an ingress packet by extracting deep packet information from the received packet, by the packet parsing module of the switch;

pipelining an ingress packet by processing a packet using the acquired information, by the deep packet matching module;

classifying a type of the packet from information of the acquired packet, by the deep packet matching module;

when the classified type of the packet is a GTP control plane packet, processing the GTP control plane packet by querying a GTP Control plane-egress port Match Action Table about flow matched with the packet and acquiring the egress port unit or egress port group to which the packet is to be transmitted, by the GTP session tracking module; and when classified type of the packet is a GTP user plane packet, pipelining an egress packet by querying a GTP User plane-egress port Match Action Table about flow matched with the packet and processing the packet, by the GTP user plane forward module.

8. The method according to claim 7, wherein the parsing the ingress packet includes:

extracting information of the ingress port in the ingress packet, by the packet parsing module;

extracting information of an Ethernet protocol from the ingress packet, by the packet parsing module;

when the extracted Ethernet protocol information is VLAN, extracting VLAN information from the ingress packet, by the packet parsing module;

when the extracted Ethernet protocol information is IPv4, extracting IPv4 information from the ingress packet, by the packet parsing module;

when a type of the extracted IPv4 protocol is a TCP, extracting TCP information from the ingress port, by the packet parsing module;

when a type of the extracted IPv4 protocol is an Internet Control Message Protocol (ICMP), extracting ICMP information from the ingress packet, by the packet parsing module;

when a type of the extracted IPv4 protocol is SCTP, extracting SCTP information from the ingress packet, by the packet parsing module;

when a type of the extracted IPv4 protocol is a UDP, extracting UDP protocol number information from the ingress packet, by the packet parsing module;

when the extracted UDP protocol number is VxLAN, extracting VxLAN information from the ingress packet, by the packet parsing module;

when the extracted UDP protocol number is GTP, extracting GTP information from the ingress packet, by the packet parsing module;

extracting inner IPv4 information from the ingress packet, by the packet parsing module; and extracting inner TCP or inner UDP information from the ingress packet, by the packet parsing module.

9. The method according to claim 7, wherein the pipelining the ingress packet includes:

mapping the ingress port by converting an ingress physical port into a logical port used in a Match Action table, by the deep packet matching module;

applying a GTP filter by storing processing of a packet corresponding to the GTP information extracted from the ingress packet in an egress port match action table, by the deep packet matching module; and when inner IPv4 information is extracted from the ingress packet, applying an Inner IPv4 filter by storing processing of a packet corresponding to the extracted inner Ipv4 information in the egress port match action table, by the deep packet matching module.

10. The method according to claim 7, wherein the parsing the egress packet includes:

parsing an ingress port filter number by extracting an ingress port filter number from an egress packet, by the deep packet matching module;

matching an ingress port filter by querying a policy manager module about the ingress port filter number extracted from the egress packet, by the deep packet matching module;

when there is a matched ingress port filter number, extracting a matched ingress port action, by the policy manager module;

extracting a GTP filter number from the egress packet, by the deep packet matching module;

matching a GTP filter number by querying the policy manager module about the GTP filter number extracted from the egress packet, by the deep packet matching module;

when there is the matched GTP filter number, extracting the matched GTP action, by the policy manager module;

extracting Inner Ipv4 information from the egress packet, by the deep packet matching module;

matching Inner Ipv4 information by querying the policy manager module about the Inner Ipv4 information extracted from the egress packet, by the deep packet matching module;

when there is matching Inner Ipv4 information, extracting matched Inner Ipv4 action, using the policy manager module; and generating an action list by storing the egress packet and all pairs of extracted action lists in the GTP User plane-egress port Match Action Table, by the deep packet matching module.

11. The method according to claim 6, further comprising:

receiving a GTP user plane packet from a port unit of the switch;

forwarding the GTP user plane packet to a port unit of a predetermined switch;

searching for a GTPU TEID of the GTP user plane packet from the storage;

connecting an egress port of the GTP user plane packet to the storage;

storing the GTP user plane packet;

receiving the GTP control plane packet from the port unit of the switch;

searching for the egress port of the GTP user plane packet connected to the GTPU TEID of the GTP control plane packet from the storage; and forwarding the GTP control plane packet received by the same port unit of the switch as the egress port.

12. The method according to claim 11, wherein:

the storage of the GTP correlation module includes an IMSI table, an MME context table, and an SGW context table;

a subscriber table of the storage of the GTP correlation module is an IMSI table;

a GTP session table of the storage of the GTP correlation module includes an MME context table and an SGW context table; and the GTP session table of the storage of the GTP correlation module further includes a correlation table for storing a correlation between the IMSI table, the MME context table, and the SGW context table.

13. The method according claim 12, wherein the correlation table of the storage of the GTP correlation module includes a first correlation table, a second correlation table, a third correlation table, and a fourth correlation table.

14. The method according to claim 13, comprising:

generating a record using an MME IP address as a key and a bearer ID set including an MME IP, a bearer ID, and a sequence and an MME S11 TED as a value in the MME context table, by the GTP correlation module;

generating a record using an SGW IP address as a key in the SGW context table, by the GTP correlation module;

searching for a record using the SGW IP address as a key in the SGW context table and updating an SGW S11 TEID and an SGW S1U TED, by the GTP correlation module;

generating a record using the MME S11 TED as a key and IMSI context and SGW Sil TED context as a value in the first correlation table, by the GTP correlation module;

generating a record using the SGW 311 TEID as a key and the MME S11 context as a value in the second correlation table, by the GTP correlation module;

generating a record using the SGW S11 TED as a key and the SGW S11 TEID context as a value in the third correlation table, by the GTP correlation module;

generating a record using an eNB TEID and an eNB IP as a key and the SGW S1U TEID context as a value in the fourth correlation table, by the GTP correlation module;

updating the bearer ID set including the MME IP, the bearer ID, and the sequence of the record using the MME IP address as a key and an eNB S1U TED as a value in the MME context table, by the GTP correlation module; and generating a record using the IMSI as a key and the bearer ID set including the MME IP, the bearer ID, and the sequence as a value in the IMSI table, by the GTP correlation module.

* * * * *